US012380797B2

(12) United States Patent
Giobbi et al.

(10) Patent No.: US 12,380,797 B2
(45) Date of Patent: Aug. 5, 2025

(54) BIOMETRIC AUTHENTICATION USING PROXIMITY AND SECURE INFORMATION ON A USER DEVICE

(71) Applicant: Proxense, LLC, Bend, OR (US)

(72) Inventors: John J. Giobbi, Bend, OR (US); Bryan Kelly, Alamo, CA (US); David L Brown, Chattanooga, TN (US); Fred S. Hirt, Brookfield, IL (US)

(73) Assignee: Proxense, LLC, Bend, OR (US)

( * ) Notice: Subject to any disclaimer, the term of this patent is extended or adjusted under 35 U.S.C. 154(b) by 0 days.

(21) Appl. No.: 17/187,136

(22) Filed: Feb. 26, 2021

(65) Prior Publication Data

US 2021/0183235 A1 Jun. 17, 2021

Related U.S. Application Data

(63) Continuation of application No. 16/557,837, filed on Aug. 30, 2019, now Pat. No. 10,943,471, which is a (Continued)

(51) Int. Cl.

*G08C 17/02* (2006.01)
*G07C 9/00* (2020.01)
*G07F 17/32* (2006.01)

(52) U.S. Cl.

CPC ......... *G08C 17/02* (2013.01); *G07C 9/00182* (2013.01); *G07F 17/32* (2013.01); (Continued)

(58) Field of Classification Search

CPC ..... G08C 17/02; G07C 9/00182; G07F 17/32; G07F 17/3218; G07F 17/3239
(Continued)

(56) References Cited

U.S. PATENT DOCUMENTS 3,665,313 A 5/1972 Trent
3,739,329 A 6/1973 Lester
(Continued)

FOREIGN PATENT DOCUMENTS

EP 1478152 11/2004
EP 1536306 A1 6/2005
(Continued)

OTHER PUBLICATIONS

Adams, "Designing with 802.15.4 and Zigbee," presented at Industrial Wireless Applications Summit, San Diego, California, Mar. 9, 2004, 22 pgs.
(Continued)

*Primary Examiner* — Daniel A Hess
(74) *Attorney, Agent, or Firm* — Patent Law Works, LLP

(57) ABSTRACT

A system and method provides biometric authentication using proximity and secure information on a Personal Digital Key (PDK). The PDK is associated with and carried by a user. The PDK wirelessly communicates with a receiver/decoder circuit (RDC) that can be coupled to a variety of electronic devices. The PDK stores a biometric profile of a legitimate user in a secured memory. The PDK acquires biometric input from a user using a biometric reader of the PDK responsive to receiving a request for a biometric authentication of the legitimate user. The PDK compares the biometric input to the biometric profile to determine whether the biometric input matches the biometric profile. A secure wireless communication link is established between the PDK and a reader device responsive to a determination that the biometric input matches the biometric profile and the PDK device is within a predefined proximity of the reader device. The PDK device sends an identification code uniquely identifying the PDK device over the secure wireless communication link to the reader device. The reader
(Continued)

device sends information including the identification code to a trusted third-party system for authentication.

20 Claims, 22 Drawing Sheets

Related U.S. Application Data continuation of application No. 14/996,159, filed on Jan. 14, 2016, now Pat. No. 10,403,128, which is a continuation of application No. 11/939,427, filed on Nov. 13, 2007, now Pat. No. 9,269,221.

(60) Provisional application No. 60/865,596, filed on Nov. 13, 2006.

(52) U.S. Cl.
CPC ...... *G07F 17/3218* (2013.01); *G07F 17/3239* (2013.01); *G07C 2009/00261* (2013.01)

(58) Field of Classification Search
USPC .......................................................... 235/376
See application file for complete search history.

(56) References Cited

U.S. PATENT DOCUMENTS

| | | | |
|---|---|---|---|
| 3,761,883 | A | 9/1973 | Alvarez et al. |
| 3,906,166 | A | 9/1975 | Cooper et al. |
| 4,101,873 | A | 7/1978 | Anderson et al. |
| 4,430,705 | A | 2/1984 | Cannavino et al. |
| 4,476,469 | A | 10/1984 | Lander |
| 4,598,272 | A | 7/1986 | Cox |
| 4,661,821 | A | 4/1987 | Smith |
| 4,736,094 | A | 4/1988 | Yoshida |
| 4,759,060 | A | 7/1988 | Hayashi et al. |
| 4,814,742 | A | 3/1989 | Morita et al. |
| 4,871,997 | A | 10/1989 | Adriaenssens et al. |
| 4,993,068 | A | 2/1991 | Piosenka et al. |
| 5,043,702 | A | 8/1991 | Kuo |
| 5,052,049 | A | 9/1991 | Andros et al. |
| 5,187,352 | A | 2/1993 | Blair et al. |
| 5,212,369 | A | 5/1993 | Karlisch et al. |
| 5,224,164 | A | 6/1993 | Elsner |
| 5,296,641 | A | 3/1994 | Stelzel |
| 5,307,349 | A | 4/1994 | Shloss et al. |
| 5,317,572 | A | 5/1994 | Satoh |
| 5,325,285 | A | 6/1994 | Araki |
| 5,392,287 | A | 2/1995 | Tiedemann et al. |
| 5,392,433 | A | 2/1995 | Hammersley et al. |
| 5,410,588 | A | 4/1995 | Koichi |
| 5,416,780 | A | 5/1995 | Patel |
| 5,422,632 | A | 6/1995 | Bucholtz et al. |
| 5,428,684 | A | 6/1995 | Akiyama et al. |
| 5,450,489 | A | 9/1995 | Ostrover et al. |
| 5,473,690 | A | 12/1995 | Grimonprez et al. |
| 5,481,265 | A | 1/1996 | Russell |
| 5,506,863 | A | 4/1996 | Meidan et al. |
| 5,517,502 | A | 5/1996 | Bestler et al. |
| 5,530,232 | A | 6/1996 | Taylor |
| 5,541,583 | A | 7/1996 | Mandelbaum |
| 5,544,321 | A | 8/1996 | Theimer et al. |
| 5,552,776 | A | 9/1996 | Wade et al. |
| 5,563,947 | A | 10/1996 | Kikinis |
| 5,578,808 | A | 11/1996 | Taylor |
| 5,589,838 | A | 12/1996 | McEwan |
| 5,594,227 | A | 1/1997 | Deo |
| 5,598,474 | A | 1/1997 | Johnson |
| 5,611,050 | A | 3/1997 | Theimer et al. |
| 5,615,277 | A | 3/1997 | Hoffman |
| 5,619,251 | A | 4/1997 | Kuroiwa et al. |
| 5,623,552 | A | 4/1997 | Lane |
| 5,629,980 | A | 5/1997 | Stefik et al. |
| 5,644,354 | A | 7/1997 | Thompson et al. |
| 5,666,412 | A | 9/1997 | Handelman et al. |
| 5,689,529 | A | 11/1997 | Johnson |
| 5,692,049 | A | 11/1997 | Johnson et al. |
| 5,719,387 | A | 2/1998 | Fujioka |
| 5,729,237 | A | 3/1998 | Webb |
| 5,760,705 | A | 6/1998 | Glessner et al. |
| 5,760,744 | A | 6/1998 | Sauer |
| 5,773,954 | A | 6/1998 | Vanhorn |
| 5,784,464 | A | 7/1998 | Akiyama et al. |
| 5,799,085 | A | 8/1998 | Shona |
| 5,821,854 | A | 10/1998 | Dorinski et al. |
| 5,825,876 | A | 10/1998 | Peterson, Jr. |
| 5,835,595 | A | 11/1998 | Fraser et al. |
| 5,838,306 | A | 11/1998 | O'Connor et al. |
| 5,854,891 | A | 12/1998 | Postlewaite et al. |
| 5,857,020 | A | 1/1999 | Peterson, Jr. |
| 5,886,634 | A | 3/1999 | Muhme |
| 5,892,825 | A | 4/1999 | Mages et al. |
| 5,892,900 | A | 4/1999 | Ginter et al. |
| 5,894,551 | A | 4/1999 | Huggins et al. |
| 5,898,880 | A | 4/1999 | Ryu |
| 5,910,776 | A | 6/1999 | Black |
| 5,917,913 | A | 6/1999 | Wang |
| 5,923,757 | A | 7/1999 | Hocker et al. |
| 5,928,327 | A | 7/1999 | Wang et al. |
| 5,942,985 | A | 8/1999 | Chin |
| 5,991,399 | A | 11/1999 | Graunke et al. |
| 5,991,749 | A | 11/1999 | Morrill, Jr. |
| 6,009,333 | A | 12/1999 | Chaco |
| 6,016,476 | A | 1/2000 | Maes et al. |
| 6,018,739 | A | 1/2000 | McCoy et al. |
| 6,025,780 | A | 2/2000 | Bowers et al. |
| 6,035,038 | A | 3/2000 | Campinos et al. |
| 6,035,329 | A | 3/2000 | Mages et al. |
| 6,038,334 | A | 3/2000 | Hamid |
| 6,038,549 | A | 3/2000 | Davis et al. |
| 6,038,666 | A | 3/2000 | Hsu et al. |
| 6,040,786 | A | 3/2000 | Fujioka |
| 6,041,410 | A | 3/2000 | Hsu et al. |
| 6,042,006 | A | 3/2000 | Van Tilburg et al. |
| 6,044,470 | A | 3/2000 | Kuriyama |
| 6,045,039 | A | 4/2000 | Stinson et al. |
| 6,052,468 | A | 4/2000 | Hillhouse |
| 6,055,314 | A | 4/2000 | Spies et al. |
| 6,068,184 | A | 5/2000 | Barnett |
| 6,069,647 | A | 5/2000 | Sullivan et al. |
| 6,070,796 | A | 6/2000 | Sirbu |
| 6,076,164 | A | 6/2000 | Tanaka et al. |
| 6,088,450 | A | 7/2000 | Davis et al. |
| 6,088,730 | A | 7/2000 | Kato et al. |
| 6,104,290 | A | 8/2000 | Naguleswaran |
| 6,104,334 | A | 8/2000 | Allport |
| 6,110,041 | A | 8/2000 | Walker et al. |
| 6,121,544 | A | 9/2000 | Petsinger |
| 6,134,283 | A | 10/2000 | Sands et al. |
| 6,137,480 | A | 10/2000 | Shintani |
| 6,138,010 | A | 10/2000 | Rabe et al. |
| 6,148,142 | A | 11/2000 | Anderson |
| 6,148,210 | A | 11/2000 | Elwin et al. |
| 6,161,179 | A | 12/2000 | Seidel |
| 6,175,921 | B1 | 1/2001 | Rosen |
| 6,177,887 | B1 | 1/2001 | Jerome |
| 6,185,316 | B1 | 2/2001 | Buffam |
| 6,189,105 | B1 | 2/2001 | Lopes |
| 6,209,089 | B1 | 3/2001 | Selitrennikoff et al. |
| 6,219,109 | B1 | 4/2001 | Raynesford et al. |
| 6,219,439 | B1 | 4/2001 | Burger |
| 6,219,553 | B1 | 4/2001 | Panasik |
| 6,237,848 | B1 | 5/2001 | Everett |
| 6,240,076 | B1 | 5/2001 | Kanerva et al. |
| 6,247,130 | B1 | 6/2001 | Fritsch |
| 6,249,869 | B1 | 6/2001 | Drupsteen et al. |
| 6,250,557 | B1 | 6/2001 | Forslund et al. |
| 6,256,737 | B1 | 7/2001 | Bianco et al. |
| 6,266,415 | B1 | 7/2001 | Campinos et al. |
| 6,270,011 | B1 | 8/2001 | Gottfried |
| 6,279,111 | B1 | 8/2001 | Jensenworth et al. |
| 6,279,146 | B1 | 8/2001 | Evans et al. |
| 6,295,057 | B1 | 9/2001 | Rosin et al. |

(56) References Cited

U.S. PATENT DOCUMENTS

| | | | | |
|---|---|---|---|---|
| 6,307,471 | B1 | 10/2001 | Xydis | |
| 6,317,755 | B1 | 11/2001 | Rakers et al. | |
| 6,325,285 | B1 | 12/2001 | Baratelli | |
| 6,336,121 | B1 | 1/2002 | Lyson et al. | |
| 6,336,142 | B1 | 1/2002 | Kato et al. | |
| 6,343,280 | B2 | 1/2002 | Clark | |
| 6,345,347 | B1 | 2/2002 | Biran | |
| 6,363,485 | B1 | 3/2002 | Adams et al. | |
| 6,367,019 | B1 | 4/2002 | Ansell et al. | |
| 6,369,693 | B1 | 4/2002 | Gibson | |
| 6,370,376 | B1 | 4/2002 | Sheath | |
| 6,381,029 | B1 | 4/2002 | Tipirneni | |
| 6,381,747 | B1 | 4/2002 | Wonfor et al. | |
| 6,385,596 | B1 | 5/2002 | Wiser et al. | |
| 6,392,664 | B1 | 5/2002 | White et al. | |
| 6,397,387 | B1 | 5/2002 | Rosin et al. | |
| 6,401,059 | B1 | 6/2002 | Shen et al. | |
| 6,411,307 | B1 | 6/2002 | Rosin et al. | |
| 6,424,249 | B1 | 7/2002 | Houvener | |
| 6,424,715 | B1 | 7/2002 | Saito | |
| 6,425,084 | B1 | 7/2002 | Rallis et al. | |
| 6,434,403 | B1 | 8/2002 | Ausems et al. | |
| 6,434,535 | B1 | 8/2002 | Kupka et al. | |
| 6,446,004 | B1 | 9/2002 | Cao et al. | |
| 6,446,130 | B1 | 9/2002 | Grapes | |
| 6,456,958 | B1 | 9/2002 | Xydis | |
| 6,463,534 | B1 | 10/2002 | Geiger et al. | |
| 6,480,101 | B1 | 11/2002 | Kelly et al. | |
| 6,480,188 | B1 | 11/2002 | Horsley | |
| 6,484,182 | B1 | 11/2002 | Dunphy et al. | |
| 6,484,260 | B1 | 11/2002 | Scott et al. | |
| 6,484,946 | B2 | 11/2002 | Matsumoto et al. | |
| 6,487,663 | B1 | 11/2002 | Jaisimha et al. | |
| 6,490,443 | B1 | 12/2002 | Freeny, Jr. | |
| 6,510,350 | B1 | 1/2003 | Steen et al. | |
| 6,522,253 | B1 | 2/2003 | Saltus | |
| 6,523,113 | B1 | 2/2003 | Wehrenberg | |
| 6,529,949 | B1 | 3/2003 | Getsin et al. | |
| 6,546,418 | B2 | 4/2003 | Schena et al. | |
| 6,550,011 | B1 | 4/2003 | Sims, III | |
| 6,563,465 | B2 | 5/2003 | Frecska | |
| 6,563,805 | B1 | 5/2003 | Ma et al. | |
| 6,564,380 | B1 | 5/2003 | Murphy | |
| 6,577,238 | B1 | 6/2003 | Whitesmith et al. | |
| 6,593,887 | B2 | 7/2003 | Luk et al. | |
| 6,597,680 | B1 | 7/2003 | Lindskog et al. | |
| 6,607,136 | B1 | 8/2003 | Atsmon et al. | |
| 6,621,528 | B1 | 9/2003 | Kessler et al. | |
| 6,624,752 | B2 | 9/2003 | Klitsgaard et al. | |
| 6,628,302 | B2 | 9/2003 | White et al. | |
| 6,632,992 | B2 | 10/2003 | Hasegawa | |
| 6,633,981 | B1 | 10/2003 | Davis | |
| 6,645,077 | B2 | 11/2003 | Rowe | |
| 6,647,417 | B1 | 11/2003 | Hunter et al. | |
| 6,657,538 | B1 | 12/2003 | Ritter | |
| 6,658,566 | B1 | 12/2003 | Hazard | |
| 6,667,684 | B1 | 12/2003 | Waggamon et al. | |
| 6,669,096 | B1 | 12/2003 | Saphar et al. | |
| 6,671,808 | B1 | 12/2003 | Abbott et al. | |
| 6,683,954 | B1 | 1/2004 | Searle | |
| 6,695,207 | B1 | 2/2004 | Norris, Jr. | |
| 6,697,944 | B1 | 2/2004 | Jones et al. | |
| 6,709,333 | B1 | 3/2004 | Bradford et al. | |
| 6,711,464 | B1 | 3/2004 | Yap et al. | |
| 6,714,168 | B2 | 3/2004 | Berenbaum | |
| 6,715,246 | B1 | 4/2004 | Frecska et al. | |
| 6,728,397 | B2 | 4/2004 | McNeal | |
| 6,737,955 | B2 | 5/2004 | Ghabra et al. | |
| 6,758,394 | B2 | 7/2004 | Maskatiya et al. | |
| 6,771,969 | B1 | 8/2004 | Chinoy et al. | |
| 6,775,655 | B1 | 8/2004 | Peinado et al. | |
| 6,785,474 | B2 | 8/2004 | Hirt et al. | |
| 6,788,640 | B2 | 9/2004 | Celeste | |
| 6,788,924 | B1 | 9/2004 | Knutson et al. | |
| 6,795,425 | B1 | 9/2004 | Raith | |
| 6,804,825 | B1 | 10/2004 | White et al. | |
| 6,806,887 | B2 | 10/2004 | Chernock et al. | |
| 6,819,219 | B1 | 11/2004 | Bolle et al. | |
| 6,839,542 | B2 | 1/2005 | Sibecas et al. | |
| 6,850,147 | B2 | 2/2005 | Prokoski et al. | |
| 6,853,988 | B1 | 2/2005 | Dickinson et al. | |
| 6,859,812 | B1 | 2/2005 | Poynor | |
| 6,861,980 | B1 | 3/2005 | Rowitch et al. | |
| 6,871,063 | B1 | 3/2005 | Schiffer | |
| 6,873,975 | B1 | 3/2005 | Hatakeyama et al. | |
| 6,879,567 | B2 | 4/2005 | Callaway et al. | |
| 6,879,966 | B1 | 4/2005 | Lapsley et al. | |
| 6,886,741 | B1 | 5/2005 | Salveson | |
| 6,889,067 | B2 | 5/2005 | Willey | |
| 6,891,822 | B1 | 5/2005 | Gubbi et al. | |
| 6,892,307 | B1 | 5/2005 | Wood et al. | |
| 6,930,643 | B2 | 8/2005 | Byrne et al. | |
| 6,934,855 | B1 | 8/2005 | Kipnis et al. | |
| 6,947,003 | B2 | 9/2005 | Huor | |
| 6,950,941 | B1 | 9/2005 | Lee et al. | |
| 6,957,086 | B2 | 10/2005 | Bahl et al. | |
| 6,961,858 | B2 | 11/2005 | Fransdonk | |
| 6,963,270 | B1 | 11/2005 | Gallagher et al. | |
| 6,963,971 | B1 | 11/2005 | Bush et al. | |
| 6,973,576 | B2 | 12/2005 | Giobbi | |
| 6,975,202 | B1 | 12/2005 | Rodriguez et al. | |
| 6,980,087 | B2 | 12/2005 | Zukowski | |
| 6,983,882 | B2 | 1/2006 | Cassone | |
| 6,999,032 | B2 | 2/2006 | Pakray et al. | |
| 7,012,503 | B2 | 3/2006 | Nielsen | |
| 7,020,635 | B2 | 3/2006 | Hamilton et al. | |
| 7,020,785 | B2 | 3/2006 | Kim et al. | |
| 7,031,945 | B1 | 4/2006 | Donner | |
| 7,049,963 | B2 | 5/2006 | Waterhouse et al. | |
| 7,055,171 | B1 | 5/2006 | Martin et al. | |
| 7,058,806 | B2 | 6/2006 | Smeets et al. | |
| 7,061,380 | B1 | 6/2006 | Orlando et al. | |
| 7,068,623 | B1 | 6/2006 | Barany et al. | |
| 7,072,900 | B2 | 7/2006 | Sweitzer et al. | |
| 7,079,079 | B2 | 7/2006 | Jo et al. | |
| 7,080,049 | B2 | 7/2006 | Truitt et al. | |
| 7,082,415 | B1 | 7/2006 | Robinson et al. | |
| 7,090,126 | B2 | 8/2006 | Kelly et al. | |
| 7,090,128 | B2 | 8/2006 | Farley et al. | |
| 7,100,053 | B1 | 8/2006 | Brown et al. | |
| 7,107,455 | B1 | 9/2006 | Merkin | |
| 7,107,462 | B2 | 9/2006 | Fransdonk | |
| 7,111,789 | B2 | 9/2006 | Rajasekaran et al. | |
| 7,112,138 | B2 | 9/2006 | Hedrick et al. | |
| 7,119,659 | B2 | 10/2006 | Bonalle et al. | |
| 7,123,149 | B2 | 10/2006 | Nowak et al. | |
| 7,130,668 | B2 | 10/2006 | Chang et al. | |
| 7,131,139 | B1 | 10/2006 | Meier | |
| 7,137,008 | B1 | 11/2006 | Hamid et al. | |
| 7,137,012 | B1 | 11/2006 | Kamibayashi et al. | |
| 7,139,914 | B2 | 11/2006 | Arnouse | |
| 7,150,045 | B2 | 12/2006 | Koelle et al. | |
| 7,155,416 | B2 | 12/2006 | Shatford | |
| 7,159,114 | B1 | 1/2007 | Zajkowski et al. | |
| 7,159,765 | B2 * | 1/2007 | Frerking | G07C 9/28 235/382 |
| 7,167,987 | B2 | 1/2007 | Angelo | |
| 7,168,089 | B2 | 1/2007 | Nguyen et al. | |
| 7,176,797 | B2 | 2/2007 | Zai et al. | |
| 7,185,363 | B1 | 2/2007 | Narin et al. | |
| 7,188,110 | B1 | 3/2007 | Ludtke et al. | |
| 7,191,466 | B1 | 3/2007 | Hamid et al. | |
| 7,194,438 | B2 | 3/2007 | Sovio et al. | |
| 7,209,955 | B1 | 4/2007 | Major et al. | |
| 7,218,944 | B2 | 5/2007 | Cromer et al. | |
| 7,225,161 | B2 | 5/2007 | Lam et al. | |
| 7,230,908 | B2 | 6/2007 | Vanderaar et al. | |
| 7,231,068 | B2 | 6/2007 | Tibor | |
| 7,231,451 | B2 | 6/2007 | Law et al. | |
| 7,239,226 | B2 | 7/2007 | Berardi et al. | |
| 7,239,241 | B2 | 7/2007 | Claudatos et al. | |
| 7,242,923 | B2 | 7/2007 | Perera et al. | |
| 7,245,221 | B2 | 7/2007 | Claudatos et al. | |
| 7,249,177 | B1 | 7/2007 | Miller | |

(56) References Cited

U.S. PATENT DOCUMENTS

| | | | |
|---|---|---|---|
| 7,272,723 | B1 | 9/2007 | Abbott et al. |
| 7,277,737 | B1 | 10/2007 | Vollmer et al. |
| 7,278,025 | B2 | 10/2007 | Saito et al. |
| 7,283,650 | B1 | 10/2007 | Sharma et al. |
| 7,295,106 | B1 | 11/2007 | Jackson et al. |
| 7,295,119 | B2 | 11/2007 | Rappaport et al. |
| 7,305,560 | B2 | 12/2007 | Giobbi |
| 7,310,042 | B2 | 12/2007 | Seifert |
| 7,314,164 | B2 | 1/2008 | Bonalle et al. |
| 7,317,799 | B2 | 1/2008 | Hammersmith et al. |
| 7,319,395 | B2 | 1/2008 | Puzio et al. |
| 7,323,991 | B1 | 1/2008 | Eckert et al. |
| 7,330,108 | B2 | 2/2008 | Thomas |
| 7,333,002 | B2 | 2/2008 | Bixler et al. |
| 7,333,615 | B1 | 2/2008 | Jarboe et al. |
| 7,336,181 | B2 | 2/2008 | Nowak et al. |
| 7,336,182 | B1 | 2/2008 | Baranowski et al. |
| 7,337,326 | B2 | 2/2008 | Palmer et al. |
| 7,341,181 | B2 | 3/2008 | Bonalle et al. |
| 7,342,503 | B1 | 3/2008 | Light et al. |
| 7,349,557 | B2 | 3/2008 | Tibor |
| 7,356,393 | B1 | 4/2008 | Schlatre et al. |
| 7,356,706 | B2 | 4/2008 | Scheurich |
| 7,361,919 | B2 | 4/2008 | Setlak |
| 7,363,494 | B2 | 4/2008 | Brainard et al. |
| 7,370,366 | B2 | 5/2008 | Lacan et al. |
| 7,378,939 | B2 | 5/2008 | Sengupta et al. |
| 7,380,202 | B1 | 5/2008 | Lindhorst et al. |
| 7,382,799 | B1 | 6/2008 | Young et al. |
| 7,387,235 | B2 | 6/2008 | Gilbert et al. |
| 7,401,731 | B1 | 7/2008 | Pletz et al. |
| 7,404,088 | B2 | 7/2008 | Giobbi |
| 7,408,799 | B1 | 8/2008 | Kang |
| 7,424,134 | B2 | 9/2008 | Chou |
| 7,437,330 | B1 | 10/2008 | Robinson et al. |
| 7,447,911 | B2 | 11/2008 | Chou et al. |
| 7,448,087 | B2 | 11/2008 | Ohmori et al. |
| 7,458,510 | B1 | 12/2008 | Zhou |
| 7,460,836 | B2 | 12/2008 | Smith et al. |
| 7,461,444 | B2 | 12/2008 | Deaett et al. |
| 7,464,053 | B1 | 12/2008 | Pylant |
| 7,464,059 | B1 | 12/2008 | Robinson et al. |
| 7,466,232 | B2 | 12/2008 | Neuwirth |
| 7,472,280 | B2 | 12/2008 | Giobbi |
| 7,477,285 | B1 | 1/2009 | Johnson |
| 7,512,806 | B2 | 3/2009 | Lemke |
| 7,525,413 | B2 | 4/2009 | Jung et al. |
| 7,529,944 | B2 | 5/2009 | Hamid |
| 7,533,809 | B1 | 5/2009 | Robinson et al. |
| 7,545,312 | B2 | 6/2009 | Kiang et al. |
| 7,565,329 | B2 | 7/2009 | Lapsley et al. |
| 7,573,382 | B2 | 8/2009 | Choubey et al. |
| 7,573,841 | B2 | 8/2009 | Lee et al. |
| 7,574,734 | B2 | 8/2009 | Fedronic et al. |
| 7,578,442 | B2 | 8/2009 | Knowles et al. |
| 7,583,238 | B2 | 9/2009 | Cassen et al. |
| 7,583,643 | B2 | 9/2009 | Smith et al. |
| 7,587,502 | B2 | 9/2009 | Crawford et al. |
| 7,587,611 | B2 | 9/2009 | Johnson et al. |
| 7,594,611 | B1 | 9/2009 | Arrington, III |
| 7,595,765 | B1 | 9/2009 | Hirsch et al. |
| 7,603,564 | B2 | 10/2009 | Adachi |
| 7,606,733 | B2 | 10/2009 | Shmueli et al. |
| 7,617,523 | B2 | 11/2009 | Das et al. |
| 7,620,184 | B2 | 11/2009 | Marque Pucheu |
| 7,624,073 | B1 | 11/2009 | Robinson et al. |
| 7,624,417 | B2 | 11/2009 | Dua |
| 7,640,273 | B2 | 12/2009 | Wallmeier et al. |
| 7,644,043 | B2 | 1/2010 | Minowa |
| 7,644,443 | B2 | 1/2010 | Matsuyama et al. |
| 7,646,307 | B2 | 1/2010 | Plocher et al. |
| 7,652,892 | B2 | 1/2010 | Shiu et al. |
| 7,653,883 | B2 | 1/2010 | Hotelling et al. |
| 7,676,380 | B2 | 3/2010 | Graves et al. |
| 7,681,050 | B2 | 3/2010 | Blom et al. |
| 7,689,005 | B2 | 3/2010 | Wang et al. |
| 7,701,858 | B2 | 4/2010 | Werb et al. |
| 7,706,896 | B2 | 4/2010 | Music et al. |
| 7,711,152 | B1 | 5/2010 | Davida et al. |
| 7,711,586 | B2 | 5/2010 | Aggarwal et al. |
| 7,715,593 | B1 | 5/2010 | Adams et al. |
| 7,724,713 | B2 | 5/2010 | Del Prado Pavon et al. |
| 7,724,717 | B2 | 5/2010 | Porras et al. |
| 7,724,720 | B2 | 5/2010 | Korpela et al. |
| 7,764,236 | B2 | 7/2010 | Hill et al. |
| 7,765,164 | B1 | 7/2010 | Robinson et al. |
| 7,765,181 | B2 | 7/2010 | Thomas et al. |
| 7,768,960 | B1 | 8/2010 | Barratt |
| 7,773,754 | B2 | 8/2010 | Buer et al. |
| 7,774,613 | B2 | 8/2010 | Lemke |
| 7,780,082 | B2 | 8/2010 | Handa et al. |
| 7,796,551 | B1 | 9/2010 | Machiraju et al. |
| 7,813,822 | B1 | 10/2010 | Hoffberg |
| 7,865,448 | B2 | 1/2011 | Pizarro |
| 7,865,937 | B1 | 1/2011 | White et al. |
| 7,883,003 | B2 | 2/2011 | Giobbi et al. |
| 7,883,417 | B2 | 2/2011 | Bruzzese et al. |
| 7,904,718 | B2 | 3/2011 | Giobbi et al. |
| 7,943,868 | B2 | 5/2011 | Anders et al. |
| 7,957,536 | B2 | 6/2011 | Nolte |
| 7,961,078 | B1 | 6/2011 | Reynolds et al. |
| 7,984,064 | B2 | 7/2011 | Fusari |
| 7,996,514 | B2 | 8/2011 | Baumert et al. |
| 8,011,588 | B2 | 9/2011 | Kon et al. |
| 8,026,821 | B2 | 9/2011 | Reeder et al. |
| 8,036,152 | B2 | 10/2011 | Brown et al. |
| 8,049,594 | B1 | 11/2011 | Baranowski |
| 8,077,041 | B2 | 12/2011 | Stern et al. |
| 8,081,215 | B2 | 12/2011 | Kuo et al. |
| 8,082,160 | B2 | 12/2011 | Collins et al. |
| 8,089,354 | B2 | 1/2012 | Perkins |
| 8,112,066 | B2 | 2/2012 | Ben Ayed |
| 8,117,125 | B1 | 2/2012 | Kawan et al. |
| 8,125,624 | B2 | 2/2012 | Jones et al. |
| 8,135,624 | B1 | 3/2012 | Ramalingam et al. |
| 8,171,528 | B1 | 5/2012 | Brown |
| 8,193,923 | B2 | 6/2012 | Rork et al. |
| 8,200,980 | B1 | 6/2012 | Robinson et al. |
| 8,215,552 | B1 | 7/2012 | Rambadt |
| 8,219,129 | B2 | 7/2012 | Brown et al. |
| 8,248,263 | B2 | 8/2012 | Shervey et al. |
| 8,258,942 | B1 | 9/2012 | Lanzone et al. |
| 8,294,554 | B2 | 10/2012 | Shoarinejad et al. |
| 8,296,573 | B2 | 10/2012 | Bolle et al. |
| 8,307,414 | B2 | 11/2012 | Zerfos et al. |
| 8,325,011 | B2 | 12/2012 | Butler et al. |
| 8,327,151 | B2 | 12/2012 | Awatsu et al. |
| 8,340,672 | B2 | 12/2012 | Brown et al. |
| 8,352,730 | B2 | 1/2013 | Giobbi |
| 8,373,562 | B1 | 2/2013 | Heinze et al. |
| 8,387,124 | B2 | 2/2013 | Smetters et al. |
| 8,390,456 | B2 | 3/2013 | Puleston et al. |
| 8,395,484 | B2 | 3/2013 | Fullerton |
| 8,410,906 | B1 | 4/2013 | Dacus et al. |
| 8,412,949 | B2 | 4/2013 | Giobbi et al. |
| 8,421,606 | B2 | 4/2013 | Collins et al. |
| 8,424,079 | B2 | 4/2013 | Adams et al. |
| 8,432,262 | B2 | 4/2013 | Talty et al. |
| 8,433,919 | B2 | 4/2013 | Giobbi et al. |
| 8,448,858 | B1 | 5/2013 | Kundu et al. |
| 8,457,672 | B2 | 6/2013 | Brown et al. |
| 8,467,969 | B2 | 6/2013 | Nielsen et al. |
| 8,473,748 | B2 | 6/2013 | Sampas |
| 8,484,696 | B2 | 7/2013 | Gatto et al. |
| 8,494,576 | B1 | 7/2013 | Bye et al. |
| 8,508,336 | B2 | 8/2013 | Giobbi et al. |
| 8,511,555 | B2 | 8/2013 | Babcock et al. |
| 8,519,823 | B2 | 8/2013 | Rinkes |
| 8,522,019 | B2 | 8/2013 | Michaelis |
| 8,558,699 | B2 | 10/2013 | Butler et al. |
| 8,572,391 | B2 | 10/2013 | Golan et al. |
| 8,577,091 | B2 | 11/2013 | Ivanov et al. |
| 8,600,674 | B1 | 12/2013 | Barbeau et al. |
| 8,646,042 | B1 | 2/2014 | Brown |

(56) References Cited

U.S. PATENT DOCUMENTS 8,659,427 B2 2/2014 Brown et al.
8,678,273 B2 3/2014 McNeal
8,717,346 B2 5/2014 Claessen
8,738,925 B1 5/2014 Park et al.
8,799,574 B2 8/2014 Corda
8,838,993 B2 9/2014 Giobbi et al.
8,856,539 B2 10/2014 Weiss
8,857,716 B1 10/2014 Giobbi et al.
8,886,954 B1 11/2014 Giobbi
8,907,861 B2 12/2014 Hirt
8,914,477 B2 12/2014 Gammon
8,918,854 B1 12/2014 Giobbi
8,931,698 B2 1/2015 Ishikawa et al.
8,977,860 B2 3/2015 Barrus et al.
8,979,646 B2 3/2015 Moser et al.
9,020,854 B2 4/2015 Giobbi
9,037,140 B1 5/2015 Brown
9,042,819 B2 5/2015 Dua
9,049,188 B1 6/2015 Brown
9,113,464 B2 8/2015 Brown et al.
9,165,233 B2 10/2015 Testanero
9,189,788 B1 11/2015 Robinson et al.
9,230,399 B2 1/2016 Yacenda
9,235,700 B1 1/2016 Brown
9,251,326 B2 2/2016 Giobbi et al.
9,251,332 B2 2/2016 Giobbi
9,265,043 B2 2/2016 Brown et al.
9,265,450 B1 2/2016 Giobbi
9,269,221 B2 2/2016 Brown et al.
9,276,914 B2 3/2016 Woodward et al.
9,298,905 B1 3/2016 Giobbi
9,305,312 B2 4/2016 Kountotsis et al.
9,322,974 B1 4/2016 Giobbi
9,405,898 B2 8/2016 Giobbi
9,418,205 B2 8/2016 Giobbi
9,430,624 B1 8/2016 Mortensen et al.
9,450,956 B1 9/2016 Giobbi
9,542,542 B2 1/2017 Giobbi et al.
9,613,483 B2 4/2017 Giobbi
9,679,289 B1 6/2017 Brown
9,728,080 B1 8/2017 Giobbi et al.
9,807,091 B2 10/2017 Giobbi
9,830,504 B2 11/2017 Masood et al.
9,892,250 B2 2/2018 Giobbi
9,898,662 B2 2/2018 Tsuda et al.
9,904,816 B1 2/2018 Giobbi et al.
9,990,628 B2 6/2018 Giobbi
10,026,253 B2 7/2018 Giobbi
10,073,960 B1 9/2018 Brown
10,110,385 B1 10/2018 Rush et al.
10,140,073 B2 11/2018 Chang et al.
10,171,460 B2 1/2019 Giobbi
10,217,339 B1 2/2019 Giobbi
10,229,294 B1 3/2019 Giobbi et al.
10,303,867 B2 5/2019 Snke
10,313,336 B2 6/2019 Giobbi
10,334,541 B1 6/2019 Brown
10,362,483 B2 7/2019 Frusina
10,374,795 B1 8/2019 Giobbi et al.
10,383,112 B2 8/2019 Brown et al.
10,403,128 B2 9/2019 Giobbi et al.
10,405,181 B2 9/2019 Li et al.
10,437,976 B2 10/2019 Giobbi
10,455,533 B2 10/2019 Brown
10,469,456 B1 11/2019 Giobbi
10,567,965 B2 2/2020 Boettcher et al.
10,698,989 B2 6/2020 Giobbi
10,755,300 B2 8/2020 Goodhart et al.
10,764,044 B1 9/2020 Giobbi et al.
10,769,939 B2 9/2020 Brown et al.
10,817,964 B2 10/2020 Guillama et al.
10,856,148 B2 12/2020 Li et al.
10,909,229 B2 2/2021 Giobbi
10,929,869 B2 2/2021 Rosenberg
10,943,471 B1 3/2021 Giobbi et al.
11,086,979 B1 8/2021 Giobbi
11,212,797 B2 12/2021 Brown et al.
11,219,022 B2 1/2022 Brown et al.
11,562,644 B2 1/2023 Brown et al.
11,914,695 B2 2/2024 Giobbi
2001/0000535 A1 4/2001 Lapsley et al.
2001/0011276 A1 8/2001 Durst et al.
2001/0014885 A1 8/2001 Yanagi
2001/0018763 A1 8/2001 Ikeda et al.
2001/0021950 A1 9/2001 Hawley et al.
2001/0024428 A1 9/2001 Onouchi
2001/0026619 A1 10/2001 Howard et al.
2001/0027121 A1 10/2001 Boesen
2001/0027439 A1 10/2001 Holtzman et al.
2001/0036297 A1 11/2001 Ikegami et al.
2001/0044337 A1 11/2001 Rowe et al.
2002/0004783 A1 1/2002 Paltenghe et al.
2002/0007456 A1 1/2002 Peinado et al.
2002/0010679 A1 1/2002 Felsher
2002/0013772 A1 1/2002 Peinado
2002/0014954 A1 2/2002 Fitzgibbon et al.
2002/0015008 A1 2/2002 Kishida et al.
2002/0015494 A1 2/2002 Nagai et al.
2002/0019811 A1 2/2002 Lapsley et al.
2002/0022455 A1 2/2002 Salokannel et al.
2002/0023032 A1 2/2002 Pearson et al.
2002/0023217 A1 2/2002 Wheeler et al.
2002/0026424 A1 2/2002 Akashi
2002/0037732 A1 3/2002 Gous et al.
2002/0046336 A1 4/2002 Kon et al.
2002/0049806 A1 4/2002 Gatz et al.
2002/0052193 A1 5/2002 Chetty
2002/0055908 A1 5/2002 Di Giorgio et al.
2002/0056043 A1 5/2002 Glass
2002/0059114 A1 5/2002 Cockrill et al.
2002/0062249 A1 5/2002 Iannacci
2002/0064074 A1 5/2002 Kamise et al.
2002/0065778 A1 5/2002 Bouet et al.
2002/0068605 A1 6/2002 Stanley
2002/0069364 A1 6/2002 Dosch
2002/0071416 A1 6/2002 Carlson et al.
2002/0071559 A1 6/2002 Christensen et al.
2002/0073042 A1 6/2002 Maritzen et al.
2002/0073293 A1 6/2002 Mac et al.
2002/0076051 A1 6/2002 Nii
2002/0078367 A1 6/2002 Lang et al.
2002/0080969 A1 6/2002 Giobbi
2002/0083178 A1 6/2002 Brothers
2002/0083318 A1 6/2002 Larose
2002/0086690 A1 7/2002 Takahashi et al.
2002/0089890 A1 7/2002 Fibranz et al.
2002/0091646 A1 7/2002 Lake et al.
2002/0095586 A1 7/2002 Doyle et al.
2002/0095587 A1 7/2002 Doyle et al.
2002/0097876 A1 7/2002 Harrison
2002/0098888 A1 7/2002 Rowe et al.
2002/0100798 A1 8/2002 Farrugia et al.
2002/0103027 A1 8/2002 Rowe et al.
2002/0103881 A1 8/2002 Granade et al.
2002/0104006 A1 8/2002 Boate et al.
2002/0104019 A1 8/2002 Chatani et al.
2002/0105918 A1 8/2002 Yamada et al.
2002/0108049 A1 8/2002 Xu et al.
2002/0109580 A1 8/2002 Shreve et al.
2002/0111919 A1 8/2002 Weller et al.
2002/0112183 A1 8/2002 Baird et al.
2002/0115444 A1 8/2002 Yu et al.
2002/0116615 A1 8/2002 Nguyen et al.
2002/0124251 A1 9/2002 Hunter et al.
2002/0128017 A1 9/2002 Virtanen
2002/0128057 A1* 9/2002 Walker .................... A63F 13/30
463/20
2002/0129262 A1 9/2002 Kutaragi et al.
2002/0138438 A1 9/2002 Bardwell
2002/0138445 A1 9/2002 Laage et al.
2002/0138767 A1 9/2002 Hamid et al.
2002/0138768 A1 9/2002 Murakami et al.
2002/0139848 A1* 10/2002 Catan .................... G06Q 99/00
235/385

(56) References Cited

U.S. PATENT DOCUMENTS

2002/0140542 A1 10/2002 Prokoski et al.
2002/0141586 A1 10/2002 Margalit et al.
2002/0143623 A1 10/2002 Dayley
2002/0143634 A1 10/2002 Kumar et al.
2002/0143655 A1 10/2002 Elston et al.
2002/0144116 A1 10/2002 Giobbi
2002/0144117 A1 10/2002 Faigle
2002/0147653 A1 10/2002 Shmueli et al.
2002/0147658 A1 10/2002 Kwan
2002/0148892 A1 10/2002 Bardwell
2002/0150282 A1 10/2002 Kinsella
2002/0152391 A1 10/2002 Willins et al.
2002/0153996 A1 10/2002 Chan et al.
2002/0158121 A1 10/2002 Stanford-Clark
2002/0158750 A1 10/2002 Almalik
2002/0158765 A1 10/2002 Pape et al.
2002/0160820 A1 10/2002 Winkler
2002/0162009 A1 10/2002 Shmueli et al.
2002/0165803 A1 11/2002 Iwase et al.
2002/0174348 A1 11/2002 Ting
2002/0177460 A1 11/2002 Beasley et al.
2002/0178063 A1 11/2002 Gravelle et al.
2002/0184208 A1 12/2002 Kato
2002/0187746 A1 12/2002 Cheng et al.
2002/0191816 A1 12/2002 Maritzen et al.
2002/0196963 A1 12/2002 Bardwell
2002/0199120 A1 12/2002 Schmidt
2003/0001016 A1 1/2003 Fraier et al.
2003/0022701 A1 1/2003 Gupta
2003/0023882 A1 1/2003 Udom
2003/0024975 A1 2/2003 Rajasekharan
2003/0033203 A1 2/2003 Inoue et al.
2003/0034877 A1 2/2003 Miller et al.
2003/0036416 A1 2/2003 Pattabiraman et al.
2003/0036425 A1 2/2003 Kaminkow et al.
2003/0046228 A1 3/2003 Berney
2003/0046237 A1 3/2003 Uberti
2003/0046552 A1 3/2003 Hamid
2003/0048174 A1 3/2003 Stevens et al.
2003/0051173 A1 3/2003 Krueger
2003/0054868 A1 3/2003 Paulsen et al.
2003/0054881 A1 3/2003 Hedrick et al.
2003/0055689 A1 3/2003 Block et al.
2003/0055792 A1 3/2003 Kinoshita et al.
2003/0061154 A1 3/2003 Chacko
2003/0061172 A1 3/2003 Robinson
2003/0063619 A1 4/2003 Montano et al.
2003/0074575 A1 4/2003 Hoberock et al.
2003/0079133 A1 4/2003 Breiter et al.
2003/0087601 A1 5/2003 Agam et al.
2003/0088441 A1 5/2003 McNerney
2003/0105719 A1 6/2003 Berger et al.
2003/0109274 A1 6/2003 Budka et al.
2003/0115227 A1 6/2003 Guthery
2003/0115351 A1 6/2003 Giobbi
2003/0115474 A1 6/2003 Khan et al.
2003/0117969 A1 6/2003 Koo et al.
2003/0117980 A1 6/2003 Kim et al.
2003/0120934 A1 6/2003 Ortiz
2003/0127511 A1 7/2003 Kelly et al.
2003/0128866 A1 7/2003 McNeal
2003/0137404 A1 7/2003 Bonneau et al.
2003/0139190 A1 7/2003 Steelberg et al.
2003/0142041 A1 7/2003 Barlow et al.
2003/0146835 A1 8/2003 Carter
2003/0149744 A1 8/2003 Bierre et al.
2003/0152059 A1 8/2003 Odman
2003/0156742 A1 8/2003 Witt et al.
2003/0159040 A1 8/2003 Hashimoto et al.
2003/0163388 A1 8/2003 Beane
2003/0167207 A1 9/2003 Berardi et al.
2003/0169697 A1 9/2003 Suzuki et al.
2003/0172028 A1 9/2003 Abell et al.
2003/0172037 A1 9/2003 Jung et al.
2003/0174839 A1 9/2003 Yamagata et al.
2003/0176218 A1 9/2003 Lemay et al.
2003/0177102 A1 9/2003 Robinson
2003/0186739 A1 10/2003 Paulsen et al.
2003/0187787 A1 10/2003 Freund
2003/0189092 A1 10/2003 Takano
2003/0195842 A1 10/2003 Reece
2003/0196084 A1 10/2003 Okereke et al.
2003/0199267 A1 10/2003 Iwasa et al.
2003/0204526 A1 10/2003 Salehi-Had
2003/0204721 A1 10/2003 Barrus et al.
2003/0213840 A1 11/2003 Livingston et al.
2003/0223394 A1 12/2003 Parantainen et al.
2003/0225703 A1 12/2003 Angel
2003/0226031 A1 12/2003 Proudler et al.
2003/0233458 A1 12/2003 Kwon et al.
2004/0002347 A1 1/2004 Hoctor et al.
2004/0015403 A1 1/2004 Moskowitz et al.
2004/0021552 A1 2/2004 Koo
2004/0022384 A1 2/2004 Flores et al.
2004/0025179 A1 2/2004 Russ et al.
2004/0029620 A1 2/2004 Karaoguz
2004/0029635 A1 2/2004 Giobbi
2004/0030764 A1 2/2004 Birk et al.
2004/0030894 A1 2/2004 Labrou et al.
2004/0035644 A1 2/2004 Ford et al.
2004/0039909 A1 2/2004 Cheng
2004/0043753 A1 3/2004 Wake et al.
2004/0044627 A1 3/2004 Russell et al.
2004/0048570 A1 3/2004 Oba et al.
2004/0048609 A1 3/2004 Kosaka
2004/0049687 A1 3/2004 Orsini et al.
2004/0059682 A1 3/2004 Hasumi et al.
2004/0059912 A1 3/2004 Zizzi
2004/0064728 A1 4/2004 Scheurich
2004/0068656 A1 4/2004 Lu
2004/0073792 A1 4/2004 Noble et al.
2004/0081127 A1 4/2004 Gardner et al.
2004/0082385 A1 4/2004 Silva et al.
2004/0088558 A1 5/2004 Candelore
2004/0090345 A1 5/2004 Hitt
2004/0092231 A1 5/2004 Ayatsuka et al.
2004/0098597 A1 5/2004 Giobbi
2004/0103061 A1 5/2004 Wood et al.
2004/0103062 A1 5/2004 Wood et al.
2004/0103064 A1 5/2004 Howard et al.
2004/0107169 A1* 6/2004 Lowe ...................... G06F 16/48
707/999.009
2004/0114563 A1 6/2004 Shvodian
2004/0117644 A1 6/2004 Colvin
2004/0123106 A1 6/2004 D'Angelo et al.
2004/0123107 A1 6/2004 Miyazaki et al.
2004/0123127 A1 6/2004 Teicher et al.
2004/0127277 A1 7/2004 Walker et al.
2004/0128162 A1 7/2004 Schlotterbeck et al.
2004/0128389 A1 7/2004 Kopchik
2004/0128500 A1 7/2004 Cihula et al.
2004/0128508 A1 7/2004 Wheeler et al.
2004/0128519 A1 7/2004 Klinger et al.
2004/0129787 A1 7/2004 Saito et al.
2004/0132432 A1 7/2004 Moores et al.
2004/0137912 A1 7/2004 Lin
2004/0153344 A1 8/2004 Bui et al.
2004/0153649 A1 8/2004 Rhoads et al.
2004/0158746 A1 8/2004 Hu et al.
2004/0166875 A1 8/2004 Jenkins et al.
2004/0167465 A1 8/2004 Mihai et al.
2004/0176032 A1 9/2004 Kotola et al.
2004/0181695 A1 9/2004 Walker
2004/0193925 A1 9/2004 Safriel
2004/0194133 A1 9/2004 Ikeda et al.
2004/0201755 A1 10/2004 Norskog
2004/0203566 A1 10/2004 Leung
2004/0203885 A1 10/2004 Quaid
2004/0203923 A1 10/2004 Mullen
2004/0208139 A1 10/2004 Iwamura
2004/0209690 A1 10/2004 Bruzzese et al.
2004/0209692 A1 10/2004 Schober et al.
2004/0214582 A1 10/2004 Lan et al.
2004/0215615 A1 10/2004 Larsson et al.

(56) References Cited

U.S. PATENT DOCUMENTS

2004/0217859 A1 11/2004 Pucci et al.
2004/0218581 A1 11/2004 Cattaneo
2004/0222877 A1 11/2004 Teramura et al.
2004/0230488 A1 11/2004 Beenau et al.
2004/0230809 A1 11/2004 Lowensohn et al.
2004/0234117 A1 11/2004 Tibor
2004/0238621 A1 12/2004 Beenau et al.
2004/0243519 A1 12/2004 Perttila et al.
2004/0246103 A1 12/2004 Zukowski
2004/0246950 A1 12/2004 Parker et al.
2004/0250037 A1 12/2004 Takemura et al.
2004/0250074 A1 12/2004 Kilian-Kehr
2004/0252012 A1 12/2004 Beenau et al.
2004/0252659 A1 12/2004 Yun et al.
2004/0253996 A1 12/2004 Chen et al.
2004/0254837 A1 12/2004 Roshkoff
2004/0255139 A1 12/2004 Giobbi
2004/0255145 A1 12/2004 Chow
2004/0262384 A1 12/2004 Nishida et al.
2005/0001028 A1 1/2005 Zuili
2005/0001720 A1 1/2005 Mason et al.
2005/0002028 A1 1/2005 Kasapi et al.
2005/0005136 A1 1/2005 Chen et al.
2005/0006452 A1 1/2005 Aupperle et al.
2005/0009517 A1 1/2005 Maes
2005/0020322 A1 1/2005 Ruuska et al.
2005/0021369 A1 1/2005 Cohen et al.
2005/0021561 A1 1/2005 Noonan
2005/0023345 A1 2/2005 Furuyama et al.
2005/0025093 A1 2/2005 Yun et al.
2005/0028168 A1 2/2005 Marcjan
2005/0033703 A1 2/2005 Holdsworth
2005/0035897 A1 2/2005 Perl et al.
2005/0039027 A1 2/2005 Shapiro
2005/0040961 A1 2/2005 Tuttle
2005/0040968 A1 2/2005 Damarla et al.
2005/0044372 A1 2/2005 Aull et al.
2005/0044387 A1 2/2005 Ozolins
2005/0047386 A1 3/2005 Yi
2005/0049013 A1 3/2005 Chang et al.
2005/0050208 A1 3/2005 Chatani
2005/0050324 A1 3/2005 Corbett et al.
2005/0050367 A1 3/2005 Burger et al.
2005/0054431 A1 3/2005 Walker et al.
2005/0055242 A1 3/2005 Bello et al.
2005/0055244 A1 3/2005 Mullan et al.
2005/0058292 A1 3/2005 Diorio et al.
2005/0074126 A1 4/2005 Stanko
2005/0076242 A1 4/2005 Breuer
2005/0081040 A1 4/2005 Johnson et al.
2005/0084137 A1 4/2005 Kim et al.
2005/0085259 A1 4/2005 Conner et al.
2005/0086115 A1 4/2005 Pearson
2005/0086497 A1 4/2005 Nakayama
2005/0086501 A1 4/2005 Woo et al.
2005/0086515 A1 4/2005 Paris
2005/0089000 A1 4/2005 Bae et al.
2005/0090200 A1 4/2005 Karaoguz et al.
2005/0091338 A1 4/2005 de la Huerga
2005/0091553 A1 4/2005 Chien et al.
2005/0094657 A1 5/2005 Sung et al.
2005/0096053 A1 5/2005 Liu et al.
2005/0097037 A1 5/2005 Tibor
2005/0099824 A1 5/2005 Dowling et al.
2005/0105600 A1 5/2005 Culum et al.
2005/0105734 A1 5/2005 Buer et al.
2005/0107965 A1 5/2005 Kerr et al.
2005/0108164 A1 5/2005 Salafia et al.
2005/0109836 A1 5/2005 Ben-Aissa
2005/0109841 A1 5/2005 Ryan et al.
2005/0113070 A1 5/2005 Okabe
2005/0113102 A1 5/2005 Kwon et al.
2005/0114149 A1 5/2005 Rodriguez et al.
2005/0114150 A1 5/2005 Franklin
2005/0114654 A1 5/2005 Brackett et al.
2005/0116020 A1* 6/2005 Smolucha ........... G07F 17/3239
340/572.1
2005/0116050 A1 6/2005 Jei et al.
2005/0117530 A1 6/2005 Abraham et al.
2005/0119979 A1 6/2005 Murashita et al.
2005/0124294 A1 6/2005 Wentink
2005/0125258 A1 6/2005 Yellin et al.
2005/0136947 A1 6/2005 Llombart-Juan et al.
2005/0137827 A1 6/2005 Takamiya
2005/0137977 A1 6/2005 Wankmueller
2005/0138390 A1 6/2005 Adams et al.
2005/0138576 A1 6/2005 Baumert et al.
2005/0139656 A1 6/2005 Arnouse
2005/0141451 A1 6/2005 Yoon et al.
2005/0151623 A1 7/2005 von Hoffmann
2005/0152394 A1 7/2005 Cho
2005/0154897 A1 7/2005 Holloway et al.
2005/0161503 A1 7/2005 Remery et al.
2005/0165684 A1 7/2005 Jensen et al.
2005/0166063 A1 7/2005 Huang
2005/0167482 A1 8/2005 Ramachandran et al.
2005/0169292 A1 8/2005 Young
2005/0177716 A1 8/2005 Ginter et al.
2005/0180385 A1 8/2005 Jeong et al.
2005/0181875 A1 8/2005 Hoehne et al.
2005/0182661 A1 8/2005 Allard et al.
2005/0182975 A1 8/2005 Guo et al.
2005/0187368 A1 8/2005 Ebling et al.
2005/0187792 A1 8/2005 Harper
2005/0192748 A1 9/2005 Andric et al.
2005/0195975 A1 9/2005 Kawakita
2005/0198208 A1 9/2005 Nystrom
2005/0200453 A1 9/2005 Turner et al.
2005/0201389 A1 9/2005 Shimanuki et al.
2005/0203682 A1 9/2005 Omino et al.
2005/0203844 A1 9/2005 Ferguson et al.
2005/0210270 A1 9/2005 Rohatgi et al.
2005/0212657 A1 9/2005 Simon
2005/0215233 A1 9/2005 Perera et al.
2005/0216313 A1 9/2005 Claud et al.
2005/0216639 A1 9/2005 Sparer et al.
2005/0218215 A1 10/2005 Lauden
2005/0220046 A1 10/2005 Falck et al.
2005/0221869 A1 10/2005 Liu et al.
2005/0224573 A1 10/2005 Yoshizane et al.
2005/0229007 A1 10/2005 Bolle et al.
2005/0229240 A1 10/2005 Nanba
2005/0231328 A1 10/2005 Castle et al.
2005/0235364 A1 10/2005 Wilson
2005/0242921 A1 11/2005 Zimmerman et al.
2005/0243787 A1 11/2005 Hong et al.
2005/0249385 A1 11/2005 Kondo et al.
2005/0251688 A1 11/2005 Nanavati et al.
2005/0253683 A1 11/2005 Lowe
2005/0256878 A1 11/2005 Brown et al.
2005/0257102 A1 11/2005 Moyer et al.
2005/0258229 A1 11/2005 Minemura
2005/0264416 A1 12/2005 Maurer
2005/0265371 A1 12/2005 Sharma et al.
2005/0268111 A1 12/2005 Markham
2005/0269401 A1 12/2005 Spitzer et al.
2005/0272403 A1 12/2005 Ryu et al.
2005/0277385 A1 12/2005 Daum
2005/0278547 A1 12/2005 Hyndman et al.
2005/0281215 A1 12/2005 Budampati et al.
2005/0281320 A1 12/2005 Neugebauer
2005/0282558 A1 12/2005 Choi et al.
2005/0284932 A1 12/2005 Sukeda et al.
2005/0287985 A1 12/2005 Balfanz et al.
2005/0288015 A1 12/2005 Azizi et al.
2005/0288069 A1 12/2005 Arunan et al.
2005/0289473 A1 12/2005 Gustafson et al.
2006/0001525 A1 1/2006 Nitzan et al.
2006/0002349 A1 1/2006 Demirhan
2006/0005035 A1 1/2006 Coughlin
2006/0009216 A1 1/2006 Welnick et al.
2006/0014430 A1 1/2006 Liang et al.
2006/0022042 A1 2/2006 Smets et al.
2006/0022046 A1 2/2006 Iwamura

(56) References Cited

U.S. PATENT DOCUMENTS

| | | | |
|---|---|---|---|
| 2006/0022800 | A1 | 2/2006 | Krishna et al. |
| 2006/0025180 | A1 | 2/2006 | Rajkotia et al. |
| 2006/0026338 | A1 | 2/2006 | Ebara et al. |
| 2006/0026673 | A1 | 2/2006 | Tsuchida |
| 2006/0030279 | A1 | 2/2006 | Leabman |
| 2006/0030353 | A1 | 2/2006 | Jun |
| 2006/0034250 | A1 | 2/2006 | Kim et al. |
| 2006/0034492 | A1 | 2/2006 | Siegel et al. |
| 2006/0041746 | A1 | 2/2006 | Kirkup et al. |
| 2006/0046664 | A1 | 3/2006 | Paradiso et al. |
| 2006/0050742 | A1 | 3/2006 | Grandhi et al. |
| 2006/0053234 | A1 | 3/2006 | Kumar et al. |
| 2006/0058102 | A1 | 3/2006 | Nguyen et al. |
| 2006/0063575 | A1 | 3/2006 | Gatto et al. |
| 2006/0064320 | A1 | 3/2006 | Postrel |
| 2006/0064605 | A1 | 3/2006 | Giobbi |
| 2006/0065730 | A1 | 3/2006 | Quan et al. |
| 2006/0066441 | A1 | 3/2006 | Knadle et al. |
| 2006/0069814 | A1 | 3/2006 | Abraham et al. |
| 2006/0072586 | A1 | 4/2006 | Callaway et al. |
| 2006/0074713 | A1 | 4/2006 | Conry et al. |
| 2006/0075230 | A1 | 4/2006 | Baird et al. |
| 2006/0076401 | A1 | 4/2006 | Frerking |
| 2006/0078176 | A1 | 4/2006 | Abiko et al. |
| 2006/0087407 | A1 | 4/2006 | Stewart et al. |
| 2006/0089138 | A1 | 4/2006 | Smith et al. |
| 2006/0095369 | A1 | 5/2006 | Hofi |
| 2006/0095792 | A1 | 5/2006 | Hurtado et al. |
| 2006/0097882 | A1 | 5/2006 | Brinkerhoff et al. |
| 2006/0097949 | A1 | 5/2006 | Luebke et al. |
| 2006/0101506 | A1 | 5/2006 | Gallo et al. |
| 2006/0106645 | A1 | 5/2006 | Bergelson et al. |
| 2006/0110012 | A1 | 5/2006 | Ritter |
| 2006/0111955 | A1 | 5/2006 | Winter et al. |
| 2006/0112423 | A1 | 5/2006 | Mlladiego et al. |
| 2006/0113381 | A1 | 6/2006 | Hochstein et al. |
| 2006/0116935 | A1 | 6/2006 | Evans |
| 2006/0117013 | A1 | 6/2006 | Wada |
| 2006/0120287 | A1 | 6/2006 | Foti et al. |
| 2006/0129838 | A1 | 6/2006 | Chen et al. |
| 2006/0136728 | A1 | 6/2006 | Gentry et al. |
| 2006/0136742 | A1 | 6/2006 | Giobbi |
| 2006/0136997 | A1 | 6/2006 | Telek et al. |
| 2006/0143441 | A1 | 6/2006 | Giobbi |
| 2006/0144943 | A1 | 7/2006 | Kim |
| 2006/0156027 | A1 | 7/2006 | Blake |
| 2006/0158308 | A1 | 7/2006 | McMullen et al. |
| 2006/0163349 | A1 | 7/2006 | Neugebauer |
| 2006/0163350 | A1 | 7/2006 | Melton et al. |
| 2006/0165060 | A1 | 7/2006 | Dua |
| 2006/0169771 | A1 | 8/2006 | Brookner |
| 2006/0170530 | A1 | 8/2006 | Nwosu et al. |
| 2006/0170565 | A1 | 8/2006 | Husak et al. |
| 2006/0172700 | A1 | 8/2006 | Wu |
| 2006/0173846 | A1 | 8/2006 | Omae et al. |
| 2006/0173991 | A1 | 8/2006 | Piikivi |
| 2006/0174349 | A1 | 8/2006 | Cronce et al. |
| 2006/0183426 | A1 | 8/2006 | Graves et al. |
| 2006/0183462 | A1 | 8/2006 | Kolehmainen |
| 2006/0184531 | A1 | 8/2006 | Russlies |
| 2006/0184795 | A1 | 8/2006 | Doradla et al. |
| 2006/0185005 | A1 | 8/2006 | Graves et al. |
| 2006/0187029 | A1 | 8/2006 | Thomas |
| 2006/0190348 | A1 | 8/2006 | Ofer et al. |
| 2006/0190413 | A1 | 8/2006 | Harper |
| 2006/0194598 | A1 | 8/2006 | Kim et al. |
| 2006/0195576 | A1 | 8/2006 | Rinne et al. |
| 2006/0198337 | A1 | 9/2006 | Hoang et al. |
| 2006/0200467 | A1 | 9/2006 | Ohmori et al. |
| 2006/0205408 | A1 | 9/2006 | Nakagawa et al. |
| 2006/0208066 | A1 | 9/2006 | Finn et al. |
| 2006/0208853 | A1 | 9/2006 | Kung et al. |
| 2006/0218196 | A1 | 9/2006 | Kurita |
| 2006/0222042 | A1 | 10/2006 | Teramura et al. |
| 2006/0226950 | A1 | 10/2006 | Kanou et al. |
| 2006/0229909 | A1 | 10/2006 | Kaila et al. |
| 2006/0236373 | A1 | 10/2006 | Graves et al. |
| 2006/0237528 | A1 | 10/2006 | Bishop et al. |
| 2006/0238305 | A1 | 10/2006 | Loving et al. |
| 2006/0245620 | A1 | 11/2006 | Roques et al. |
| 2006/0258289 | A1 | 11/2006 | Dua |
| 2006/0268891 | A1 | 11/2006 | Heidari-Bateni et al. |
| 2006/0273176 | A1 | 12/2006 | Audebert et al. |
| 2006/0274711 | A1 | 12/2006 | Nelson et al. |
| 2006/0279412 | A1 | 12/2006 | Holland et al. |
| 2006/0286969 | A1 | 12/2006 | Talmor et al. |
| 2006/0288095 | A1 | 12/2006 | Torok et al. |
| 2006/0288233 | A1 | 12/2006 | Kozlay |
| 2006/0290473 | A1 | 12/2006 | Mahasenan et al. |
| 2006/0290519 | A1 | 12/2006 | Boate et al. |
| 2006/0290580 | A1 | 12/2006 | Noro et al. |
| 2006/0292986 | A1 | 12/2006 | Bitran et al. |
| 2006/0293925 | A1 | 12/2006 | Flom |
| 2006/0294388 | A1 | 12/2006 | Abraham et al. |
| 2007/0003111 | A1 | 1/2007 | Awatsu et al. |
| 2007/0005403 | A1 | 1/2007 | Kennedy et al. |
| 2007/0007331 | A1 | 1/2007 | Jasper et al. |
| 2007/0008070 | A1 | 1/2007 | Friedrich |
| 2007/0008916 | A1 | 1/2007 | Haugli et al. |
| 2007/0011724 | A1 | 1/2007 | Gonzalez et al. |
| 2007/0016637 | A1 | 1/2007 | Brawn et al. |
| 2007/0016800 | A1 | 1/2007 | Spottswood et al. |
| 2007/0019845 | A1 | 1/2007 | Kato |
| 2007/0029381 | A1 | 2/2007 | Braiman |
| 2007/0032225 | A1 | 2/2007 | Konicek et al. |
| 2007/0032288 | A1 | 2/2007 | Nelson et al. |
| 2007/0033072 | A1 | 2/2007 | Bildirici |
| 2007/0033150 | A1 | 2/2007 | Nwosu |
| 2007/0036396 | A1 | 2/2007 | Sugita et al. |
| 2007/0038751 | A1 | 2/2007 | Jorgensen |
| 2007/0039041 | A1 | 2/2007 | Davis |
| 2007/0043594 | A1 | 2/2007 | Lavergne |
| 2007/0050259 | A1 | 3/2007 | Wesley |
| 2007/0050398 | A1 | 3/2007 | Mochizuki |
| 2007/0050845 | A1 | 3/2007 | Das et al. |
| 2007/0051794 | A1 | 3/2007 | Glanz et al. |
| 2007/0051798 | A1 | 3/2007 | Kawai et al. |
| 2007/0055630 | A1 | 3/2007 | Gauthier et al. |
| 2007/0060095 | A1 | 3/2007 | Subrahmanya et al. |
| 2007/0060319 | A1 | 3/2007 | Block et al. |
| 2007/0061041 | A1 | 3/2007 | Zweig |
| 2007/0064742 | A1 | 3/2007 | Shvodian |
| 2007/0069852 | A1 | 3/2007 | Mo et al. |
| 2007/0070040 | A1 | 3/2007 | Chen et al. |
| 2007/0072636 | A1 | 3/2007 | Worfolk et al. |
| 2007/0073553 | A1 | 3/2007 | Flinn et al. |
| 2007/0078761 | A1 | 4/2007 | Kagan et al. |
| 2007/0084523 | A1 | 4/2007 | McLean et al. |
| 2007/0084913 | A1 | 4/2007 | Weston |
| 2007/0087682 | A1 | 4/2007 | DaCosta |
| 2007/0087834 | A1 | 4/2007 | Moser et al. |
| 2007/0090195 | A1 | 4/2007 | Kawamura et al. |
| 2007/0094088 | A1 | 4/2007 | Mastie et al. |
| 2007/0100507 | A1 | 5/2007 | Simon |
| 2007/0100939 | A1 | 5/2007 | Bagley et al. |
| 2007/0109117 | A1 | 5/2007 | Heitzmann et al. |
| 2007/0112676 | A1 | 5/2007 | Kontio et al. |
| 2007/0118891 | A1 | 5/2007 | Buer |
| 2007/0119923 | A1 | 5/2007 | Garrison et al. |
| 2007/0120643 | A1 | 5/2007 | Lee |
| 2007/0120651 | A1 | 5/2007 | Kobayashi et al. |
| 2007/0130025 | A1 | 6/2007 | Nakajima |
| 2007/0132586 | A1 | 6/2007 | Plocher et al. |
| 2007/0133478 | A1 | 6/2007 | Armbruster et al. |
| 2007/0136407 | A1 | 6/2007 | Rudelic |
| 2007/0142032 | A1 | 6/2007 | Balsillie |
| 2007/0143626 | A1 | 6/2007 | Okuda |
| 2007/0147332 | A1 | 6/2007 | Lappetelainen et al. |
| 2007/0152826 | A1 | 7/2007 | August et al. |
| 2007/0156850 | A1 | 7/2007 | Corrion |
| 2007/0157249 | A1 | 7/2007 | Cordray et al. |
| 2007/0158411 | A1 | 7/2007 | Krieg, Jr. |
| 2007/0159301 | A1 | 7/2007 | Hirt et al. |
| 2007/0159994 | A1 | 7/2007 | Brown et al. |

(56) References Cited

U.S. PATENT DOCUMENTS

2007/0164847 A1 7/2007 Crawford et al.
2007/0169121 A1 7/2007 Hunt et al.
2007/0174809 A1 7/2007 Brown et al.
2007/0174868 A1 7/2007 Hitaka
2007/0176756 A1 8/2007 Friedrich
2007/0176778 A1 8/2007 Ando et al.
2007/0180047 A1 8/2007 Dong et al.
2007/0187266 A1 8/2007 Porter et al.
2007/0192601 A1 8/2007 Spain et al.
2007/0194882 A1 8/2007 Yokota et al.
2007/0197261 A1 8/2007 Humbel
2007/0198436 A1 8/2007 Weiss
2007/0198848 A1 8/2007 Bjorn
2007/0204078 A1 8/2007 Boccon-Gibod et al.
2007/0205860 A1 9/2007 Jones et al.
2007/0205861 A1 9/2007 Nair et al.
2007/0207750 A1 9/2007 Brown et al.
2007/0213048 A1 9/2007 Trauberg
2007/0213090 A1 9/2007 Holmberg
2007/0214492 A1 9/2007 Gopi et al.
2007/0218921 A1 9/2007 Lee et al.
2007/0219926 A1 9/2007 Korn
2007/0220272 A1 9/2007 Campisi et al.
2007/0223403 A1 9/2007 Furuskar et al.
2007/0229260 A1 10/2007 Braun et al.
2007/0229268 A1 10/2007 Swan et al.
2007/0236332 A1 10/2007 Quan et al.
2007/0245157 A1 10/2007 Giobbi et al.
2007/0245158 A1 10/2007 Giobbi et al.
2007/0247366 A1 10/2007 Smith et al.
2007/0258626 A1 11/2007 Reiner
2007/0260883 A1 11/2007 Giobbi et al.
2007/0260888 A1 11/2007 Giobbi et al.
2007/0262134 A1 11/2007 Humphrey et al.
2007/0266257 A1 11/2007 Camaisa et al.
2007/0268862 A1 11/2007 Singh et al.
2007/0271194 A1 11/2007 Walker et al.
2007/0271433 A1 11/2007 Takemura
2007/0273517 A1 11/2007 Govind
2007/0277044 A1 11/2007 Graf et al.
2007/0280509 A1 12/2007 Owen et al.
2007/0285212 A1 12/2007 Rotzoll
2007/0285238 A1 12/2007 Batra
2007/0288263 A1 12/2007 Rodgers
2007/0288752 A1 12/2007 Chan
2007/0293155 A1 12/2007 Liao et al.
2007/0294755 A1 12/2007 Dadhia et al.
2007/0296544 A1 12/2007 Beenau et al.
2008/0001783 A1 1/2008 Cargonja et al.
2008/0005432 A1 1/2008 Kagawa
2008/0008359 A1 1/2008 Beenau et al.
2008/0011842 A1 1/2008 Curry et al.
2008/0012685 A1 1/2008 Friedrich et al.
2008/0012767 A1 1/2008 Caliri et al.
2008/0016004 A1 1/2008 Kurasaki et al.
2008/0019578 A1 1/2008 Saito et al.
2008/0028227 A1 1/2008 Sakurai
2008/0028453 A1 1/2008 Nguyen et al.
2008/0040609 A1 2/2008 Giobbi
2008/0046366 A1 2/2008 Bemmel et al.
2008/0046715 A1 2/2008 Balazs et al.
2008/0049700 A1 2/2008 Shah et al.
2008/0061941 A1 3/2008 Fischer et al.
2008/0065181 A1 3/2008 Stevenson
2008/0071577 A1 3/2008 Highley
2008/0072063 A1 3/2008 Takahashi et al.
2008/0080022 A1 4/2008 Gogulapati
2008/0088475 A1 4/2008 Martin
2008/0090548 A1 4/2008 Ramalingam
2008/0094228 A1 4/2008 Welch et al.
2008/0095359 A1 4/2008 Schreyer et al.
2008/0107089 A1 5/2008 Larsson et al.
2008/0109895 A1 5/2008 Janevski
2008/0111752 A1 5/2008 Lindackers et al.
2008/0127176 A1 5/2008 Lee et al.
2008/0129450 A1 6/2008 Riegebauer
2008/0129463 A1 6/2008 Tuttle
2008/0141361 A1 6/2008 Balfanz
2008/0142588 A1 6/2008 Blum
2008/0148351 A1 6/2008 Bhatia et al.
2008/0149705 A1 6/2008 Giobbi et al.
2008/0150678 A1 6/2008 Giobbi et al.
2008/0156866 A1 7/2008 McNeal
2008/0164997 A1 7/2008 Aritsuka et al.
2008/0169909 A1 7/2008 Park et al.
2008/0176713 A1 7/2008 Olivera et al.
2008/0180213 A1 7/2008 Flax
2008/0186166 A1 8/2008 Zhou et al.
2008/0188308 A1 8/2008 Shepherd et al.
2008/0195863 A1 8/2008 Kennedy
2008/0201768 A1 8/2008 Koo et al.
2008/0203107 A1 8/2008 Conley et al.
2008/0208016 A1 8/2008 Hughes et al.
2008/0209571 A1 8/2008 Bhaskar et al.
2008/0218416 A1 9/2008 Handy et al.
2008/0222701 A1 9/2008 Saaranen et al.
2008/0223918 A1 9/2008 Williams et al.
2008/0228524 A1 9/2008 Brown
2008/0235144 A1 9/2008 Phillips
2008/0238625 A1 10/2008 Rofougaran et al.
2008/0246613 A1 10/2008 Linstrom et al.
2008/0250388 A1 10/2008 Meyer et al.
2008/0251579 A1 10/2008 Larsen
2008/0278325 A1 11/2008 Zimman et al.
2008/0278327 A1 11/2008 Nierenberg et al.
2008/0289018 A1 11/2008 Kawaguchi
2008/0289030 A1 11/2008 Poplett
2008/0289032 A1 11/2008 Aoki et al.
2008/0303637 A1 12/2008 Gelbman et al.
2008/0306759 A1 12/2008 Ilkin et al.
2008/0313728 A1 12/2008 Pandrangi et al.
2008/0314971 A1 12/2008 Faith et al.
2008/0316002 A1* 12/2008 Brunet .................... H04B 5/00 340/10.41
2008/0316045 A1 12/2008 Sriharto et al.
2009/0002134 A1 1/2009 McAllister
2009/0006846 A1 1/2009 Rosenblatt
2009/0013191 A1 1/2009 Popowski
2009/0016573 A1 1/2009 McAfee et al.
2009/0024584 A1 1/2009 Dharap et al.
2009/0033464 A1 2/2009 Friedrich
2009/0033485 A1 2/2009 Naeve et al.
2009/0036164 A1 2/2009 Rowley
2009/0037326 A1 2/2009 Chitti et al.
2009/0040041 A1 2/2009 Janetis et al.
2009/0041309 A1 2/2009 Kim et al.
2009/0043253 A1 2/2009 Podaima
2009/0045916 A1 2/2009 Nitzan et al.
2009/0050686 A1 2/2009 Kon et al.
2009/0050688 A1 2/2009 Kon et al.
2009/0052389 A1 2/2009 Qin et al.
2009/0070146 A1 3/2009 Haider et al.
2009/0070219 A1 3/2009 D'Angelo et al.
2009/0075592 A1 3/2009 Nystrom et al.
2009/0076849 A1 3/2009 Diller
2009/0081996 A1 3/2009 Duggal et al.
2009/0085724 A1 4/2009 Naressi et al.
2009/0085748 A1 4/2009 Barnes et al.
2009/0094681 A1 4/2009 Sadler et al.
2009/0096580 A1 4/2009 Paananen
2009/0121890 A1 5/2009 Brown et al.
2009/0125401 A1 5/2009 Beenau et al.
2009/0138953 A1 5/2009 Lyon
2009/0140045 A1 6/2009 Evans
2009/0150762 A1 6/2009 Febonio et al.
2009/0157512 A1 6/2009 King
2009/0165123 A1 6/2009 Giobbi
2009/0176566 A1 7/2009 Kelly
2009/0177495 A1 7/2009 Abousy et al.
2009/0182582 A1 7/2009 Hammon
2009/0195461 A1 8/2009 Hirt
2009/0199206 A1 8/2009 Finkenzeller et al.
2009/0206992 A1 8/2009 Giobbi et al.
2009/0232362 A1 9/2009 Otsubo et al.

(56) References Cited

U.S. PATENT DOCUMENTS

| | | | |
|---|---|---|---|
| 2009/0237245 | A1 | 9/2009 | Brinton et al. |
| 2009/0237253 | A1 | 9/2009 | Neuwirth |
| 2009/0239667 | A1 | 9/2009 | Rowe et al. |
| 2009/0253516 | A1 | 10/2009 | Hartmann et al. |
| 2009/0254448 | A1 | 10/2009 | Giobbi |
| 2009/0254971 | A1 | 10/2009 | Herz et al. |
| 2009/0264712 | A1 | 10/2009 | Baldus et al. |
| 2009/0307764 | A1 | 12/2009 | Isobe et al. |
| 2009/0310514 | A1 | 12/2009 | Jeon et al. |
| 2009/0313689 | A1 | 12/2009 | Nystroem et al. |
| 2009/0319788 | A1 | 12/2009 | Zick et al. |
| 2009/0320118 | A1 | 12/2009 | Mueller et al. |
| 2009/0322510 | A1 | 12/2009 | Berger et al. |
| 2009/0322566 | A1 | 12/2009 | Shirakawa |
| 2009/0328182 | A1 | 12/2009 | Malakapalli et al. |
| 2010/0005526 | A1 | 1/2010 | Tsuji et al. |
| 2010/0007498 | A1 | 1/2010 | Jackson |
| 2010/0022239 | A1 | 1/2010 | Anzai |
| 2010/0022308 | A1 | 1/2010 | Hartmann et al. |
| 2010/0023074 | A1 | 1/2010 | Powers et al. |
| 2010/0037255 | A1 | 2/2010 | Sheehan et al. |
| 2010/0062743 | A1 | 3/2010 | Jonsson |
| 2010/0077214 | A1 | 3/2010 | Jogand-Coulomb et al. |
| 2010/0091987 | A1 | 4/2010 | Takahashi et al. |
| 2010/0117794 | A1 | 5/2010 | Adams et al. |
| 2010/0134257 | A1 | 6/2010 | Puleston et al. |
| 2010/0169442 | A1 | 7/2010 | Liu et al. |
| 2010/0169964 | A1 | 7/2010 | Liu et al. |
| 2010/0172567 | A1 | 7/2010 | Prokoski |
| 2010/0174911 | A1 | 7/2010 | Isshiki |
| 2010/0188226 | A1 | 7/2010 | Seder et al. |
| 2010/0214100 | A1 | 8/2010 | Page |
| 2010/0277283 | A1 | 11/2010 | Burkart et al. |
| 2010/0277286 | A1 | 11/2010 | Burkart et al. |
| 2010/0291896 | A1 | 11/2010 | Corda |
| 2010/0305843 | A1 | 12/2010 | Yan et al. |
| 2010/0328033 | A1 | 12/2010 | Kamei |
| 2011/0072034 | A1 | 3/2011 | Sly et al. |
| 2011/0072132 | A1 | 3/2011 | Shafer et al. |
| 2011/0082735 | A1 | 4/2011 | Kannan et al. |
| 2011/0085287 | A1 | 4/2011 | Ebrom et al. |
| 2011/0091136 | A1 | 4/2011 | Danch et al. |
| 2011/0116358 | A9 | 5/2011 | Li et al. |
| 2011/0126188 | A1 | 5/2011 | Bernstein et al. |
| 2011/0169668 | A1 | 7/2011 | Henriksson |
| 2011/0221568 | A1 | 9/2011 | Giobbi |
| 2011/0227740 | A1 | 9/2011 | Wohltjen |
| 2011/0238517 | A1 | 9/2011 | Ramalingam et al. |
| 2011/0246790 | A1 | 10/2011 | Koh et al. |
| 2011/0266348 | A1 | 11/2011 | Denniston, Jr. |
| 2011/0307599 | A1 | 12/2011 | Saretto et al. |
| 2012/0028609 | A1 | 2/2012 | Hruska |
| 2012/0030006 | A1 | 2/2012 | Yoder et al. |
| 2012/0069776 | A1 | 3/2012 | Caldwell et al. |
| 2012/0086571 | A1 | 4/2012 | Scalisi et al. |
| 2012/0182123 | A1 | 7/2012 | Butler et al. |
| 2012/0212322 | A1 | 8/2012 | Idsoee |
| 2012/0226451 | A1 | 9/2012 | Bacot et al. |
| 2012/0226565 | A1 | 9/2012 | Drozd |
| 2012/0226907 | A1 | 9/2012 | Hohberger et al. |
| 2012/0238287 | A1 | 9/2012 | Scherzer |
| 2012/0278188 | A1 | 11/2012 | Attar et al. |
| 2012/0300753 | A1 | 11/2012 | Brown et al. |
| 2012/0310720 | A1 | 12/2012 | Balsan et al. |
| 2013/0019295 | A1 | 1/2013 | Park et al. |
| 2013/0019323 | A1 | 1/2013 | Arvidsson et al. |
| 2013/0044111 | A1 | 2/2013 | Vangilder et al. |
| 2013/0111543 | A1 | 5/2013 | Brown et al. |
| 2013/0135082 | A1 | 5/2013 | Xian et al. |
| 2013/0179201 | A1 | 7/2013 | Fuerstenberg et al. |
| 2013/0219186 | A1 | 8/2013 | Giobbi et al. |
| 2013/0276140 | A1 | 10/2013 | Coffing et al. |
| 2013/0277425 | A1 | 10/2013 | Sharma et al. |
| 2013/0297514 | A1 | 11/2013 | Giobbi |
| 2013/0312082 | A1 | 11/2013 | Zu et al. |
| 2013/0315210 | A1 | 11/2013 | Brown et al. |
| 2013/0331063 | A1 | 12/2013 | Cormier et al. |
| 2014/0074696 | A1 | 3/2014 | Glaser |
| 2014/0147018 | A1 | 5/2014 | Argue et al. |
| 2014/0256511 | A1* | 9/2014 | Smith .................... G16H 20/30 482/8 |
| 2014/0266604 | A1 | 9/2014 | Masood et al. |
| 2014/0266713 | A1 | 9/2014 | Sehgal et al. |
| 2014/0337920 | A1 | 11/2014 | Giobbi |
| 2015/0026480 | A1 | 1/2015 | Giobbi et al. |
| 2015/0039451 | A1 | 2/2015 | Bonfiglio |
| 2015/0138330 | A1 | 5/2015 | Krishnamoorthi |
| 2015/0294293 | A1 | 10/2015 | Signarsson |
| 2015/0310385 | A1 | 10/2015 | King et al. |
| 2015/0310440 | A1 | 10/2015 | Hynes et al. |
| 2016/0005020 | A1 | 1/2016 | Fernando et al. |
| 2016/0093081 | A1 | 3/2016 | Kim et al. |
| 2016/0133123 | A1 | 5/2016 | Giobbi et al. |
| 2016/0171200 | A1 | 6/2016 | Giobbi |
| 2016/0203349 | A1 | 7/2016 | Giobbi |
| 2016/0205682 | A1 | 7/2016 | Brown et al. |
| 2016/0210614 | A1 | 7/2016 | Hall |
| 2016/0300236 | A1 | 10/2016 | Wiley et al. |
| 2016/0306956 | A1 | 10/2016 | Giobbi |
| 2017/0041315 | A1 | 2/2017 | Giobbi |
| 2017/0085564 | A1 | 3/2017 | Giobbi et al. |
| 2017/0091548 | A1 | 3/2017 | Agrawal et al. |
| 2017/0270738 | A1 | 9/2017 | Giobbi |
| 2017/0309165 | A1 | 10/2017 | Brown et al. |
| 2017/0353500 | A1 | 12/2017 | Jacobsen et al. |
| 2018/0019998 | A1 | 1/2018 | Giobbi |
| 2018/0129799 | A1 | 5/2018 | Giobbi |
| 2018/0322718 | A1 | 11/2018 | Qian et al. |
| 2018/0357475 | A1 | 12/2018 | Honda et al. |
| 2019/0065721 | A1 | 2/2019 | Giobbi |
| 2019/0172281 | A1 | 6/2019 | Einberg et al. |
| 2019/0260724 | A1 | 8/2019 | Hefetz et al. |
| 2019/0289562 | A1 | 9/2019 | Brown |
| 2020/0351873 | A1 | 11/2020 | Brown et al. |
| 2021/0219869 | A1 | 7/2021 | Ryu et al. |
| 2021/0241592 | A1 | 8/2021 | Allen et al. |
| 2022/0210643 | A1 | 6/2022 | Hynds et al. |

FOREIGN PATENT DOCUMENTS

| | | | |
|---|---|---|---|
| EP | 1600885 | A1 | 11/2005 |
| EP | 2937805 | A1 | 10/2015 |
| JP | 10-049604 | A | 2/1998 |
| WO | 90/06633 | A1 | 6/1990 |
| WO | 99/56429 | A1 | 11/1999 |
| WO | 00/62505 | A1 | 10/2000 |
| WO | 01/22724 | A1 | 3/2001 |
| WO | 01/35334 | A1 | 5/2001 |
| WO | 01/48714 | A1 | 7/2001 |
| WO | 01/75876 | A1 | 10/2001 |
| WO | 01/77790 | A1 | 10/2001 |
| WO | WO/2002/067009 | | 8/2002 |
| WO | 2004/010774 | A1 | 2/2004 |
| WO | 2004/038563 | A2 | 5/2004 |
| WO | 2005/031663 | A2 | 4/2005 |
| WO | 2005/050450 | A1 | 6/2005 |
| WO | 2005/086802 | A2 | 9/2005 |
| WO | 2005/104584 | A1 | 11/2005 |
| WO | 2007/087558 | A2 | 8/2007 |

OTHER PUBLICATIONS

Adams, "Meet the ZigBee Standard," Sensors Online, Jun. 2003, 7 pgs., archived at https://web.archive.org/web/20031008191032/http:/sensorsmag.com/articles/0603/14/pf_main.shtml.

Adams, "Zigbee vital in industrial applications," EE Times, Jul. 29, 2003, 3 pgs., archived at https://web.archive.org/web/20031013062940/http:/www.eetimes.com/story/OEG20030727S0002.

Blip Systems, "Mar. 8, 2004—Bluetooth at the office?" at least as early as Oct. 11, 2004, archived at https://web.archive.org/web/20041011094320/http:/www.blipsystems.com/Default.asp?ID=16&M=News&PID=25&NewsID=9.

(56) References Cited

OTHER PUBLICATIONS

Blip Systems, "BlipManager," at least as early as May 17, 2004, 1 pg., archived at https://web.archive.org/web/20040517050728/http:/www.blipsystems.com/Default.asp?ID=11.
Blip Systems, "BlipMobility," at least as early as Apr. 7, 2004, archived at https://web.archive.org/web/20040407212934/http:/www.blipsystems.com/Default.asp?ID=118.
Blip Systems, "BlipNet API," at least as early as May 18, 2004, 1 pg., archived at https://web.archive.org/web/20040518060132/http:/www.blipsystems.com/Default.asp?ID=92.
Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.
Blip Systems, "BlipNet Technical Overview," Mar. 2003, 30 pgs., archived at https://web.archive.org/web/20031012184406/http:/www.blipsystems.com/products_blipnet.shtml.
Blip Systems, "BlipNode," at least as early as May 16, 2004, 1 pg., archived at https://web.archive.org/web/20040516001554/http:/www.blipsystems.com/Default.asp?ID=10.
Blip Systems, "BlipServer," at least as early as May 17, 2004, 1 pg., archived at https://web.archive.org/web/20040517044955/http:/www.blipsystems.com/Default.asp?ID=9.
Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.
Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
Bluetooth Sig, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping_cart/products/product_detail.asp?sku=AU1823.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Disclosed Anonymously (Method and Apparatus for Mobile Identity Authentication)., An IP.com Prior Art Database Technical IP.com No. IPCOM000194545D., IP.com Electronic Publication Date: Mar. 29, 2010 (Year: 2010).
Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632, 16 pgs. , https://doi.org/10.1007/s10009-006-0014-x.
Eshed, "Bluetooth Wireless Technology Application for the Retail Market," published at www.tadlys.com on May 2001, 8 pgs.
Freescale Semicondutor, Inc., "Freescale Events," see ZigBee Open House Event, Aug. 18, 2004, 6 pgs., archived at https://web.archive.org/web/20040909082726/https://www.freescale.com/webapp/sps/site/overview.jsp?nodeId=02XPgQ7JgbBqJQ#zigbee_openhouse_04.
Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp?nodeId=02XPgQhHPRjdyB37087725.
Freescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.
Freescale Semiconductor, Inc., "ZigBeeTM," Freescale Semiconductor Wireless Standards, at least as early as Jun. 11, 2004, 2 pgs., archived at https://web.archive.org/web/20040611051834/http:/e-www.motorola.com/webapp/sps/site/overview.jsp?nodeId=02XPgQhHPRjdyB.
Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http:/www.freescale.com/webapp/sps/site/overview.jsp?nodeId=02XPgQ6988.
Freescale Semiconductor, Inc., "ZigBee Alliance Successfully Concludes First Multi-node Network Test," press release, Jul. 6, 2004, 2 pgs., archived at https://web.archive.org/web/20040717113733/http:/www.zigbee.org/documents/First-Multi-Node_Testing_FINAL_000.pdf.
Freescale Semiconductor, Inc., "ZigBeeTM Technology from Freescale," Freescale Semiconductor, Inc. white paper, 2004, 4 pgs., archived at https://web.archive.org/web/20050513024652/http:/www.freescale.com/files/wireless_comm/doc/brochure/BRZIGBEETECH.pdf.
Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1&nodeId=02XPgQhCQ6m6cy7103.
Freescale Semiconductor, Inc., M68HC08 microcontroller ordering web page, at least as early as Aug. 17, 2004, 5 pgs., archived at https://web.archive.org/web/20040817014804/http:/www.freescale.com/webapp/sps/site/taxonomy.jsp?nodeId=01624684498634.
IBM Corporation, "Tadlys' Bluetooth Wireless Local Network for Corporate," Wireless e-business, at least as early as May 6, 2004, 2 pgs., archived at https://web.archive.org/web/20040621130525/http://www.tadlys.com/media/downloads/Corporate%20PVDEE01005-3.pdf.
IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.
IEEE, "IEEE 802.15 WPANTM Task Group 4 (TG4)" exemplary web page, Aug. 24, 2004, 2 pgs., archived at https://web.archive.org/web/20040824085452/http:/www.ieee802.org/15/pub/TG4.html.
Korzeniowski, "First Intelligent, Wireless Consumer Devices About To Hit Market," TechNewsWorld, Jul. 28, 2004, 3 pgs., archived at https://web.archive.org/web/20040821061130/http:/www.technewsworld.com/story/35376.html%20com/.
Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.
MIT Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
MIT Computer Science and Artificial Intelligence Laboratory, "The Cricket Indoor Location System," at least as early as Nov. 19, 2004, 6 pgs., archived at https://web.archive.org/web/20041119183049/http://cricket.csail.mit.edu/.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http:/www.motorola.com/mediacenter/news/detail/0,1958,2743_2228_23,00.html.
Priyantha, "The Cricket Indoor Location System," Ph.D. thesis submitted to Department of Electrical Engineering and Computer Science, Massachusetts Institute of Technology, Jun. 2005, 199 pgs.
Rodriguez et al., "In-building location using Bluetooth," Proceedings of the International Workshop on Wireless Ad-Hoc Networks (IWWAN 2005), May 23-26, 2005, London, England, 7 pgs.

(56) References Cited

OTHER PUBLICATIONS

Tadlys Ltd., "Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.
Tadlys Ltd., "About Tadlys," at least as early as Apr. 5, 2001, 1 pg., archived at https://web.archive.org/web/20010405044249/http:/www.tadlys.com/about.html.
Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.
Tadlys Ltd., "First Demo of Distribution and Redemption of e-Coupons over Bluetooth," Tadlys Company News and Events, Jun. 5, 2001, 1 pg., archived at https://web.archive.org/web/20040601051516/http://tadlys.com/Pages/news_content.asp?iGlobalID=17.
Tadlys Ltd., "Operator Systems," at least as early as Nov. 1, 2004, 2 pgs., archived at https://web.archive.org/web/20041101101402/http://www.tadlys.com/media/downloads/operator_network.pdf.
Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGlobalID=16.
Tadlys Ltd., "Tadlys' Wire free networking solutions," Feb. 2001, 2 pgs., archived at https://web.archive.org/web/20010204012700/http:/www.tadlys.com/solutions.html.
Tadlys Ltd., "Wireless hospital network," at least as early as Jul. 1, 2004, 2 pgs., archived at https://web.archive.org/web/20040701105046/http://www.tadlys.com/media/downloads/tadlys_hospital_wireless_network.pdf.
Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.
Tadlys Ltd., "Corporate Systems," at least as early as Nov. 1, 2004, 2 pgs., archived at https://web.archive.org/web/20041101095441/http://www.tadlys.com/media/downloads/Corporate_network.pdf.
Thongthammachart et al., "Bluetooth Enables In-door Mobile Location Services," Proceedings of the 57th IEEE Semiannual Vehicular Technology Conference, Apr. 22-25, 2003, 5 pgs.
University of Birmingham, "PRISM: Probabilistic Symbolic Model Checker," at least as early as Aug. 3, 2004, 3 pgs., archived at https://web.archive.org/web/20040803193058/http://www.cs.bham.ac.uk/~dxp/prism/casestudies/index.html.
Weissman, "Indoor Location," Tadlys Ltd. white paper, at least as early as Oct. 31, 2004, 15 pgs., archived at https://web.archive.org/web/20041031125859/http:/www.tadlys.com/media/downloads/Indoors_Location_Systems.pdf.
ZigBee Alliance, "Welcome to the ZigBeeTM Alliance," exemplary web page, at least as early as Sep. 24, 2004, 2 pgs., archived at https://web.archive.org/web/20040924045517/http://zigbee.org/.
ZigBee Alliance, "ZigBee Specification," ZigBee Document 053474r06, Version 1.0, Dec. 14, 2004, 378 pgs.
ZigBee Alliance, "The ZigBeeTM Buzz Is Growing: New Low-Power Wireless Standard Opens Powerful Possibilities," Electronic Design, Jan. 12, 2004, 12 pgs., archived at https://web.archive.org/web/20040411172015/http:/www.elecdesign.com/Files/29/7186/7186_01.pdf.
ZigBee Alliance, "ZigBeeTM Positioned to Drive Wireless Networking in Building Automation, Industrial and Residential Control and Sensors Markets in 2004," press release, Feb. 17, 2004, 3 pgs., archived at https://web.archive.org/web/20040423220244/http:/www.zigbee.org/documents/04036r5ZB_MWG-Momentum-Release_FINAL.pdf.
Petition for Inter Partes Review of U.S. Pat. No. 10,698,989, Aug. 26, 2021, 3356 pgs.
Petition for Inter Partes Review of U.S. Pat. No. 8,352,730, Aug. 26, 2021, 2450 pgs.
Petition for Inter Partes Review of U.S. Pat. No. 9,298,905, Aug. 26, 2021, 1941 pgs.
Liu et al., "A Practical Guide to Biometric Security Technology," IT Pro, vol. 3, No. 1, Jan./Feb. 2001, pp. 27-32.
Machine translation of JPH10049604, 27 pages.
McIver et al., "Identification and Verification Working Together," Bioscrypt, White Paper. Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.
Micronas, "Micronas and Thomson Multimedia Showcase a New Copy Protection System that Will Drive the Future of Digital Television," www.micronas.com: Jan. 8, 2002, 3 pgs.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdfffiles1/nij/185030b.pdf, retrieved from http://web.archive.erg/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vitiles, "magicJack: Could It Be the Asterisk Killer?" Aug. 1, 2007, retrieved from http://nerdvittles.com/index.php?p=187 on or before Oct. 11, 2011, 2 pgs.
Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.
Noore, "Highly Robust Biometric Smart Card Design." IEEE Transactions on Consumer Electronics, vol. 46, No. 4, Nov. 2000, pp. 1059-1063.
Paget, "The Security Behind Secure Extranets," Enterprise Systems Journal, vol. 14, No. 12, Dec. 1999, 4 pgs.
Pash, "Automate proximity and location-based computer actions," Jun. 5, 2007, retrieved from http://lifehacker.com/265822/automate-proximity-and-location+based-computer-actionson or before Oct. 11, 2011, 3 ogs.
Pope et al., "Oasis Digital Signature Services: Digital Signing without the Headaches," IEEE Internet Computing, vol. 10, Sep./Oct. 2006, pp. 81-84.
Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.
Sapsford, "E-Business: Sound Waves Could Help Ease Web-Fraud Woes," Wall Street Journal, Aug. 14, 2000, p. B1.
Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.
Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.
Smart Card Alliance, "Contactless Technology for Secure Physical Access: Technology and Standards Choices," Smart Card Alliance, Oct. 2002, pp. 1-48.
Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.
Srivastava, "Is internet security a major issue with respect to the slow acceptance rate of digital signatures," Jan. 2, 2005, Computer Law & Security Report, pp. 392-404.
Thomson Multimedia, "Thomson multimedia unveils copy protection proposal designed to provide additional layer of digital content security," retrieved from www.thompson-multimedia.com/GB/06/c01/010530.htm on Mar. 4, 2002, May 30, 2001, 2 pgs.
Unixhelp, "What is a file?" Apr. 30, 1998, retrieved from unixhelp.ed.ac.uk/editors/whatisafile.html accessed Mar. 11, 2010 via http://waybackmachine.org/19980615000000*/http://unixhelp.ed.ac.uk/editors/whatisafile.html on Mar. 11, 2011, 1 pg.

(56) References Cited

OTHER PUBLICATIONS

Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
White, "How computers Work," Millennium Edition, 1999, Que Corporation, Indianapolis, IN, all pages.
Yoshida, "Content Protection Plan Targets Wireless Home Networks," EE Times, Jan. 11, 2002, retrieved from www.eetimes.com/story/OEG20020111S0060 on Mar. 4, 2002, 2 pgs.
Beaufour et al., "Personal servers as digital keys," Proceedings of the Second IEEE Annual Conference on Pervasive Computing and Communications, 2004, pp. 319-328, doi: 10.1109/PERCOM.2004.1276869.
Callaway, Wireless Sensor Networks: Architectures and Protocols, Jan. 1, 2004, Auerbach Publications, 366 pgs.
Dvorak, IEEE 802.15.4 and Zigbee Overview, Sep. 27, 2005, Motorola, 26 pgs.
Hester et al., "neuRFon(TM) Netform: A Self-Organizing Wireless Sensor Network", Oct. 14, 2002, Proceedings of the Eleventh International Conference on Computer Communications and Networks, pp. 364-369.
Honkanen et al., "Low End Extension for Bluetooth", Sep. 19, 2004, Proceedings of the 2004 IEEE Radio and Wireless Conference, Atlanta, GA, pp. 199-202.
Jonker et al., "Digital rights management in consumer electronics products," IEEE Signal Processing Magazine, vol. 21, No. 2, pp. 82-91, Mar. 2004, doi: 10.1109/MSP.2004.1276116.
Zhang et al., "A User-Centric M-Payment Solution," The ISG-Smart Card Centre and the Information Security Group, Royal Holloway, University of London, Egham, Surrey, TW20 0EX, UK, 2005, 8 pgs.
David et al., Security Issues for Contactless Smart Cards, Sep. 1, 1997, conference paper, available online at https://link.springer.com/chapter/10.1007/BFb0054029, 6 pgs.
Kuhn et al., Introduction to Public Key Technology and the Federal PKI Infrastructure, Feb. 26, 2001, National Institute of Standards and Technology, 54 pgs.
Petition for Inter Partes Review of U.S. Pat. No. 9,049,188, Aug. 26, 2021, 800 pgs.
Petition for Inter Partes Review of U.S. Pat. No. 9,235,700, Aug. 26, 2021, 466 pgs.
Request for Ex Parte Reexamination of U.S. Pat. No. 10,698,989, Jun. 8, 2022, 1505 pgs.
Request for Ex Parte Reexamination of U.S. Pat. No. 8,352,730, Jun. 8, 2022, 1401 pgs.
Request for Ex Parte Reexamination of U.S. Pat. No. 9,298,905, Jun. 8, 2022, 1123 pgs.
Smart Card Alliance, Contactless Payment and the Retail Point of Sale: Applications, Technologies and Transaction Models, Mar. 1, 2003, a Smart Card Alliance Report, 50 pgs.
Smart Card Alliance, Smart Card Alliance—The Alliance, Jan. 22, 2001, http://www.smartcardalliance.org, 1 pg.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8c0 on Jan. 7, 2007, 5 pgs.
Anonymous, "Firecrest Shows How Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
Biopay, LLC, "Frequently Asked Questions (FAQs) About BioPay," retrieved from http://www.biopay.com/faqs-lowes.asp on Jan. 7, 2007, 5 pgs.
BlueProximity, "BlueProximity—Leave it—it's locked, come back, it's back too . . . " Aug. 26, 2007, retrieved from http://blueproximity.sourceforge.net/viahttp://www.archive.org/ on or before Oct. 11, 2011, 1 pg.
Bluetooth Sig, Inc., "Bluetooth," www.bluetooth.com, Jun. 1, 2000, 8 pgs.
Bluetooth Sig, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (PoE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fall 2017, pp. 5-21.
Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet works," Millennium Edition, 1999, Que Corporation, Indianapolis, IN, all pages.
Hendron, "File Security, Keychains, Encryption, and More with Mac OS X (10.3+)" Apr. 4, 2005, downloaded from http://www.johnhendron.net/documents/OSX_Security.pdf on or before May 3, 2012, 30 pgs.
IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.
International Search Report and Written Opinion for International Application No. PCT/US04/38124, mailed Apr. 7, 2005, 10 pgs.

(56) References Cited

OTHER PUBLICATIONS

International Search Report and Written Opinion for International Application No. PCT/US05/00349, mailed Mar. 19, 2008, 10 pgs.
International Search Report and Written Opinion for International Application No. PCT/US05/07535, mailed Dec. 6, 2005, 6 pgs.
International Search Report and Written Opinion for International Application No. PCT/US05/43447, mailed Feb. 22, 2007, 7 pgs.
International Search Report and Written Opinion for International Application No. PCT/US05/46843, mailed Mar. 1, 2007, 10 pgs.
International Search Report and Written Opinion for International Application No. PCT/US07/11102, mailed Oct. 3, 2008, 11 pgs.
International Search Report and Written Opinion for International Application No. PCT/US07/11103, mailed Apr. 23, 2008, 9 pgs.
International Search Report and Written Opinion for International Application No. PCT/US07/11104, mailed Jun. 26, 2008, 9 pgs.
International Search Report and Written Opinion for International Application No. PCT/US07/11105, mailed Oct. 20, 2008, 10 pgs.
International Search Report and Written Opinion for International Application No. PCT/US08/83060, mailed Dec. 29, 2008, 9 pgs.
International Search Report and Written Opinion for International Application No. PCT/US08/87835, mailed Feb. 11, 2009, 8 pgs.
International Search Report and Written Opinion for International Application No. PCT/US09/34095, mailed Mar. 25, 2009, 11 pgs.
International Search Report and Written Opinion for International Application No. PCT/US2009/039943, mailed Jun. 1, 2009, 9 pgs.
International Search Report and Written Opinion for International Application No. PCT/US2014/037609, mailed Dec. 9, 2014, 13 pgs.
International Search Report for International Application No. PCT/US2001/049916, mailed on Apr. 25, 2002, 1 pg.
Jeyaprakash et al., "Secured Smart Card Using Palm Vein Biometric On-Card-Process," 2008 International Conference on Convergence and Hybrid Information Technology, 2008, pp. 548-551.
Katz et al., "Smart Cards and Biometrics in Privacy-Sensitive Secure Personal Identification System," May 2002, Smart Card Alliance, p. 1-29.
Kontzer, "Thomson Bets On Smart Cards For Video Encryption," www.informationweek.com, Jun. 7, 2001, 1 pg.
Lake, "Downloading for Dollars: Who said buying music off the Net would be easy?" Sound & Vision, Nov. 2000, pp. 137-138.
Lee et al., "Effects of dielectric superstrales on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.
Lewis, "Sony and Visa in On-Line Entertainment Venture," New York Times, vol. 145, Thurs. Ed., Nov. 16, 1995, 1 pg.
Schneier, Applied Cryptography, Second Edition: Protocols, Algorithms, and Source Doe in C, Jan. 1, 1996, John Wiley & Sons, Inc., 1027 pgs.
Serrao et al., "Protecting Digital Music Delivery and Consumption using the OCCAMM Project Framework," Proceedings of the Second International Conference on Web Delivering of Music, 2002, pp. 38-45, doi: 10.1109/WDM.2002.1176192.
Agourare et al., "Authentication and location control via RFID analysis," 2009 IEEE Conference on Emerging Technologies & Factory Automation, Sep. 1, 2009, 8 pgs.
Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.
Anonymous, "BluePayz: A Seamless Payment Method Using Bluetooth-Enabled Mobile Phones," IP.com Publication Date 2003—Jun. 20, 2003, https://priorart.ip.com/1 PCOM/000015495 (Year: 2003).
Feng Bao, et al., "Design of portable mobile devices based e-payment system and e-ticketing system with digital signature," 2001 International Conferences on Info-Tech and Info-Net. Proceedings (Cat. No. 01 EX479), Beijing, China, 2001, pp. 7-12 vol. 6, doi: 10.1109/ICII.2001.982996. (Year: 2001).
Y. Labrou, J. Agre, L. Ji, J. Molina and W .. -1. Chen, "Wireless wallet," The First Annual International Conference on Mobile and Ubiquitous Systems: Networking and Services, 2004. Mobiquitous 2004., Boston, MA, USA, 2004, pp. 32-41, doi: 10.1109/MOBIQ.2004.1331708. (Year: 2004).
NPL Search Terms (Year: 2023).
Anonymous, "BluePayz: A Seamless Payment Method Using Bluetooth-Enabled Mobile Phones," IP.com Publication Date 2003—Jun. 20, 2003, https://priorart.ip.eom/1 PCOM/000015495 (Year: 2003).
Beaufour, "Personal Servers as Digital Keys," Proceedings of the Second IEEE Annual Conference on Pervasive Computing and Communications (PERCQM'04), Mar. 14-17, 2004, pp. 319-328.
Blip Systems, BlipMobihty, at least as early as Apr. 7, 2004, archived at https://web. archive.org/web/20040407212934/http:/www. blipsystems.com/Default.asp?ID=1 18.
Chen et al."On Enhancing Biometric Authentication with Data Protection." KES2000. Fourth International Conference on Knowledge-Based Intelligent Engineering Systems and Allied Technologies. Proceedings (Cat. No. OOTH8516), vol. 1, Aug. 1, 2000, pp. 249-252.
Costa, "Imation USB 2.0 Micro Hard Drive," Nov. 22, 2005, retrieved from http://www.pcmag.eom/article2/0,2817,1892209,00.asp on or before Oct. 11, 2011, 2 pgs.
Dai et al., Toward Blockchain-Based Accounting and Assurance, Journal of Information Systems, vol. 31, No. 3, Fai 2017, pp. 5-21.
Lockton et al., RFID: The next serious threat to privacy, Ethics and Information Technology (2005) 7:221-231 (Year: 2006).
Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.
Reescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.
Rodriguez et al., "In-building location using Bluetooth," Proceedings of the International Workshop on Wreless Ad-Hoc Networks (IWWWVAN 2005), May 23-26, 2005, London, England, 7 pgs.
Schneier, Applied Cryptography, Second Edition: Protocols, Algorithms, and Source Doe in C, Jan. 1, 1996, John Wley & Sons, Inc., 1027 pgs.
SplashID, "SplashID—Secure Password Manager for PDA's and Smartphones," Mar. 8, 2007, retrieved from http://www.splashdata/com/splashid/via http://www.archive.org/on or before Oct. 11, 2011, 2 pgs.
Tadlys Ltd., "Bluetooth Glossary," at least as early as Jun. 2004, 12 pgs., archived at https://web. archive.org/web/20040531082349/http://www.tadlys.com/pages/Downloads_content.asp?intGlobalId=1.
Tadlys Ltd., "Indoor Location Networks," at least as early as Apr. 3, 2004, 1 pg., archived at https://web. archive.org/web/20040403200221/http:/www.tadlys.com/Pages/Product_content.asp?iGlobalId=2.
"How to find the serial number on TP-Link devices," https://www.tp-link.com/us/support/faq/503/ (last visited Apr. 15, 2024), 3 pgs.
Google Pixel Serial Number Guide, HomeServe webpage, https://www.homeserve.com/en-us/customers/find-serial-numberdevice-type/google/, 3 pgs.
NPL Search Terms (Year: 2024).
Product Identification Codes, https://www.uc.edu/content/dam/uc/ce/docs/OLLI/Page%20Content/PRODUCT%20IDENTIFICATION%20CODES%20BAR%20QR.pdf, last visited Apr. 19, 2024, 88 pgs.
Specification of the Bluetooth System, Wireless Connections Made Easy, v 1.0 B, Dec. 1, 1999, 440 pgs., Dec. 1, 1999.
UK IT Security Evaluation and Certification Scheme, UK IT Security Evaluation and Certification Scheme, Certification Report No. P165, Sony FeliCa Contactless Smart Card, Issue 1.0, Mar. 2002, 27 pgs., Mar. 1, 2002.
Machine generated English translation of JPH10049604 Shimadzu Corp.published Feb. 20, 1998. 33 pages, downloaded from Espacenet on Nov. 13, 2017.

(56) References Cited

OTHER PUBLICATIONS

"802.15.3b Part 15.3: Wireless Medium Access Control (MAC) and Physical Layer (PHY) Specifications for High Rate Wireless Personal Area Networks (WPANs)." IEEE-SA Standards Board, May 5, 2006.
"Get IEEE 802 Update." Nov. 9, 2018. 8 pgs.
"IEEE Standards Association." Terms of Use for IEEE Standards Publications Delivered in Electronic Form, IEEE, 2005, https://web.archive.org/web/20050529084555/standards.IEEE.org:80/getieee802/download/.
"IEEE." "get IEEE 802"(Tm) Home Page 2003, web.archive.org/web/20031008112815/standards.IEEE.org:80/getieee802/.
"IEEE." Welcome to Standards Information Network, Jun. 3, 2004, web.archive.org/web/20040603154924/standards.ieee.org:80/standardspress/.
Cai, et al. "A Novel Design of IEEE 802.15.3 Mac over Uwb." IEEE 60th Vehicular Technology Conference, 2004. VTC2004-Fall. 2004, vol. 7, pp. 5297-5301, doi: 10.1109/vetecf.2004.1405113.
Cooklev, Todor. "A Study of IEEE 802.11, 802.15, and 802.16." Wireless Communication Standards, Standards Information Network, IEEE Press, New York, NY, 2004, pp. 1-200.
Gilb, James P. K. "Draft Running Comment Resolution." IEEE P802.15 Working Group for Wireless Personal Area Networks (WPANs), Oct. 10, 2004, pp. 1-27.
Gilb, James P. K. Wireless Multimedia: A Guide to the IEEE 802.15.3 Standard. Standards Information Network, IEEE Press, 2004.
Guo, et al. "Intra-Superframe Power Management for IEEE 802.15.3 Wpan." IEEE Communications Letters, vol. 9, No. 3, Mar. 2005, pp. 228-230, doi: 10.1109/lcomm.2005.03023.
IEEE Computer Society, "IEEE Std 802. 15.3—Part 15.3: Wireless Medium Access Control (MAC) and Physical Layer (PHY) Specifications for High Rate Wireless Personal Area Networks (WPANs)," The Institute of electrical and Electronics Engineers, Inc., New York, NY, Oct. 1, 2003, 324 pgs.
Petition for Inter Partes Review of U.S. Pat. No. 10,698,989, Mar. 18, 2025, 99 pgs.
Petition for Inter Partes Review of U.S. Patent No. 8,219, 129, Dec. 23, 2024, 102 pgs.
Petition for Inter Partes Review of U.S. Pat. No. 8,457,672, Dec. 23, 2024, 94 pgs.
Petition for Inter Partes Review of U.S. Patent No. 9,049, 188, Feb. 7, 2025, 84 pgs.
Petition for Inter Partes Review of U.S. Pat. No. 9,265,043, Dec. 23. 2024, 94 pgs.
Wang et al. "Comparison of IEEE 802.11e and IEEE 802. 15.3 MAC," 2004, pp. 675-680.
Zeng RanRan and Kuo, Geng-Sheng. "A Novel Scheduling Scheme and Mac Enhancements for IEEE 802.15.3 High-Rate WPAN." IEEE Wireless Communications and Networking Conference, 2005, vol. 4, pp. 2478-2483, doi: 10.1109/wcnc.2005.1424903.

* cited by examiner

BIOMETRIC AUTHENTICATION USING PROXIMITY AND SECURE INFORMATION ON A USER DEVICE

CROSS-REFERENCE TO RELATED APPLICATIONS

This application is a continuation of U.S. application Ser. No. 16/557,837, filed Aug. 30, 2019, titled "Biometric Authentication Using Proximity and Secure Information on a User Device," which is a continuation of and claims priority to U.S. application Ser. No. 14/996,159, filed Jan. 14, 2016, titled "Configuration of Interfaces for a Location Detection System and Application," which is a continuation and claims priority to U.S. application Ser. No. 11/939,427, filed Nov. 13, 2007, titled "Configuration of Interfaces for a Location Detection System and Application," which claims the benefit of priority under 35 U.S.C. § 119(e) of U.S. Provisional Application No. 60/865,596, filed on Nov. 13, 2006, titled "TrueProx Touch Technology/Bally," the entireties of which are hereby incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

BACKGROUND

1. Field of Art

The invention generally relates to a wireless identification system, and more specifically, to a player tracking system using wireless identification technology.

2. Description of the Related Art

Casinos and hotels constantly seek to enhance overall customer experience in order to improve business. By tracking a customer's spending and playing trends a casino can better personalize service to the customer. Traditionally, casinos and hotels utilize physical tracking systems including credit cards, guest room cards and casino player cards. Utilizing these devices, a casino/hotel can gain valuable information about a player's habits and develop marketing promotions, advertisements and reward programs to enhance the customer's experience.

Typically, a customer can obtain a player tracking card by providing basic contact and preference information to the casino/hotel. This information is used to establish a customer account linked to the player tracking card. The customer can use the card to makes purchases with the casino/hotel or to play casino games. Often, customers accumulate points in the linked account based on their spending and/or wagering. These points can later be redeemed for items such as room upgrades, free dinners or free game play. In some systems, players can deposit electronic funds into an account or establish a line of credit linked to the player tracking card. The card can then act like a debit card or credit line to provide funds for purchases or gaming.

There are several important disadvantages to the traditional player tracking systems. First, conventional player tracking systems rely on plastic cards using magnetic strip technology. The magnetic strips can wear down over time requiring that they be replaced. Second, in order for the casino to track any information, the player must insert the card into an electronic gaming machine and remember to remove it when finished. At staffed gaming tables, conventional tracking systems require that a player give his/her tracking card to the gaming staff that then manually enter information into the computer system. This is enough of an inconvenience that some players are discouraged from using tracking cards at all.

Another problem is that the casino is unable to gain any useful information about the player when the card is not being used. For example, the casino has no way of knowing if a customer stopped to look at a game, but chose not to play it. Thus, the casino is unable to provide targeting marketing, promotions or announcements to customers that are not currently gaming. The casino may miss valuable opportunities to up sell an offer or entice a non-player to begin wagering. Furthermore, the casino is unable to provide personalized service to the customer (e.g., drink delivery, food service, valet service, etc.) while the customer is not currently logged in to the player tracking system.

Yet another problem with traditional systems is that the tracking cards typically cannot be used for purposes other than gaming. For example, a casino/hotel guest may be given a separate card that acts as a room key and uses his/her own personal debit cards, credit cards or Automated Teller Machine (ATM) cards for various transactions. This creates an inconvenience for the customer who must carry and manage multiple cards. In view of the deficiencies above, there is a need for an improved player tracking system that will allow casinos/hotels to provide improved customer service to its patrons.

SUMMARY

According to one innovative aspect of the subject matter described in this disclosure, a system includes a portable electronic device with a secured memory including instructions that, when executed by the portable electronic device, causes the system to perform operations including: storing a biometric profile of a legitimate user in the secured memory of the portable electronic device, the portable electronic device having an identification code uniquely identifying the portable electronic device; acquiring biometric input from a user using a biometric reader of the portable electronic device responsive to receiving a request for a biometric authentication of the legitimate user; comparing the biometric input to the biometric profile to determine whether the biometric input matches the biometric profile; detecting whether the portable electronic device is within a predefined proximity of a reader device; and establishing a secure wireless communication link between the portable electronic device and the reader device for sending the identification code from the portable electronic device to the reader device responsive to a determination that the biometric input matches the biometric profile and detecting that the portable electronic device is within the predefined proximity of the reader device, the reader device sending information including the identification code to a trusted third-party system for authentication.

According to another innovative aspect of the subject matter described in this disclosure, a method comprises: storing a biometric profile of a legitimate user in a secured memory of a user device, the user device having an identification code uniquely identifying the user device; acquiring biometric input from a user using a biometric reader of the user device responsive to receiving a request for a biometric authentication of the legitimate user; comparing the biometric input to the biometric profile to determine whether the biometric input matches the biometric profile; detecting whether the user device is within a predefined proximity of a reader device; and establishing a secure wireless communication link between the user device and the reader device for sending the identification code from the user device to the reader device responsive to a determination that the biometric input matches the biometric profile and detecting that the user device is within the predefined proximity of the reader device, the reader device sending information including the identification code to a trusted third-party system for authentication.

The techniques introduced herein may optionally further include one or more of the following features. For example, the method further includes receiving information from the reader device that a transaction is authorized responsive to the trusted third-party system successfully authenticating the identification code and authorizing the transaction to be processed by the reader device. The method where the biometric profile is a picture profile and the picture profile includes a picture of the legitimate user or a representation of an image of the legitimate user. The method where the biometric reader of the user device is a camera. The method where acquiring the biometric input from the user includes detecting a positioning of a face of the user in front of the camera, and capturing an image of the user responsive to detecting the positioning of the face of the user in front of the camera. The method where comparing the biometric input to the biometric profile includes comparing the captured image of the user to the picture profile. The method where unlocking the user device is responsive to the determination that the biometric input matches the biometric profile. The method where comparing the biometric input to the biometric profile is triggered by an input provided on the user device. The method where storing the biometric profile of the legitimate user includes providing an interface to initialize the secured memory of the user device and initializing the secured memory by acquiring the biometric profile based on information provided by the legitimate user. The method further includes storing a transaction history of the user device in the secured memory of the user device, the transaction history including a name of a merchant, a purchase amount, and a credit card for each transaction. The method further includes registering the user device with the trusted third-party system. The method where the identification code uniquely identifying the user device is provided by the trusted third-party system for storage in the secured memory of the user device. The method where the transaction includes charging a credit card for a purchase. The method where the user device includes one from a group of a cell phone, a personal digital assistant, an identification tag, a mobile gaming device, a watch, a bracelet, a jewelry item, and a clothing item. The method where the reader device is operable on a same system as one from a group of an electronic gaming machine, a locking device, a self-service kiosk, an automated teller machine, and a point of sale terminal.

A system and method provides efficient and highly reliable customer and asset tracking. A portable, physical device, referred to herein as a Personal Digital Key (PDK) is carried by a customer or fixed to an asset. The PDK is adapted to wirelessly communicate with a receiver/decoder circuit (RDC). The RDC can be coupled to or integrated with a variety of electronic devices. The RDC wirelessly detects the PDK when the PDK enters a proximity zone of the RDC. A configuration module receives a PDK identification code identifying the PDK. The configuration module configures the operation of the electronic device based on the PDK identification code. In one embodiment, the operation of the electronic device is further configured based on an RDC identification code identifying the RDC.

In one embodiment, the configuration module determines PDK state information associated with the PDK identification and RDC state information associated with the RDC identification code. Based on the state information, the configuration module determines one or more available functions executable by the electronic device. The configuration module then configures either the electronic device, the PDK or both with a user interface based on the available functions. The configuration can also specify one more automated functions to be executed by the PDK, the electronic device or both.

In one embodiment, configuring the user interface comprises displaying a menu on a viewing screen showing a visual representation of the available functions. Soft keys on the viewing screen are assigned to menu options. Selection of a soft key causes the selected function to execute.

In one or more embodiment, the electronic device can comprise an electronic gaming machine, a hotel check in kiosk, a cashier kiosk, a location tracking processor, a display processor linked to a display or front end hardware to a server or network. Furthermore, the PDK can be carried by or fixed to a casino player, a hotel guest, an employee or an asset.

The features and advantages described in the specification are not all inclusive and in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
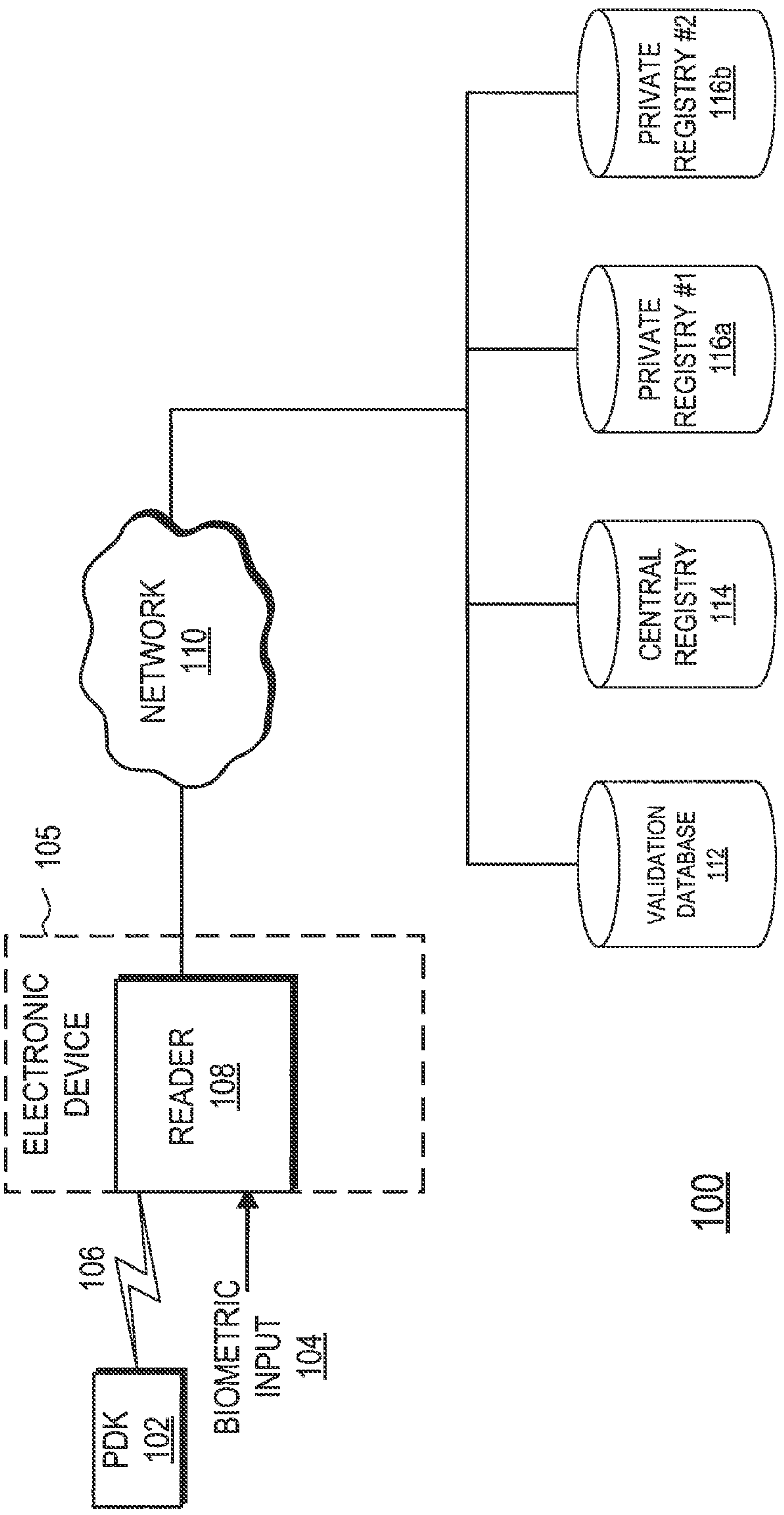
FIG. 1 is a high level block diagram illustrating a system for secure electronic authentication.

FIG. 1 is a high level block diagram illustrating a system for securely authenticating a personal digital key (PDK) 102 based upon proximity of the PDK 102 to a Reader 108. The system 100 comprises a PDK 102, a Reader 108, a network 110 and one or more external databases including a validation database 112, a Central Registry 114 and one or more private registries 116. The Reader 108 can be optionally embedded within or adapted to communicate (e.g., as a peripheral module to the device 105) with an existing electronic device 105. The Reader 108 is adapted to communicate with the PDK 102 by a wireless link 106 and is adapted to communicate with a network 110 by either a wired or wireless link. The Reader 108 is also optionally configured to receive a biometric input 104 from a user. The network 110 couples the validation database 112, the Central Registry 114 and the private registries 116 to the Reader 108. In alternative embodiments, different or additional external registries, databases or other devices may be coupled to the network 110. Furthermore, any number of electronic devices 105 and/or Readers 108 can be in communication with the network 110. In another embodiment, the Reader 108 operates as a standalone device without a connection to the network 110.

In one embodiment, the system 100 determines identity information associated with the PDK 102 and executes an authentication process. For example, the system 100 can determine if an individual is authorized for a transaction. The transaction could comprise, for example, executing a purchase or financial dealing, enabling access to physical and/or digital items, verifying identification or personal information or causing the electronic device 105 to execute one or more functions.

Generally, the Reader 108 wirelessly receives information stored in the PDK 102 that uniquely identifies the PDK 102 and the owner of the PDK 102. In one embodiment, the PDK "owner" is an individual carrying the PDK 102. In another embodiment, the owner may be a device or asset in which the PDK 102 is embedded or attached to. In some configurations, the Reader 108 is adapted to receive a biometric input 104 from an individual. Based on the received information, the Reader 108 initializes an authentication process for the PDK 102. Beneficially, the system 100 can provide comprehensive authentication without the need for PINs or passwords. Moreover, personal biometric information need not be stored in any local or remote storage database and is only stored on the user's own PDK 102. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual or fixed to an asset. The PDK 102 stores digital information in a tamper-proof format that uniquely associates the PDK 102 with the individual or asset. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary, that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in U.S. patent application Ser. No. 11/744,832 to John Giobbi, et al., entitled "Personal Digital Key Initialization and Registration For Secure Transaction" filed on May 5, 2007, the entire contents of which are incorporated herein by reference.

In one embodiment, the Reader 108 is integrated with an existing electronic device 105 to add proximity detection and authentication capabilities to the device 105. For example, in one embodiment, the electronic device 105 is a point of sale device for authorizing purchase transactions. In other embodiments, the electronic device 105 can be, for example, an electronic gaming machine, a self-service kiosk, a locking device, a display processor, front end hardware to a server or any other device modified to include a Reader 108. An example system including a Reader 108 adapted to operate with an electronic gaming system is described below with reference to FIG. 3B.

The Reader 108 wirelessly communicates with the PDK 102 when the PDK 102 is within a proximity zone of the Reader 108. The proximity zone can be, for example, several meters in radius and can be adjusted dynamically by the Reader 108. Thus, in contrast to many conventional RF ID devices, the Reader 108 can detect and communicate with the PDK 102 without requiring the owner to remove the PDK 102 from his/her pocket, wallet, purse, etc. Generally, the Reader 108 receives uniquely identifying information from the PDK 102 and initiates an authentication process. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment alleviates the need for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed by the Reader 108. For example, in purchase transactions, the validation database 112 is a credit card validation database that is separate from the merchant providing the sale. Alternatively, a different database may be used to validate different types of purchasing means such as a debit card, ATM card or bank account number.

The registries 114-116 are securely-accessible databases coupled to the network 110 that store, among other items, PDK, Notary and Reader information. In one embodiment, the registries 114-116 do not store biometric information. In an alternative embodiment, a registry stores biometric information in an encoded format that can only be recovered using an algorithm or encoding key stored in the PDK 102. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2A:
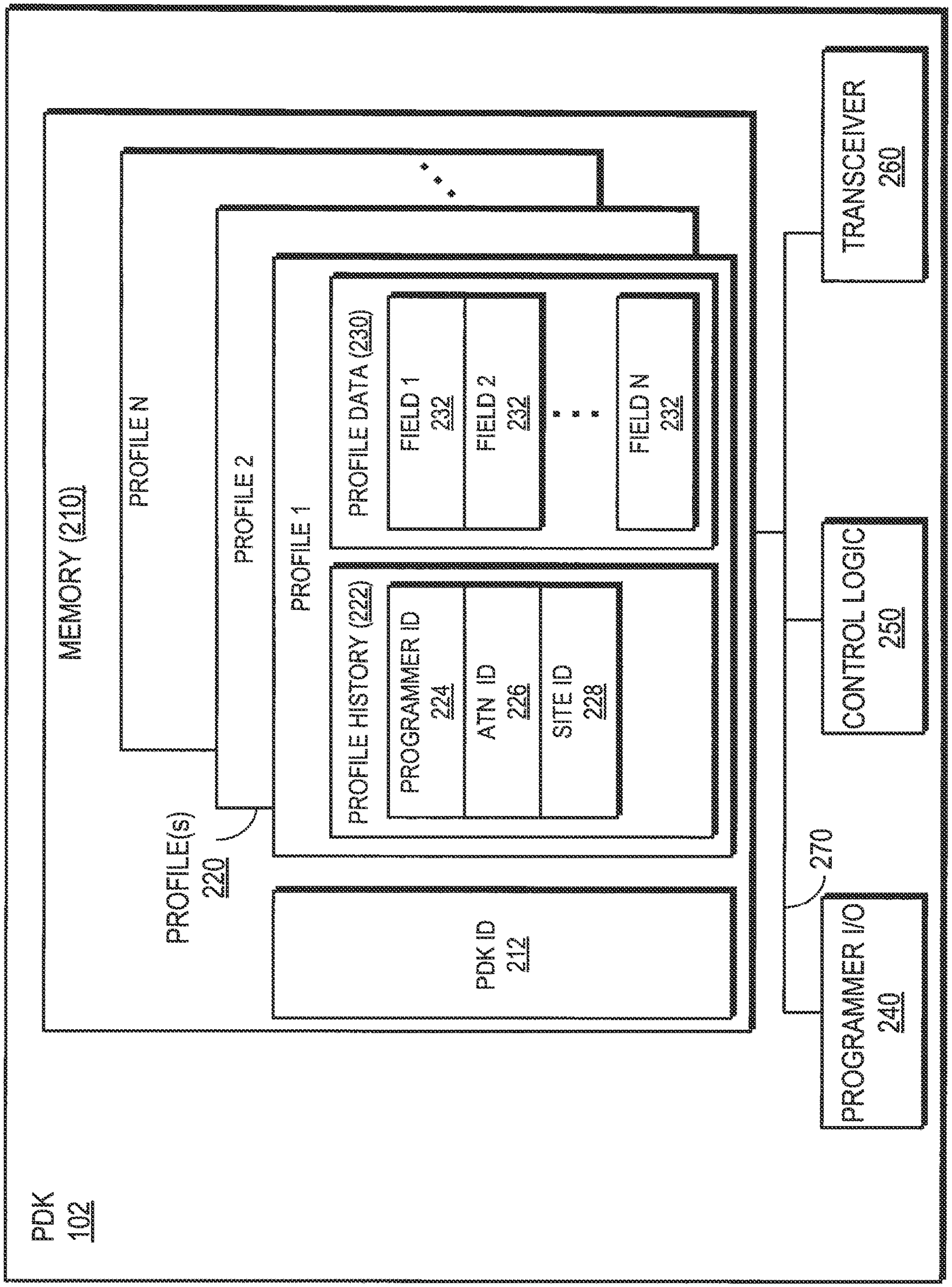
FIG. 2A is a block diagram illustrating one embodiment of a Personal Digital Key (PDK).

Turning now to FIG. 2A, an example embodiment of a PDK 102 is illustrated. The PDK 102 comprises a memory 210, a programmer I/O 240, control logic 250 and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA) or GPS unit, an employee identification tag, clothing or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain or in a wallet. In some embodiments, the PDK 102 can be combined or integrated with existing identification technology such as, for example, ID badges (or functionally similar devices), physical photograph(s), barcode encoded technology, magnetic strip technology, smartcard technology, data RFID technology or technologies utilizing uniquely identifiable graphical, textual or biometric information.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the biometric profile is further encoded using an encoding key and/or algorithm that is stored with the biometric profile data. Then, for authentication, both the biometric profile data and the encoding key and/or algorithm are passed to the Reader 108.

In one embodiment the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with reduced level of encryption while the full biometric profiles are only transmitted over secure channels. In the case of fingerprint authentication, for example, the biometric profile sample may represent only small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information are also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add or remove additional profiles, credit cards, personal information, etc. to the PDK 102 using a Programmer. For example, in one embodiment, a user that has unlocked his/her own PDK 102 can store additional biometric information (such as fingerprint information for other fingers) in his/her PDK 102. In another example, a user that cancels a credit card, can unlock his/her PDK 102 to remove the credit card information. In another embodiment, the user can make copies of the PDK 102 or move profiles from one PDK 102 to another once the PDK 102 is unlocked.

The profile history 222 includes a programmer ID field 224, a Notary ID 226 and a site ID field 228. The profile history 222 relates to the specific hardware, Notary and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in U.S. patent application Ser. No. 11/744,832 to John Giobbi, et al., entitled "Personal Digital Key Initialization and Registration For Secure Transaction" filed on May 5, 2007, the entire contents of which are incorporated herein by reference. The programmer I/O 240 can be, for example, a USB interface, serial interface, parallel interface or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 2B:
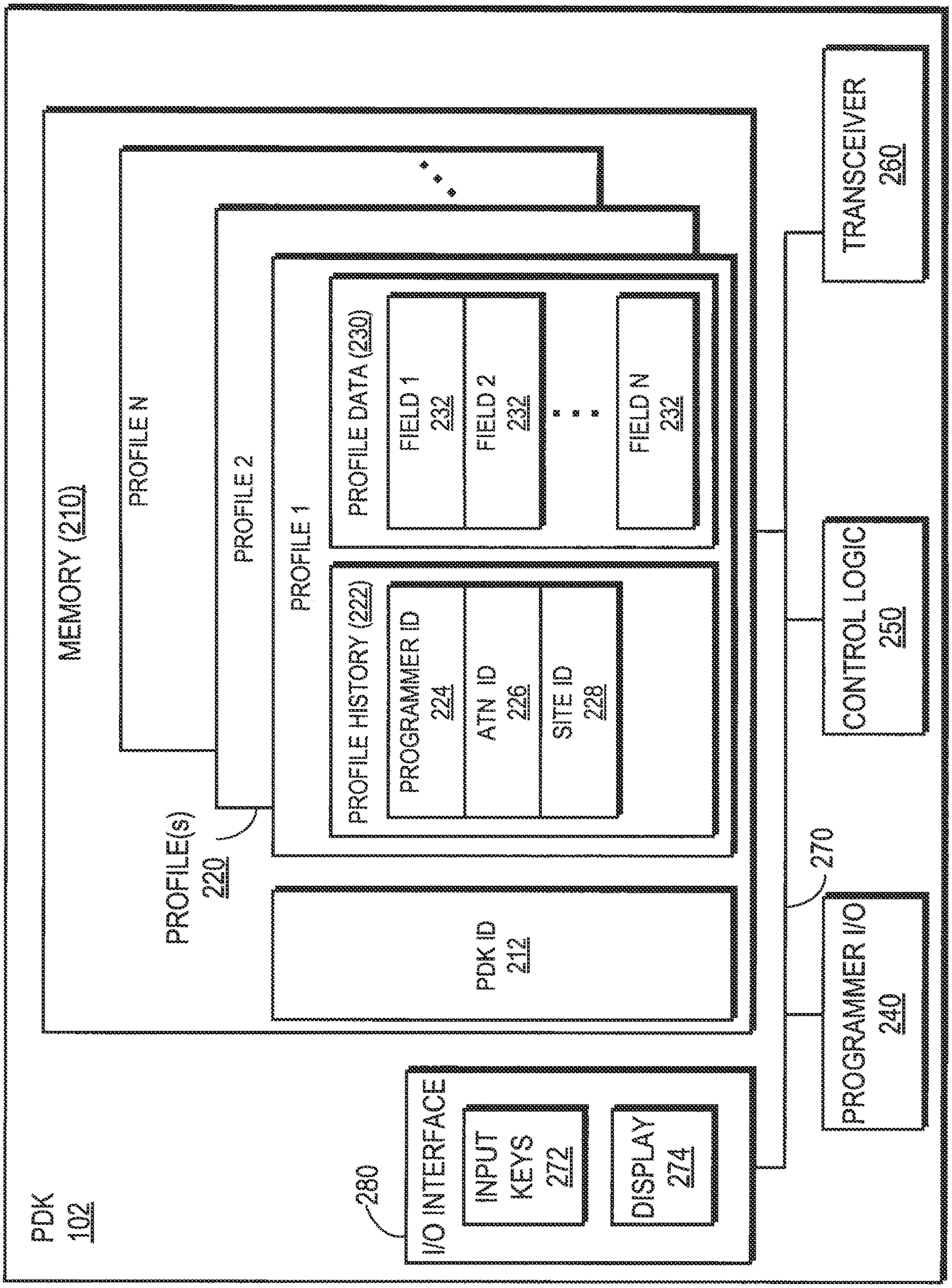
FIG. 2B is a block diagram illustrating another embodiment of a Personal Digital Key (PDK).

FIG. 2B illustrates an alternative embodiment of a PDK 102. This embodiment is similar to that illustrated in FIG. 2A but also includes an I/O interface 280. The I/O interface 280 includes a display 274 and input keys 272. The display 274 can be, for example, an organic light emitting diode display (OLED), a liquid crystal display (LCD) or one or more light emitting diodes (LEDs). In one embodiment, one or more of the input keys 272 are "soft" keys. The functions associated with soft keys can change dynamically depending on the particular use of the PDK 102.

Figure 3A:
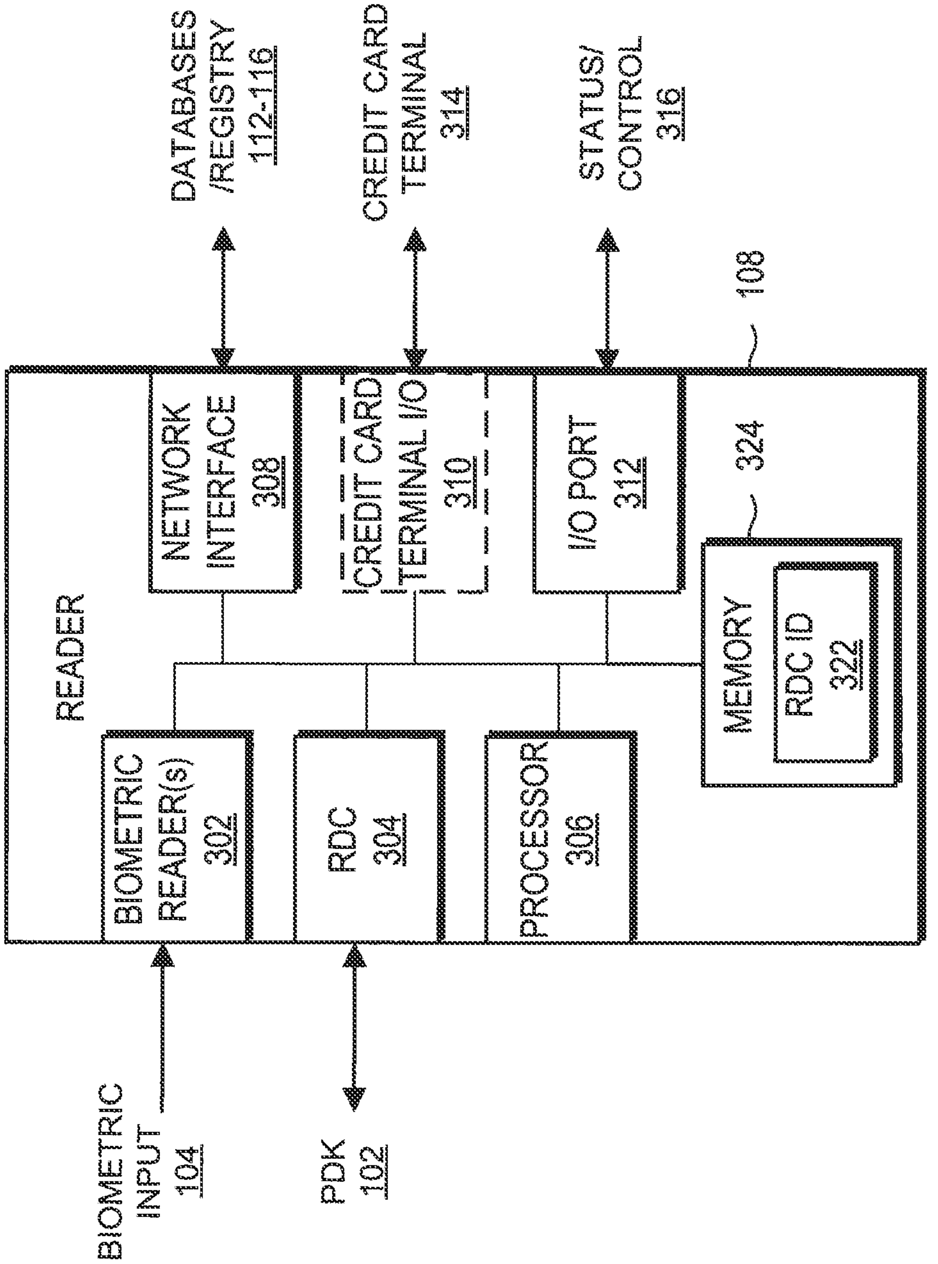
FIG. 3A is a block diagram illustrating one embodiment of a Reader.

Turning now to FIG. 3, an example embodiment of a Reader 108 is illustrated. The embodiment includes a receiver-decoder circuit (RDC) 304, a processor 306, a network interface 308, an I/O port 312, a memory 324 and optionally one or more biometric readers 302. In alternative embodiments, different or additional modules can be included in the Reader 108. For example, if the Reader 108 is integrated with an electronic device 105 already providing one or more of the illustrated modules, the Reader 108 may instead be adapted to communicate with the existing modules. For example, if the Reader 108 is integrated with an electronic gaming machine having a network interface, an embodiment of the Reader 108 may be used that does not include a separate network interface 308. Similarly, alternative embodiments of the Reader 108 may be adapted to use processing and/or memory resources of the electronic device 105.

The RDC 304 provides the two-way wireless interface between the Reader 108 and the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted or public, format.

In some configurations a biometric reader 302 receives and processes biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The memory 324 can be a read-only memory, a once-programmable memory, a read/write memory or any combination of memory types. The memory stores an RDC ID 322 that uniquely identifies the RDC 304. The RDC ID 322 can be used to distinguish a particular RDC 304 from other RDCs coupled to the network 110.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116.

For example, in one type of authentication, information is received from the PDK 102 at the RDC 304, processed by the processor 306 and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations and so on. Outputs can include, for example, status LEDs, an LCD or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

Figure 3B:
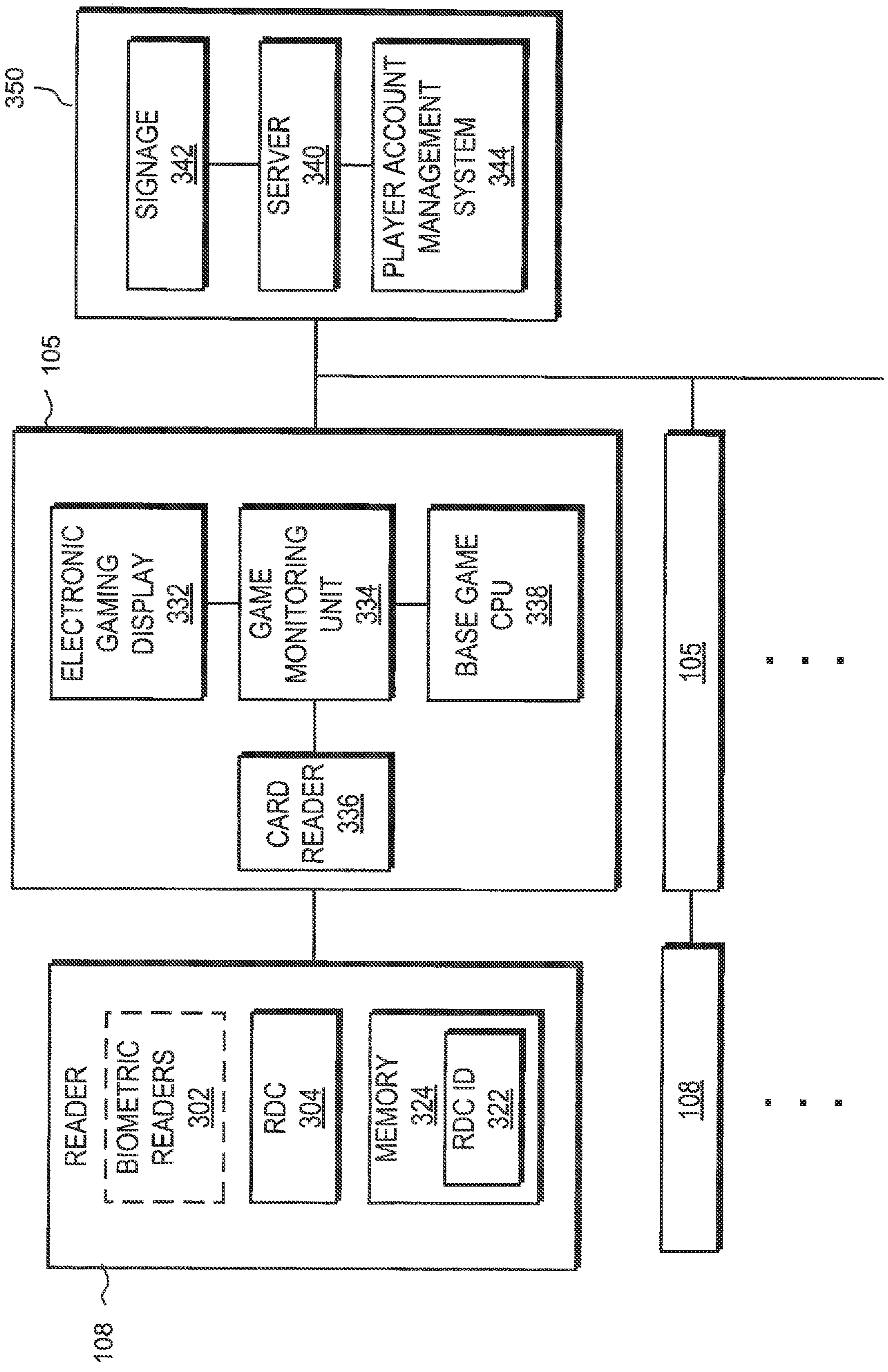
FIG. 3B is a block diagram illustrating another embodiment of a Reader for providing wireless player tracking to an electronic gaming environment.

FIG. 3B illustrates another embodiment of a Reader 108 for use with an electronic gaming machine 105. In this embodiment, the Reader 108 comprises an RDC 304, a memory 324 storing the RDC ID 322 and optionally a biometric reader 302. The Reader 108 adds components to an existing electronic gaming machine 105 to enable wireless capabilities and allows interaction between the electronic gaming machine 105 and a PDK 102. In one embodiment, the system comprises multiple electronic gaming systems 105 with Readers 108 coupled to a backend gaming system 350.

The electronic gaming machine 105 may be, for example, a slot machine, a video poker machine, video roulette, a keno machine, a video blackjack machine or any other casino gaming device. The electronic gaming system 105 includes an electronic gaming display 332, a game monitoring unit 334, a base game CPU 338 and a card reader 336. The electronic gaming display 332 can be, for example, an LCD, CRT or touch screen display that shows a graphical user interface for facilitating game play or providing player options. The base game CPU 338 executes gaming functions and performs processing to facilitate game play. The card reader 336 provides an interface for legacy player tracking cards and/or credit/debit cards. In one embodiment, the card reader 336 can be entirely replaced by the Reader 108. The game monitoring unit 334 facilitates player tracking functions and coordinates between the base game CPU 338, the card reader 336, the electronic gaming display and the Reader 108.

Any number of gaming machines 105 can communicate with a backend gaming system 350 comprising a server 340, a player account management system 344 and signage 342. The server 340 coordinates the flow of data between the gaming machines 105, the player account management system 344 and signage 342. The player account management system 344 manages player tracking features. The management system 344 can include databases and/or management software/hardware to track and manage player accounts, preferences, ratings, spending habits, etc. The server 340 can also control signage 342 throughout the property to display announcements, promotional offers or target advertisements based on player information received by the server 340.

In one embodiment, a Reader 108 is adapted to detect and prevent fraudulent use of PDKs that are lost, stolen, revoked, expired or otherwise invalid. For example, the Reader 108 can download lists of invalid PDKs IDs 212 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDK IDs 212. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send alarm signals indicating that the PDK 102 a stolen device. Here, a stolen PDK 102 can be tracked, located and recovered by monitoring the alarm signals. In one embodiment, the Reader 108 stores biometric or other identifying information from an individual that attempts to fraudulently use a PDK 102 so that the individual's identity can be determined.

Generally, the Reader 108 is configured to implement at least one type of authentication. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is implemented. For example, a Reader 108 may be configured to use only device authentication for low cost purchase transactions under a predefined amount (e.g., $25). The configuration is also useful in other types of low risk operations where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
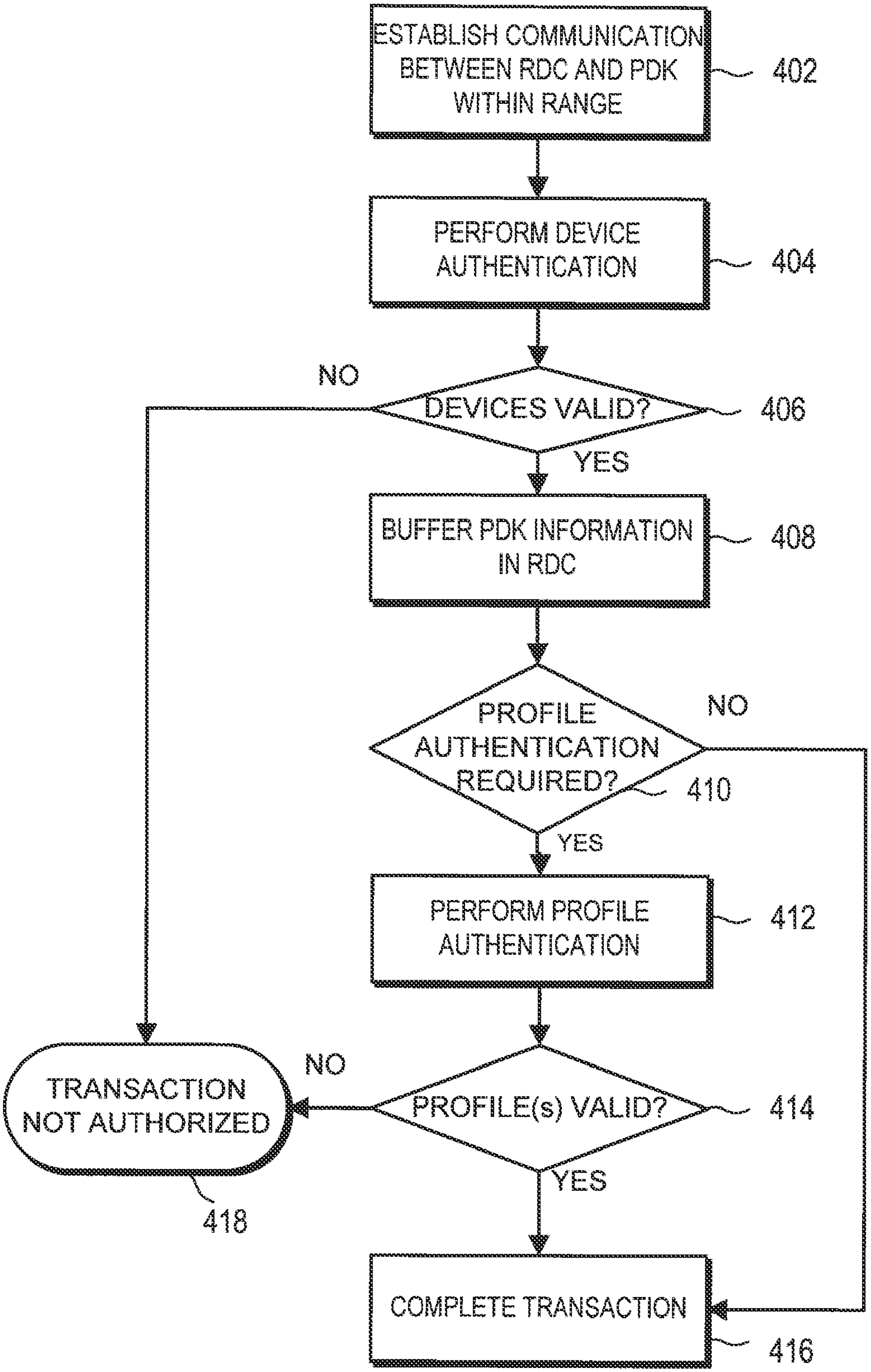
FIG. 4 is a flowchart illustrating one embodiment of a process for secure authentication.

FIG. 4 illustrates an example embodiment of a process for secure authentication of a PDK 102. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
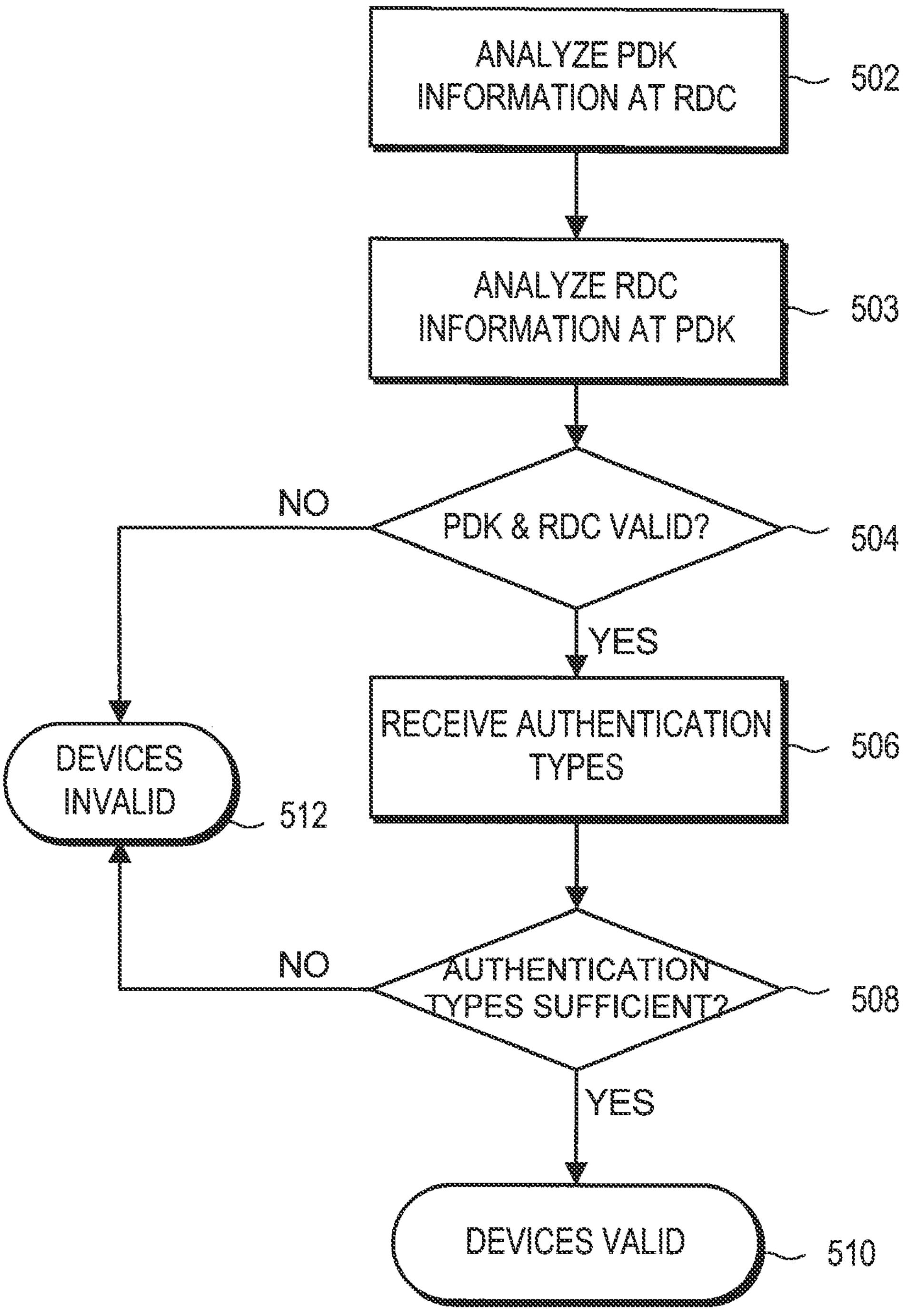
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes configuring the electronic device 105 to perform a set of functions. In another embodiment, completing 416 the transaction includes charging a credit card for a purchase. In alternative purchase transactions, bank information, debit/check/ATM card information, coupon codes or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
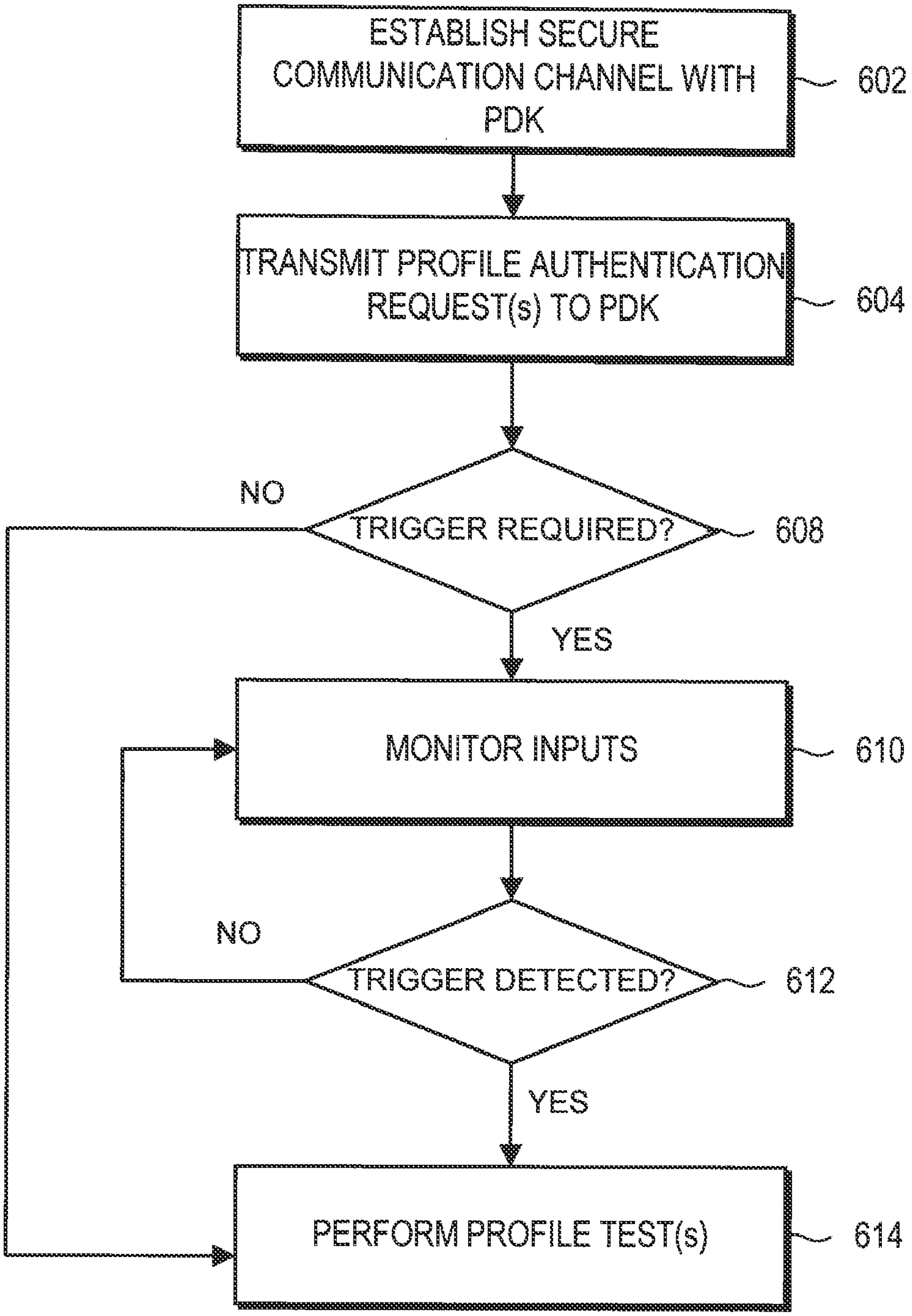
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert or a movie). When a PDK owner walks through the entrance, the Reader 108 detects the PDK 102 within range, authenticates the user and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication tests. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Figure 7A:
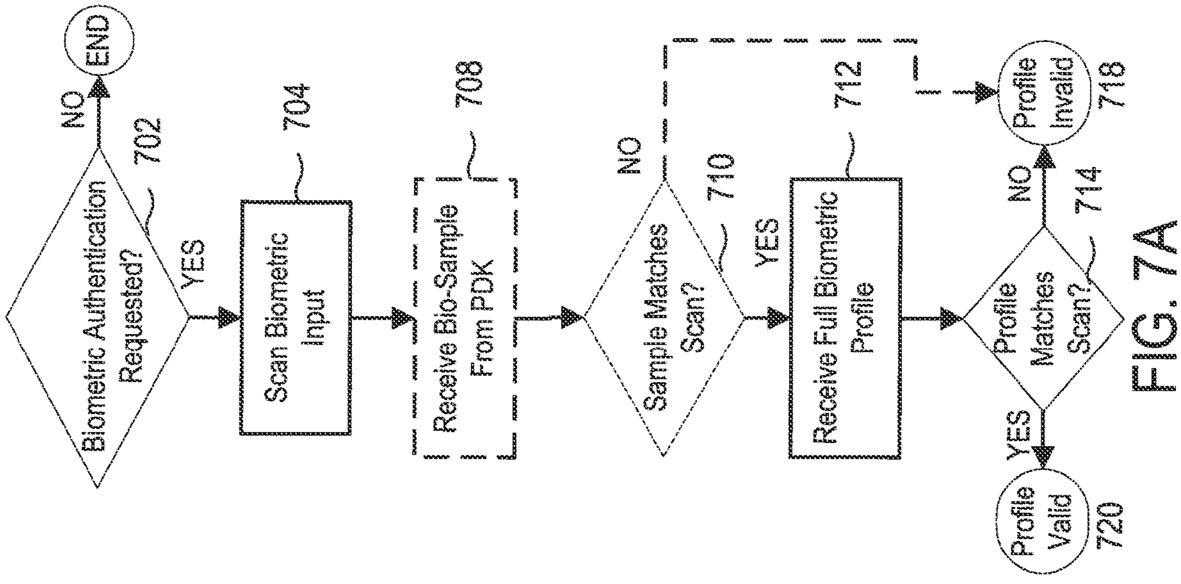
FIG. 7A is a flowchart illustrating one embodiment of a process for profile testing using a biometric input.

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed. In one embodiment, the biometric profile and/or biometric profile sample is encoded and transmitted to the Reader 108 along with an encoding key and/or algorithm. Then, the Reader 108 uses the encoding key and/or algorithm to recover the biometric profile and/or biometric profile sample. In another alternative embodiment, only the encoding key and/or algorithm is transmitted by the PDK 102 and the biometric profile data is recovered from a remote database in an encoded form that can then be decoded using the key and/or algorithm.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108 or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108 and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

Figure 7B:
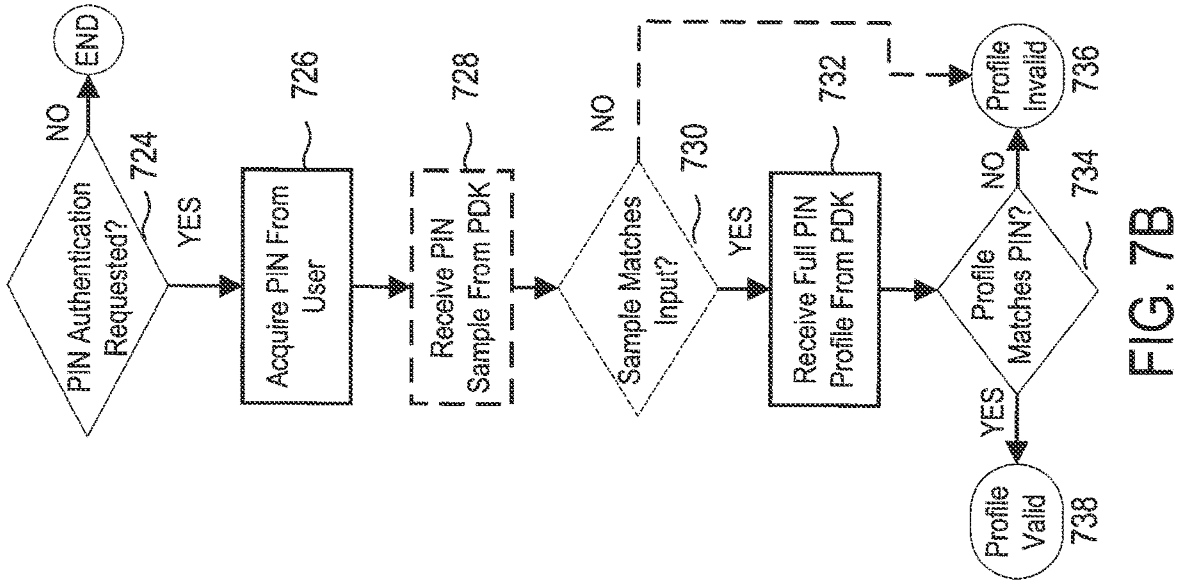
FIG. 7B is a flowchart illustrating one embodiment of a process for profile testing using a personal identification number.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figure 7D:
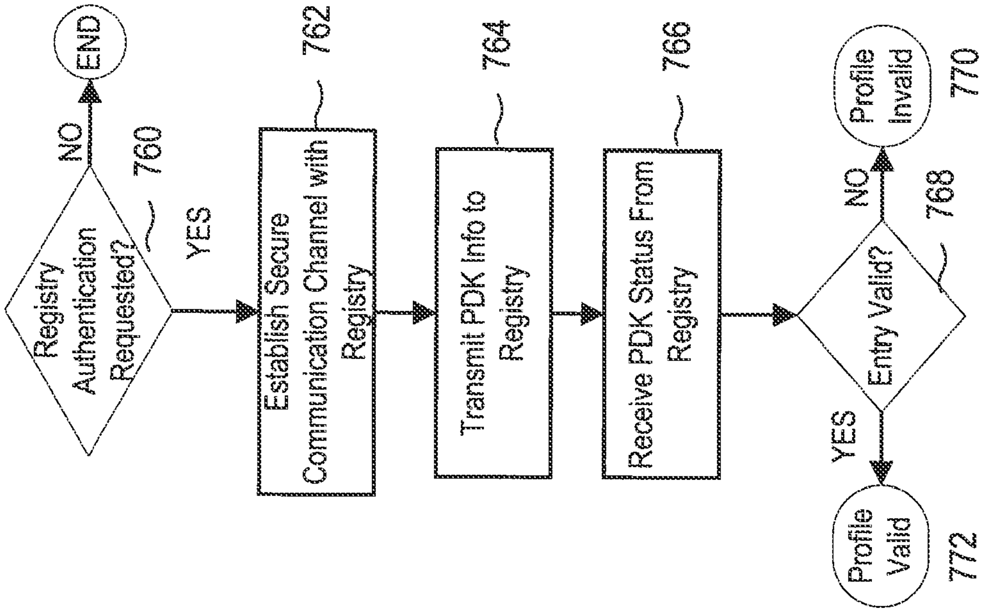
FIG. 7D is a flowchart illustrating one embodiment of a process for profile testing using a private or central registry.
Figure 7C:
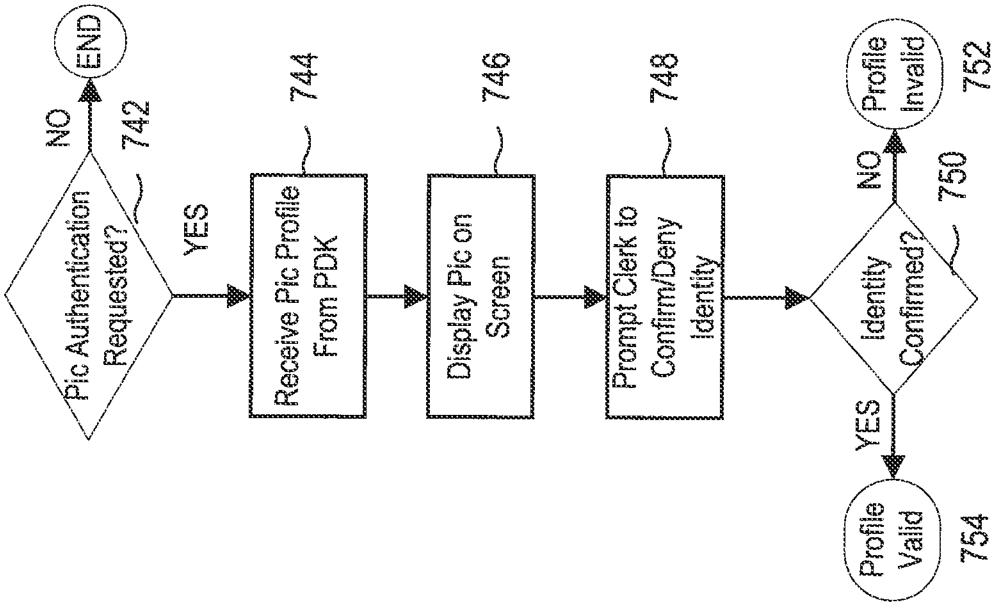
FIG. 7C is a flowchart illustrating one embodiment of a process for profile testing using a picture profile.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116 or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 8:
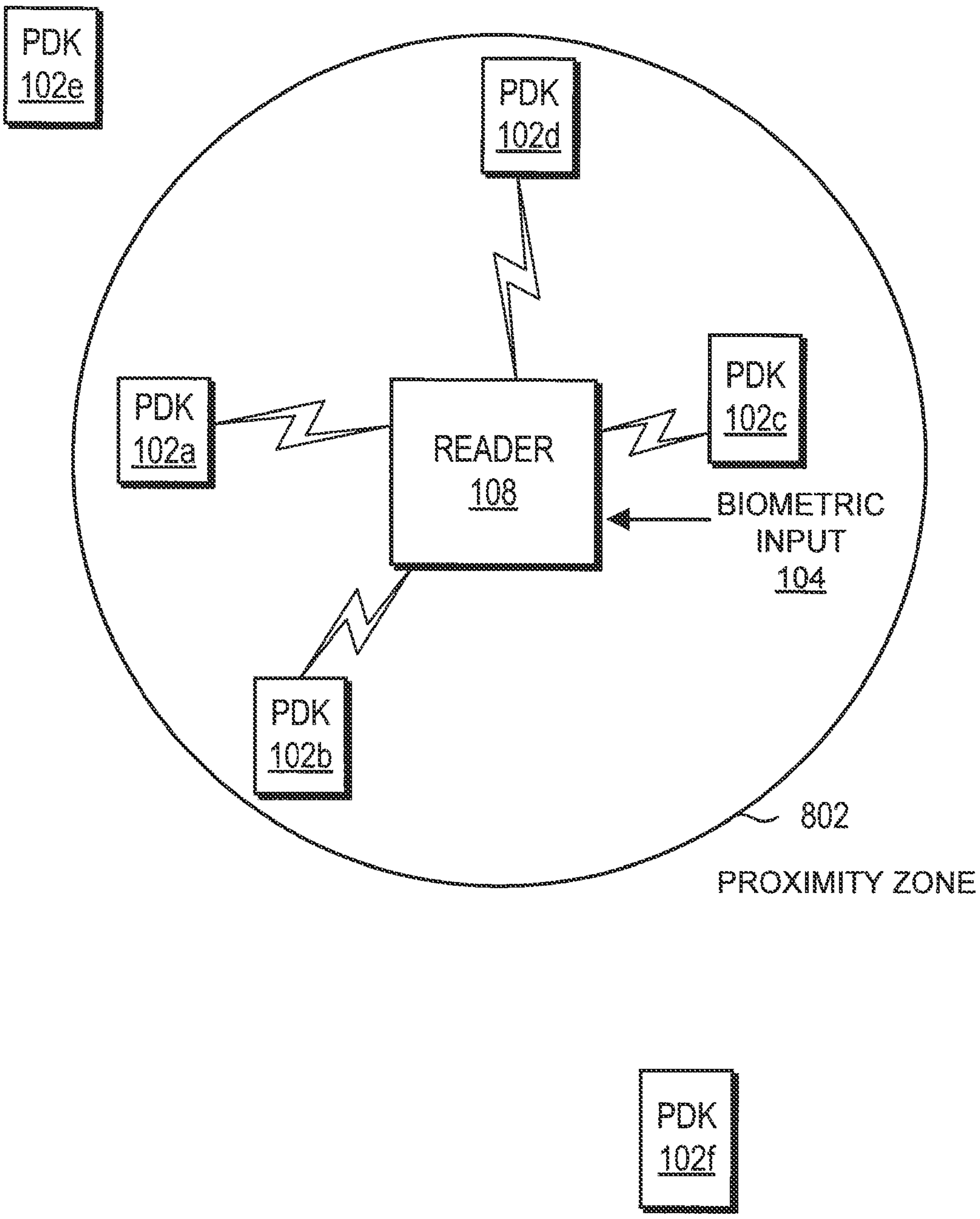
FIG. 8 illustrates an example scenario of a Reader operating in a congested area with multiple PDKs within its proximity zone.

Turning now to FIG. 8, a scenario is illustrated where multiple PDKs 102*a-e* are present near a Reader 108. This scenario is common when a Reader 108 is located in a high occupancy area such as, for example, a casino floor. Here, the Reader 108 can communicate with PDKs 102*a-d* within the proximity zone 802 and does not communicate with PDKs 102*e-f* outside the proximity zone 802. In one embodiment, the Reader 108 receives the unique PDK ID from a PDK 102 when it enters the proximity zone 802 and records its time of arrival. In one embodiment, the Reader 108 further initiates a device authentication of the PDK 102 after a predefined period of time (e.g., 5 seconds) that the PDK 102 is within the proximity zone 802. For profile authentication, the Reader 108 automatically determines which PDK 102 should be associated with an authentication test and the transaction. For example, if the Reader 108 receives a biometric input 104 from an individual, the Reader 108 automatically determines which PDK 102*a-d* is associated with the individual supplying the biometric input 104. In another embodiment, a different trigger is detected (e.g., a PIN input) to initiate the differentiation decision. In yet another embodiment, the differentiation decision is initiated without any trigger. It is noted that in some embodiments, where no trigger is required (such as a registry authentication), no differentiation decision is made and authentications are instead performed for each PDK 102 within the proximity zone 802.

Figure 9:
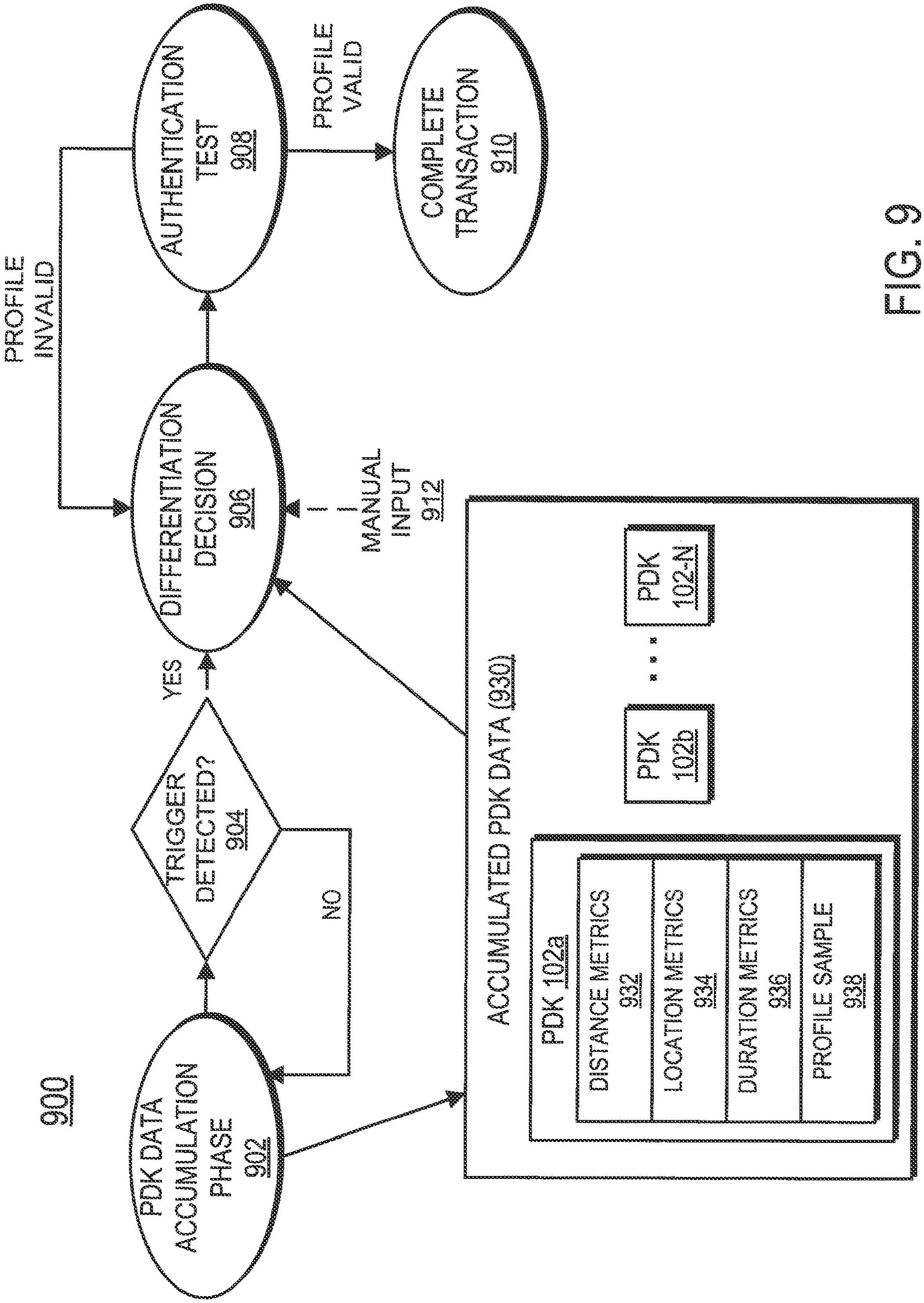
FIG. 9 is a flowchart illustrating one embodiment of a process for differentiating between multiple PDKs in completing a secure authentication process.

FIG. 9 illustrates an embodiment of an authentication process 900 for the scenario where multiple PDKs 102 are present within the proximity zone 802 of the Reader 108. In a PDK data accumulation phase 902, PDK data 930 is accumulated and buffered in the Reader 108 for any valid PDKs 102 that enter the proximity zone 802. In one embodiment, the accumulation phase 902 begins for a PDK 102 after it has been within the proximity zone for a predetermined period of time. In one embodiment, the PDK data accumulation phase 902 is similar to the steps 402-408 described above in detail with reference to FIG. 4 for each PDK 102*a-d* in the proximity zone 802.

As illustrated, the accumulated PDK data 930 includes one or more differentiation metrics from each valid PDK 102 within range of the Reader 108. The differentiation metrics can include any information that can be used by the Reader 108 to determine which PDK 102 should be associated with the authentication and/or transaction request. According to various embodiments, differentiation metrics can include one or more of distance metrics 932, location metrics 934 and duration metrics 936.

In one embodiment, a distance metric 932 indicates the relative distance of a PDK 102 to the Reader 108. This information is useful given that a PDK 102 having the shortest distance to the Reader 108 is generally more likely to be associated with a received authentication trigger (e.g., a biometric input, a PIN input or a transaction request). The distance metrics 932 can include, for example, bit error rates, packet error rates and/or signal strength of the PDKs 102. These communication measurements can be obtained using a number of conventional techniques that will be apparent to those of ordinary skill in the art. Generally, lower error rates and high signal strength indicate the PDK 102 is closer to the Reader 108.

Location metrics 934 can be used to determine a location of a PDK 102 and to track movement of a PDK 102 throughout an area. This information can be useful in determining the intent of the PDK holder to execute a transaction. For example, a PDK holder that moves in a direct path towards an electronic gaming machine and then stops in the vicinity of the electronic gaming machine is likely ready to begin wagering at the game. On the other hand, if the PDK moves back and forth from the vicinity of the electronic gaming machine, that PDK holder is likely to be browsing and not ready to play. Examples of systems for determining location metrics are described in more detail below with reference to FIGS. 10-11.

The differentiation metrics can also include duration metrics 936 that tracks the relative duration a PDK 102 remains within the proximity zone 802. Generally, the PDK 102 with the longest time duration within the proximity zone is most likely to be associated with the authentication request. For example, if the Reader 108 is busy processing a purchasing transaction at a cashier and another PDK 102 has a long duration within the proximity zone 802, it is likely that the user is waiting in line to make a purchase. In another example, a PDK 102 that has been in front of a gaming machine for a long period of time is a likely indicator that the player is ready to wager at the game. In one embodiment, the Reader 108 tracks duration 936 by starting a timer associated with a PDK 102 when the PDK 102 enters the proximity zone 802 and resetting the time to zero when the PDK exists.

In one embodiment, the Reader 108 can also receive and buffer profile samples 938 prior to the start of a profile authentication instead of during the authentication process as described in FIG. 7A-7B. In one embodiment, the Reader 108 determines which types of biometric profile samples 938 to request based on, for example, the configuration of the Reader 108, the type of transactions performed by the Reader 108 or manual requests from a clerk, security guard, etc. In one embodiment, the PDK 102 transmits one or more of the requested sample types based on profiles available in the PDK 102 and/or user preferences. In another embodiment, the PDK 102 transmits one or more samples 938 it has available and only samples that match the authentication types configured for the Reader 108 are buffered. For example, if a Reader 108 is configured for fingerprint authentication, a PDK 102 may transmit samples 938 for several different fingerprint profiles (each corresponding to a different finger, for example). It will be apparent to one of ordinary skill in the art that other variations are possible to provide flexibility in both the configuration of the Reader 108 for various types of authentication and flexibility for the PDK owner to determine which types of authentication to use.

Because profile samples 938 only comprise a subset of the profile information, in one embodiment, the samples can be safely transmitted over a public channel without needing any encryption. In another embodiment, the profile samples 938 are transmitted with at least some level of encryption. In yet another embodiment, some of the data is transmitted over a public communication channel and additional data is transmitted over a secure communication channel. In different configurations, other types of profile information can be accumulated in advance. For example, in one embodiment, a photograph from a picture profile can be obtained by the Reader 102 during the data accumulation phase 902. By accumulating the profile sample 938 or other additional information in advance, the Reader 108 can complete the authentication process more quickly because it does not wait to receive the information during authentication. This efficiency becomes increasingly important as the number of PDKs 102 within the proximity zone 802 at the time of the transaction becomes larger.

The PDK accumulation phase 902 continues until a trigger (e.g., detection of a biometric input) is detected 904 to initiate a profile authentication process. If a biometric input is received, for example, the Reader 108 computes a mathematical representation or hash of the input that can be compared to a biometric profile and computes one or more input samples from the biometric input. It is noted that in alternative embodiments, the process can continue without any trigger. For example, in one embodiment, the transaction can be initiated when a PDK 102 reaches a predefined distance from the Reader 108 or when the PDK 102 remains within the proximity zone 802 for a predetermined length of time.

The process then computes a differentiation decision 906 to determine which PDK 102*a-d* should be associated with the authentication. In one embodiment, the Reader 108 computes a differentiation result for each PDK using one or more of the accumulated data fields 930. For example, in one embodiment, the differentiation result is computed as a linear combination of weighted values representing one or more of the differentiation metrics. In another embodiment, a more complex function is used. The differentiation results of each PDK 102 are compared and a PDK 102 is selected that is most likely to be associated with the transaction.

In another embodiment, for example, in a photo authentication, the differentiation decision can be made manually by a clerk, security guard or other administrator that provides a manual input 912. In such an embodiment, a photograph from one or more PDKs 102 within the proximity zone 802 can be presented to the clerk, security guard or other administrator on a display and he/she can select which individual to associate with the transaction. In yet another configuration, the decision is made automatically by the Reader 108 but the clerk is given the option to override the decision.

An authentication test 908 is initiated for the selected PDK 102. The authentication test 908 can include one or more of the processes illustrated in FIGS. 7A-7D. Note that if profile samples 938 are acquired in advance, they need not be acquired again in the authentication steps of FIGS. 7A-7B. It is additionally noted that in one embodiment, the Reader 108 compares the profile samples 938 of the PDKs 102 to the computed input sample until a match is found before performing a full profile comparison. In one embodiment, the Reader first compares samples from the selected PDK 102 until a match is found. For example, a Reader 108 may have accumulated multiple fingerprint profiles samples 938 (e.g., corresponding to different fingers) for the selected PDK 102. The Reader 108 receives a fingerprint input from, for example, the left index finger, computes the input sample and does a quick comparison against the accumulated samples 938 for the selected PDK 102 to efficiently determine a matching profile. The Reader 108 then performs the full comparison using the matching profile. In an alternative embodiment, the Reader 108 performs a comparison of a first sample from each PDK 102 and if no match is found, performs comparisons of second samples from each PDK 102. It will be apparent to one of ordinary skill in the art that samples can be compared in a variety of other orders without departing from the scope of the invention.

If the authentication test 908 indicates a valid profile, the transaction is completed 910 for the matching PDK 102. If the authentication test 908 determines the profile is invalid, a new differentiation decision 906 is made to determine the next mostly likely PDK 102 to be associated with the transaction. The process repeats until a valid profile is found or all the PDKs 102 are determined to be invalid.

Figure 10:
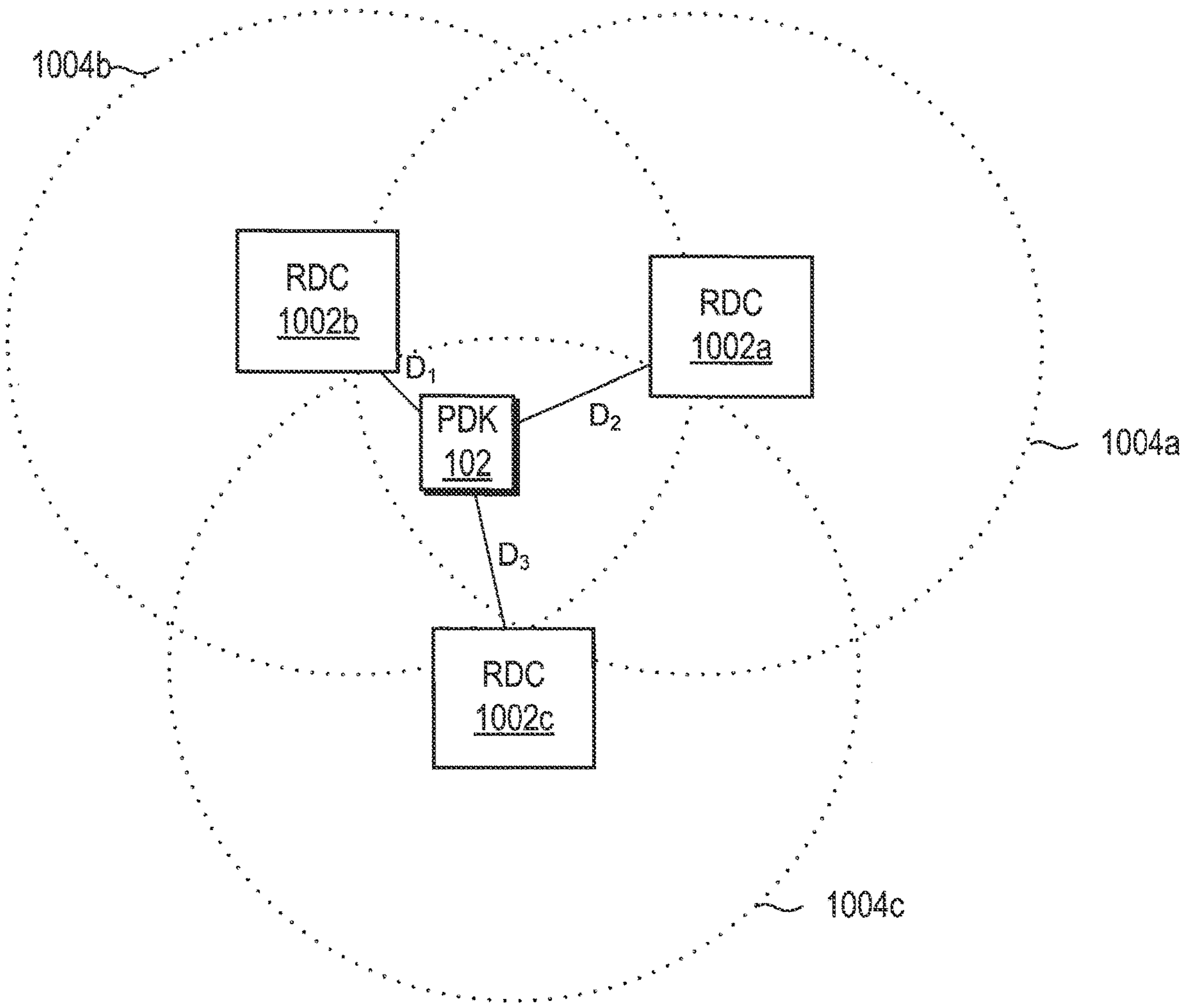
FIG. 10 is a block diagram illustrating one embodiment of a system for estimating location of a PDK using coordinate triangulation.

Turning now to FIG. 10, an example system is illustrated for determining a location metric 934 of a PDK 102 using a coordinate triangulation technique. In one embodiment of coordinate triangulation, multiple RDCs (e.g., RDCs 1002*a-c*) are spaced throughout an area. In one embodiment, the RDCs 1002 are coupled by a network. Each RDC 1002 has a range 1004 and the ranges 1004 overlap. Each RDC 1002 determines a distance D1-D3 between the RDC 1002 and the PDK 102. Distance may be estimated, for example, by monitoring signal strength and/or bit error rate as previously described. Then using conventional trigonometry, an approximate location of the PDK 102 can be calculated from D1-D3. Although only three RDCs are illustrated, it will be apparent that any number of RDCs can be used to sufficiently cover a desired area. Location information can be computed at predetermined time intervals to track the movement of PDKs throughout a facility.

Figure 11:
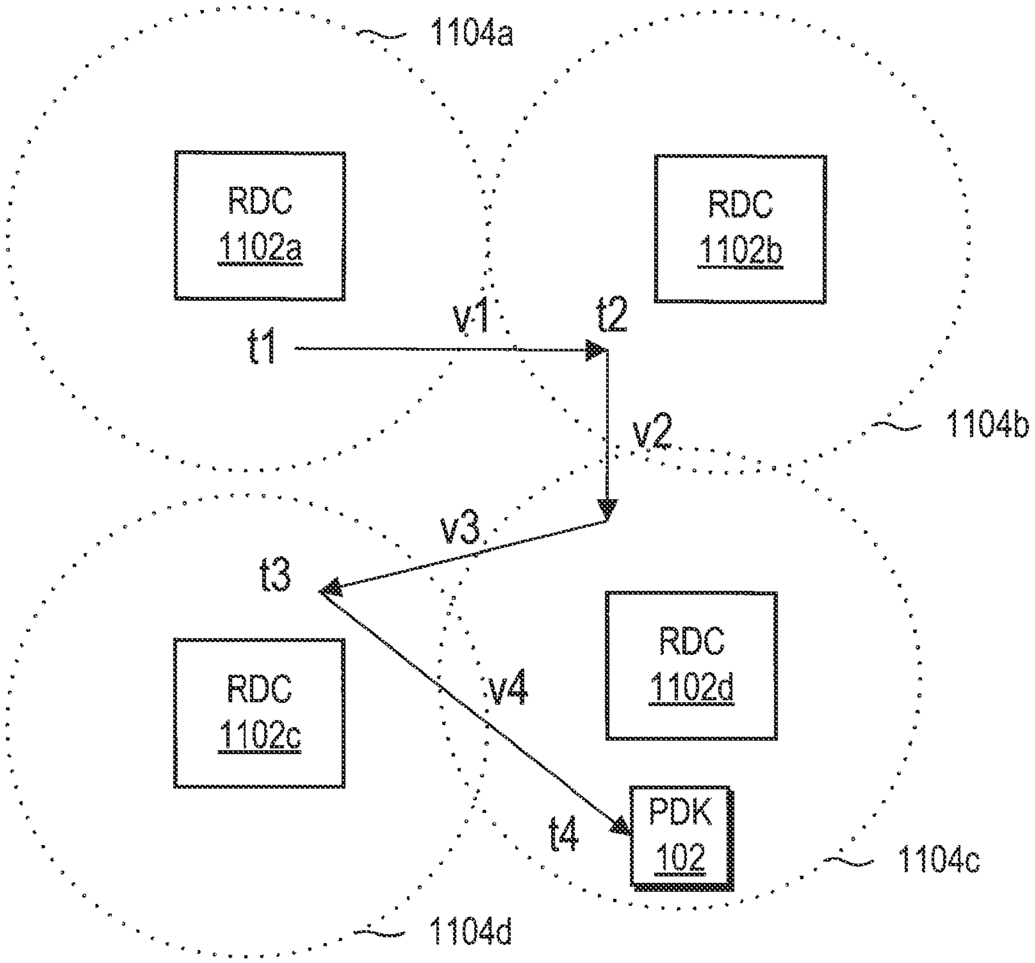
FIG. 11 is a block diagram illustrating one embodiment of a system for location tracking of a PDK.

Another embodiment of location tracking is illustrated in FIG. 11. Here, RDCs 1102 having ranges 1104 are distributed throughout an area. The ranges 1104 can vary and can be overlapping or non-overlapping. In this embodiment, each RDC 1102 can detect when a PDK 102 enters or exists its range boundaries 1104. By time-stamping the boundary crossings, a location vector can be determined to track the PDK's movement. For example, at a first time, t1, the PDK 102 is detected within the range of RDC 1102*a*. At a second time, t2, the PDK 102 is detected within the range of RDC 1102*b*. At a third time, t3, the PDK 102 is within the range of RDC 1102*c* and at a fourth time, t4, the PDK 102 is within the range of RDC 1102*d*. Using the location and time information, approximate motion vectors, v1, v2, v3 and v4 can be computed to track the motion of the PDK 102 without necessarily computing exact distance measurements.

A group of networked RDCs 302 provides the ability to detect, authenticate and exchange data with one or more PDKs simultaneously. Responsive to detecting and identifying a PDK 102, the system can configure an interface on the PDK 102 and/or electronic devices 105 on the network. Furthermore, the system can cause the device 105 or PDK 102 to execute a set of functions. In one embodiment, an electronic device 105 can cause personalized messages, settings, services, etc. to display to a customer that has approached the device 105 and is carrying a PDK 102. For example, an ATM can be configured to automatically access a user's account, a gaming machine can be automatically configured to match a specific user's preferences, a hotel room can automatically allow unlock for a specific individual and so on. For the purpose of illustration only, examples uses of the system are provided for applications in a hotel/casino environment. As will be apparent to one of ordinary skill in the art, other applications are also possible without departing from the principles of the invention disclosed herein.

Figure 12:
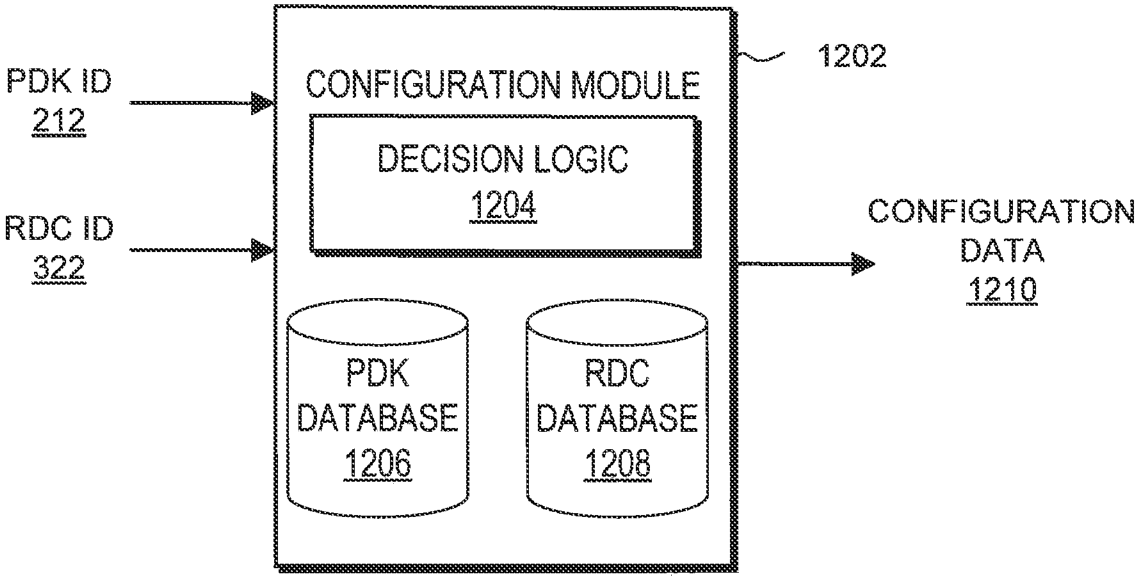
FIG. 12 is a block diagram illustrating a system for determining configuration of a PDK and/or an electronic device.

Referring now to FIG. 12, a configuration module 1202 is illustrated for dynamically configuring operation of a PDK 102 and/or an electronic device 105 with an integrated Reader 108. The configuration module 1202 receives a PDK ID 212 identifying a PDK 102 and an RDC ID 322 identifying an RDC 304. Based on the identity information 212, 322 the configuration module 1202 determines configuration data 1210 specifying the operation of the electronic device 105 and/or the PDK 102. In one embodiment, the configuration module 1202 is embedded in a remote server (e.g., server 340) that communicates with the Reader 108 via the network 110. Alternatively, all or parts of the configuration module 1202 are implemented within the electronic device 105 or within the PDK 102. In one embodiment, functions of the configuration module 1202 are distributed between a PDK 102, an electronic device 105 and/or remote servers or databases.

The configuration module 1202 comprises decision logic 1204, a PDK database 1206 and an RDC database 1208. The PDK database 1206 and RDC database 1208 store state information associated with PDK IDs 212 and RDC IDs 322 respectively. In one embodiment, the PDK state information may include; for example, information identifying the type of PDK 102 (e.g., a customer PDK, an employee PDK, an asset tracking PDK, etc.). The PDK state information may furthermore include a list of preferences associated with the PDK ID 212 (e.g., a casino patron's favorite drink, gaming preferences, room preferences, etc.). The state information may further include historical information relating to past uses of the PDK 102 (e.g., a casino patron's betting trends, player rating, etc.). The RDC state information may include, for example, the type of electronic device 105 associated with the RDC 304 (e.g., a gaming machine, a kiosk, a point of sale terminal, a locking device, etc.), a location of the RDC 304, historic data associated with previous interactions with the RDC 304 and/or associated electronic device 105 and so on. PDK and RDC state information may also include different versions of a user interface that are specific to different electronic devices 105 or customized for a specific user. Information in the PDK database 1206 and the RDC database 1208 can be modified manually or updated automatically to reflect the current states of the PDKs 102 and RDCs 304 in the databases 1206, 1208.

The decision logic 1204 processes PDK and RDC state information retrieved from the PDK database 1206 and RDC database 1208 respectively and determines configuration data 1210 specific to the PDK 102 and RDC 304. The configuration data 1210 is transmitted to the electronic device 105 and specifies a sequence of functions to be performed by the electronic device 105. This may include, for example, configuring an interface on the electronic device 105, instructing the PDK 102 to configure its interface, storing acquired information, causing a door to unlock, etc. Furthermore, the configuration data 1210 may include specific functions to be executed by the PDK 102 or other networked devices.

Figure 13:
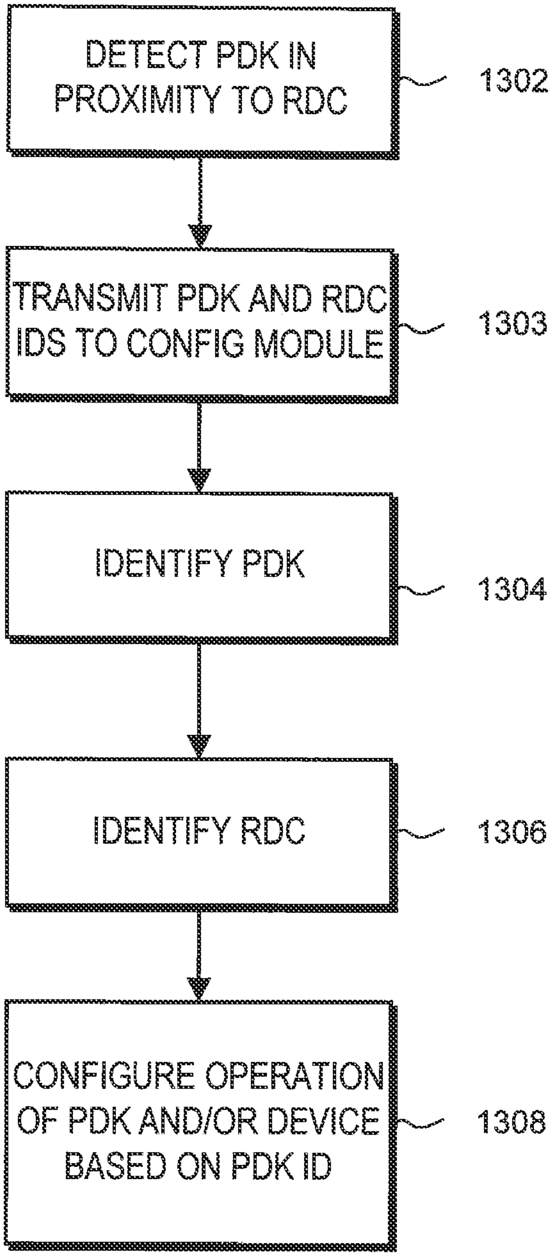
FIG. 13 is a flowchart illustrating a process for determining operation of a PDK or electronic device.

An embodiment of a process of dynamically configuring operation of a PDK 102 and/or an electronic device 105 with an embedded RDC 304 is described in FIG. 13. The RDC 304 detects 1302 a PDK 102 in proximity to the RDC 304 and the PDK ID 212 and RDC ID 322 are transmitted 1303 to the configuration module 1202. The configuration module 1202 identifies 1304 the PDK 102 based on the PDK ID 212 and identifies 1306 the RDC 304 based on the RDC ID 322. Based on the PDK ID 212 and the RDC ID 322, the configuration module 1202 outputs configuration data 1210 to configure 1308 the operation of the PDK 102 and/or the electronic device 105.

Figure 14:
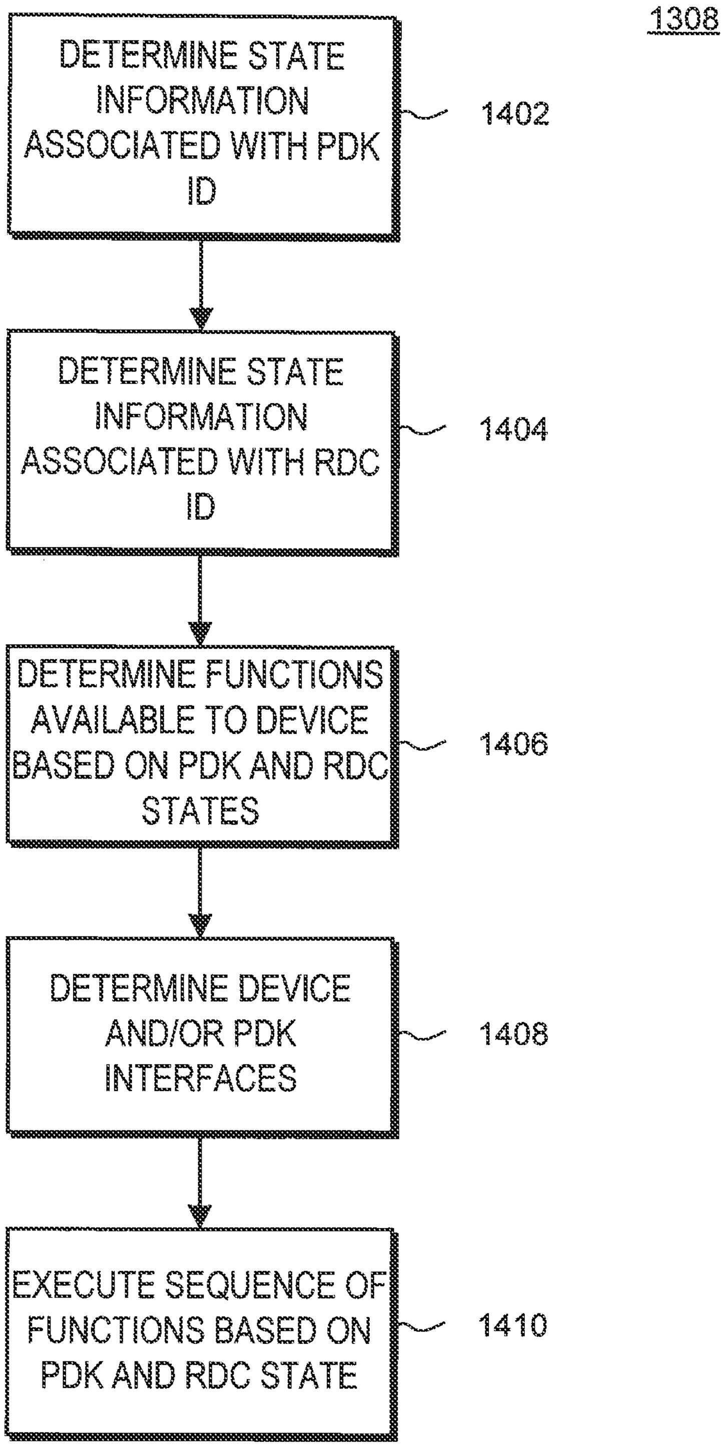
FIG. 14 is a flowchart illustrating a process for configuring interfaces of a PDK and/or device and executing tasks based on stored state information.

Turning now to FIG. 14, another embodiment of a process for configuring 1308 operation of a PDK 102 and/or the electronic device 105 based on acquired IDs is now described. The configuration module 1202 first determines 1402 state information associated with the PDK ID 212 from the PDK database 1206. The configuration module 1202 also determines 1404 state information associated with the RDC ID 322 from the RDC database 1208. Based on the PDK and RDC state information, the decision logic 1204 determines 1406 one or more functions that can be executed by the electronic device 105. For example, if the electronic device 105 is an electronic gaming machines, a different set of functions are available than if the device 105 is an Automated Teller Machine (ATM). The configuration module 1202 then determines 1408 a set of interfaces to be assigned to the electronic device 105, the PDK 102 or other networked devices. Interfaces may include, for example, particular graphics or text to display on the device 105, the PDK 102 and/or surrounding signage. The interfaces may additionally specify an association of soft keys on the electronic device 105 and/or the PDK 102 with specific functions. Determining 1408 the set of interfaces may also include determining a communication path for handling inputs to the interface. For example, on a PDK interface, the communication path may specify that an input is transmitted from the PDK 102 to the RDC 304 to a server. The configuration module then executes 1410 a sequence of functions. Functions may be executed by the PDK 102, the electronic device 108 or both depending on the PDK and RDC state information. The processes of FIGS. 13-14 can be applied to many example usage scenarios as will be described below.

Figure 15:
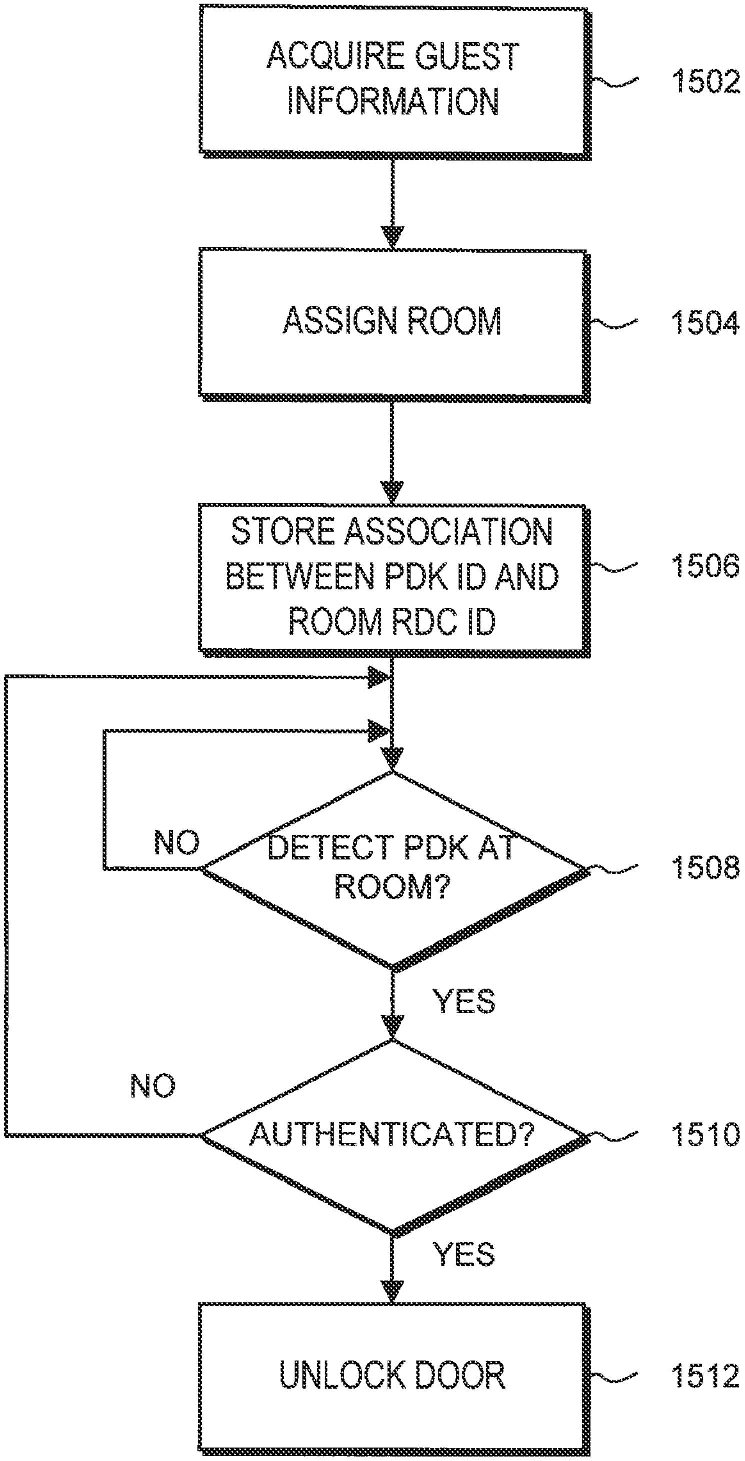
FIG. 15 is a flowchart illustrating an embodiment of configuration of a hotel check system.

FIG. 15 illustrates an example hotel check in process based on the general steps described above. In this scenario, a welcome kiosk with an integrated Reader 108 may be located at the entrance to the hotel property. The RDC 304 automatically detects a patron's PDK 102 as he/she enters the property and is in proximity to the RDC 304. Based on the RDC ID 322 and the PDK ID 212, the configuration module 1202 determines that a specific patron has arrived at the hotel at a specific entrance. The configuration module 1202 then determines specific interfaces to apply to the welcome kiosk and/or PDK 102 to assist checking in the patron. For example, the configuration module 1202 can acquire 1502 information about the guest by, for example, looking up room preferences associated with the patron in the PDK database 1208. These preferences may be based on choices manually entered by the patron when reserving the room or based on prior reservations. A player rating associated with the PDK ID 212 may determine if the patron should be offered a standard room or a suite. Based in part on the preferences and/or other state information, a room is assigned 1504 to the patron.

In one embodiment, the configuration data 1210 instructs the welcome kiosk to display the room assignment on a kiosk screen, on overhead signage or on the user's PDK 102. The configuration data 1210 may further specify user interfaces for the PDK 102, the welcome kiosk or both. For example, an interface can be provided that permits the patron to review or modify the assignment or choose from available options. Selections can be made using soft keys that are assigned to specific functions (e.g., confirm, cancel, modify, etc.). Once confirmed, the system stores 1506 an association of the PDK ID 212 with the room in the PDK database 1206.

The patron can then be directed to the room. For example, in one embodiment, overhead signage displays the patron's name, a room number and directions to the room. In another embodiment, the kiosk prints a paper receipt providing the room assignment and/or providing directions to the room. When the patron arrives at the room, an RDC 304 at the room detects 1508 the PDK 102 and transmits the PDK ID 212 and RDC ID 322 to the configuration module 1002. The configuration module 1002 identifies the patron based on the PDK ID 212 and identifies the location of the patron by the RDC ID 322 to determine if the patron is authenticated 1510. In some embodiments, a biometric authentication (e.g., a fingerprint scan) is requested to provide an addition level of security. If the patron is at his/her assigned room, the configuration module 1002 outputs configuration data 1210 including an instruction to unlock 1512 the door (e.g., using an electronic security mechanism interfaced to the RDC 304). Similar process may be used for other hotel/casino services such as, for example, check out, valet services, restaurant arrivals, etc.

In a second usage scenario, the process can be applied to personalizing gaming sessions on a casino floor. In this embodiment, an electronic gaming machine or gaming table is modified to communicate with a Reader 108. When the player enters a proximity zone of the RDC 304, the RDC 304 detects the player's PDK 102. The configuration data 1210 instructs the gaming device to create a gaming session specific to the player. For example, the configuration of the gaming session may be based on player preferences, historical play or the player's rating stored in the PDK database 1206 in association with the PDK ID 212. In one embodiment, player preferences associated with the patron's PDK 102 may be used to automate and target downloadable gaming options/features. The gaming machine may then be reconfigured with an interface that allows the patron to confirm or modify the pre-selected gaming preferences. In one embodiment, passively collected data can be used to determine player rating systems. The rating may be based on, for example, games played, games not played, level of betting, amount of time playing, etc. Based on the player rating, a player may be provided with tiered (VIP levels, etc) customer services.

Figure 16:
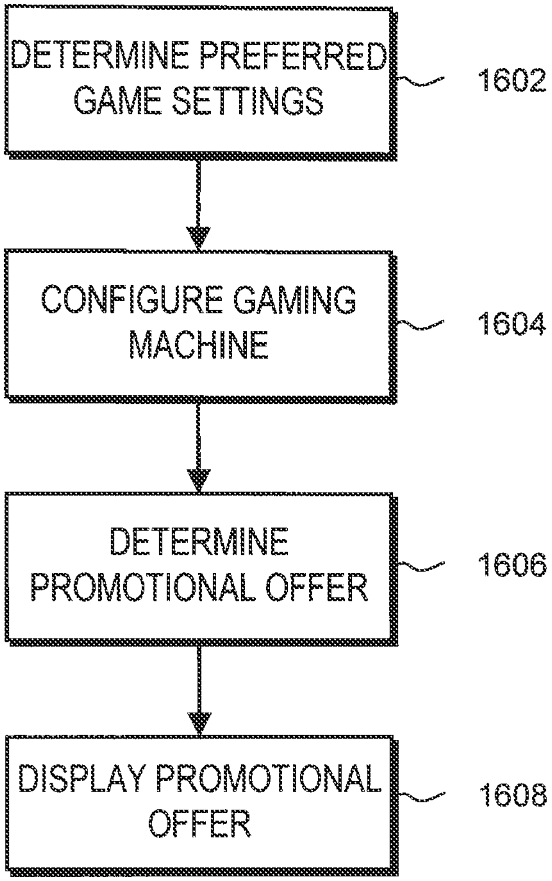
FIG. 16 is a flowchart illustrating an embodiment of a process for configuration of a gaming machine.

Another example scenario is described in the process of FIG. 16. In one embodiment, from an RDC ID 322 and a PDK ID 212, an idle gaming device detects an inactive PDK 102 and determines 1602 the player's preferred game settings. The gamine device is automatically configured 1604 to attract the player to the idle gaming device. For example, gaming devices may change their current configuration settings to match previously acquired preferences of a player in the vicinity. The personalized configuration may include loading the player's favorite game or configuring the game for the player's favorite denomination or types of bets. In one embodiment, the configuration can include determining 1606 a promotional offer for the player such as offering free game play or providing marketing, promotion or rewards opportunities. For example, the player could be offered a Keno/drawing ticket, a greeting from a host/attendant, a free drink, free show tickets or a free dinner. The promotional offers are displayed 1608 in order to up sale the non-gambling player and entice the player to place additional wagers at the electronic gaming machine.

In another scenario, a particular RDC's 304 coverage area may designate a "hot spot" on the casino floor. A player that enters the hot spot (by entering the range of the RDC 304) may receive, for example, free points added to player's account balances, free games offers or other promotions. This may attract customers to locations of the casino that may otherwise tend to be less traveled. Offers can be displayed, for example, on overhead signage or directly on the user's PDK 102. In other embodiment, the PDK 102 is configured to provide a menu interface allowing the customer to select from a variety of promotional offers.

In another example, a gaming machine can be configured to enforce responsible gaming limits based on cutoff options associated with the patron's PDK 102. For example, the configuration module 1202 may determine that an electronic gaming machine should be disabled once a particular wagering limit is reached. In another example, credit or electronic fund transfers may be automatically disabled beyond a certain limit. In one embodiment, the limitations may be confined to specified time period. For example, after a pre-determined amount of time, the patron can begin gaming again.

Figure 17:
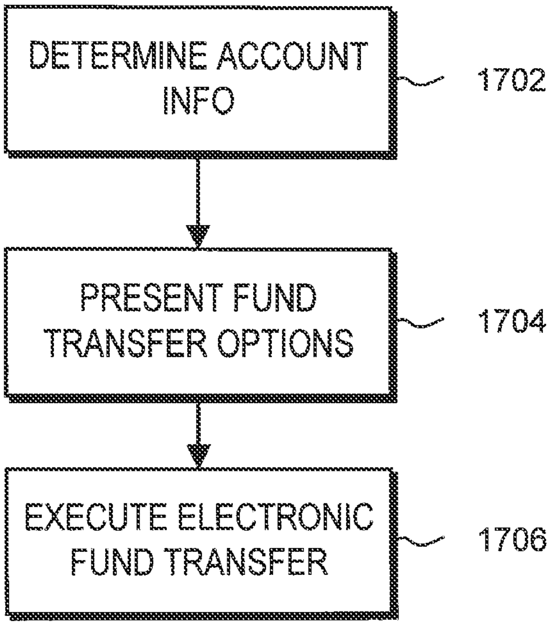
FIG. 17 is a flowchart illustrating an embodiment of a process for configuration of an electronic fund transfer system.

In yet another usage scenario, the process can be used to enable efficient and secure deposit or withdrawal of funds as illustrated in FIG. 17. For example, a cashier kiosk can be coupled to a Reader 108. When a patron approaches the cashier kiosk, the configuration module 1202 determines 1702 account information associated with the patron. The interface on the kiosk is automatically configured to provide the user with his/her own personal account information. The configuration module 1202 then configures the kiosk interface to present 1704 fund transfer options to the patron. Based on the patron's selection, an electronic fund transfer is executed 1706. For example, cash can be withdrawn or funds can be transferred to a linked electronic PDK account. In one embodiment, the funds in the linked PDK account can then be used with any electronic gaming machine. When the patron approaches a gaming machine, the patron is presented with the option of applying the linked PDK account funds to the game. If confirmed, the funds are automatically withdrawn and the patron can begin play. The cashier kiosk could also be used to allow customers to transfer credits to other customers.

In one embodiment, a user can be offered a choice of utilizing biometric, PIN or other secondary-authentication options for fund transactions. Alternatively the casino can decide to require a particular level and type of authentication. For example, the casino may employ photo profile authentication at a cashier cage. A cashier can visually compare an image retrieved from photo profile in the PDK 102 to the actual person prior to authorizing a financial transaction.

The system can also facilitate dispatch of drinks, food, assistance, etc. to patrons on the casino floor. For example, a patron's favorite drink can be stored in the PDK database 102 and associated with his/her PDK ID 212. A casino staff member can be alerted to the location of the patron and his/her favorite drink by a display on the staff member's PDK 102 or on a service kiosk. The staff member can then dispatch the favorite drink to the player after a pre-determined amount of time at an electronic gaming machine, table game or other casino location. In another embodiment, the staff member can be dispatched responsive to the patron pressing a button on the PDK 102 or on a user interface menu. In one embodiment, a beverage server can carry an electronic location map that shows the location of the individual. The location map can be, for example, on a display screen at the beverage dispatch center, on a display on the beverage tray, or using another mobile display (e.g., a PDA). Thus, as customer moves around the property, the server can be re-directed to the new patron location in real time. The patrons face may be displayed to the server to visually identify the patron once in close proximity to each other.

Figure 18:
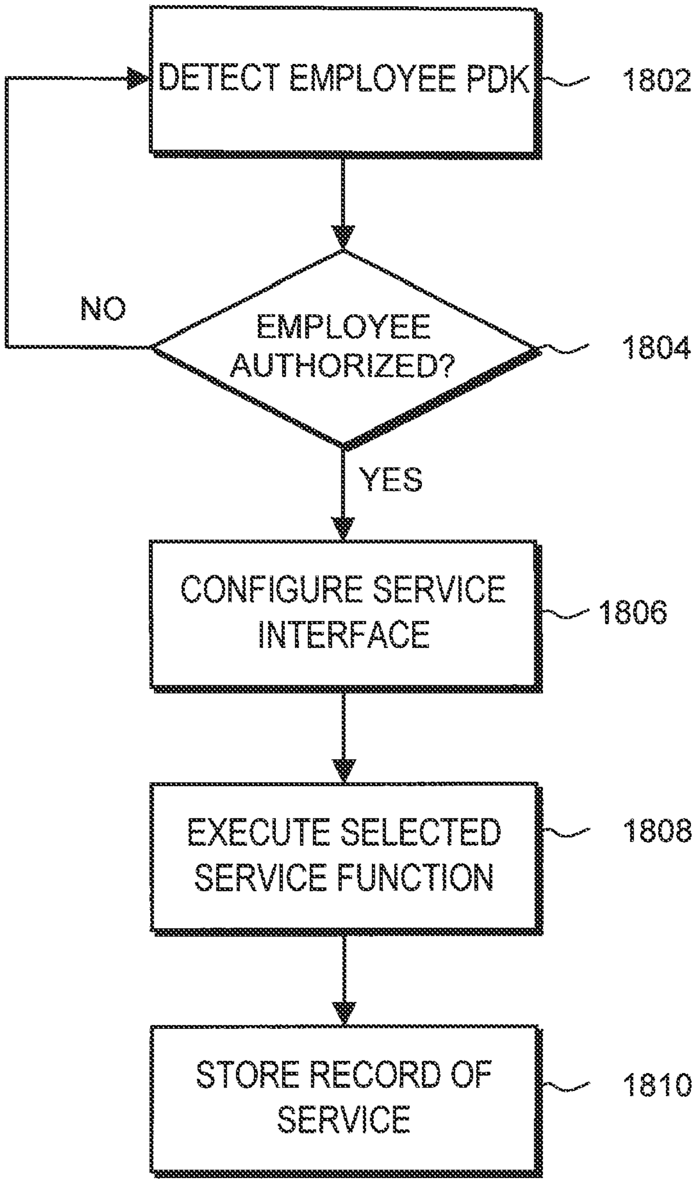
FIG. 18 is a flowchart illustrating an embodiment of a process for configuration of servicing tasks.

In another embodiment, the system can be used to improve the casino's ability to service gaming machines. For example, casino staff can provide maintenance tasks to machines without interrupting game play or disrupting the player. An example process is illustrated in FIG. 18. A service technician carries a PDK 102 that can be detected 1802 by a gaming machine coupled to a Reader 108. The configuration module 1202 recognizes that the PDK ID 212 is associated with a service technician and determines 1804 if the employee is authorized to access the machine. For certain types of maintenance tasks, a service technician may provide a form of biometric authentication to provide an additional level of security.

If the employee is authorized, the machine is reconfigured 1806 with a servicing interface. Service function are executed 1808 based on the employee's selections. A player PDK can remain in logical contact with the machine while the technician services the machine. In one embodiment, the player's and the technician's PDK IDs 212 as well as session and/or service data are stored 1810 to create an audit trail of the service. By employing authentication methods and storing an audit trail of the service performed, the system helps to prevent tampering with gaming devices.

In another embodiment, the system can be used to facilitate logging of hand pay transactions. When a patron wins a substantial jackpot on an electronic gaming machine, the patron is often hand paid the winnings by a casino staff. In one embodiment, the hand pay event can be recorded and closed once an authorized employee's PDK 102 is detected within range of the gaming machine. Alternatively, the employee's PDK 102 can be configured with a user interface when within range of the machine. The user interface prompts the employee to confirm that the hand pay was completed. After paying, the employee can press a button of the PDK 102 confirming payment. The event can then be time-stamped and logged in a database. Advantageously, the patron's PDK 102 can remain in contact with the gaming machine while the employee confirms the transaction so that the player's session is not interrupted.

In another embodiment, a PDK 102 of a staff member can be configured to display information about a player when the staff member approaches the player. For example, the staff member may be provided with the player's name and player rating. In one embodiment, multicolored LEDs on the staff member's PDK 102 or a nearby display can be used to denote the session state of a player and allow the staff member to cater services accordingly. For example, a red LED indicates the player is not currently in an active session, a yellow LED indicates the player is in proximity to a machine and a session about to begin, a green LED indicates the player is engaged in an active playing session and a blue LED indicates multiple sessions. These visual cues can be displayed on an employee's PDK or on a separate player tracking panel display.

Different types of employees can automatically receive different information about patrons in order to enhance customer service. For example, concierge staff, restaurant staff, valet staff, front desk staff and bell desk staff can each receive relevant customer information on their PDKs 102 or a nearby display when a customer approaches. For example, information for identifying a patron's automobile may be displayed to a valet attendant when the customer would like to retrieve his/her car. Employee PDKs 102 can also provide different employees access to different areas of the property and/or access to digital information based on their authorization level. For example, only authorized cashiers are granted access to a cashier cage. Other stations such as the front desk, bell desk or valet garage may also be restricted to employees authorized to work in those areas.

In yet another embodiment, the process is used to track casino assets such as, for example, cash boxes, carts, vehicles, components, chips, etc. In this embodiment, the PDK 102 is embedded or fixed to the asset. A log is kept to track the asset's movement around the casino using the location tracking methods described above. Furthermore, the casino can track precisely which individual is carrying the asset by detect an employee's PDK ID 212 at the same locations as the asset. Thus, the casino can detect if an asset is being moved by an unauthorized individual.

Figure 19:
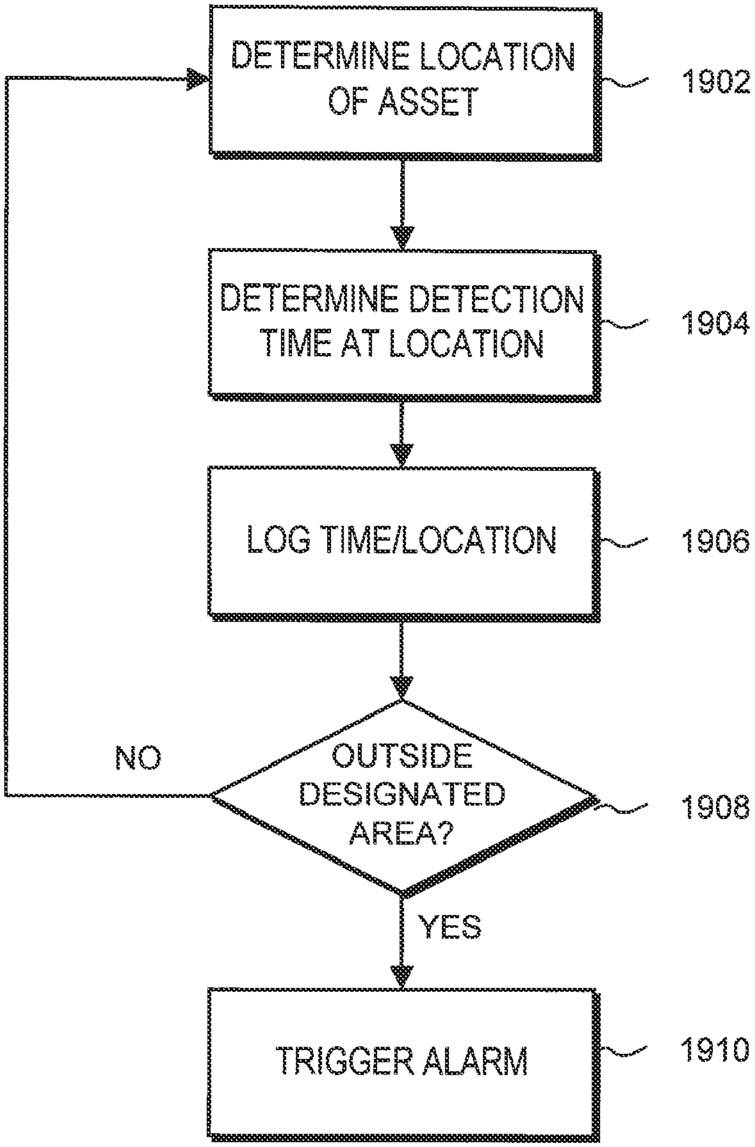
FIG. 19 is a flowchart illustrating an embodiment of a process for configuration of an asset tracking system.

An example process for tracking an asset is illustrated in FIG. 19. The configuration module 1202 determines 1902 the location of the asset and determines 1904 the time it is detected at the location. The time and location are logged 1906. In one embodiment, the state information associated with the asset may include a designated area of the property. If the asset is detected 1908 outside of the designated range, an alarm is triggered 1910.

In another embodiment, a PDK 102 can be embedded in a mobile gaming device. The mobile gaming device can be location tracked in order to ensure legal and regulatory-approved use of the devices. In one embodiment the mobile gaming device can be configured to only work in selected areas of the casino such as, for example, in areas where the security surveillance cameras are focused. Furthermore, the system can concurrently determine information about the user of the mobile gaming device. For example, the gaming device can be disabled if the user is below an age specified by mobile gaming regulations.

In one embodiment, self-service kiosks can enable a PDK holder to configure preferences for their PDK 102 or update account settings. For example, a user has the option of disabling PDK features 102 if they wish to carry the PDK 102 but not be detected by any RDCs 304. Furthermore, a player could disable only certain features of the PDK 102. For example, a player may wish to have his PDK 102 enabled, but hide selected information such as name, account information or various preferences.

As will be apparent to one of ordinary skill in the art, portions of the PDK memory may be initialized prior to distributing the PDK 102 to a patron. For example, the PDK 102 may be configured with its unique PDK ID 212 and may be initialized with user information, preferences, etc. based on information provided by the patron. In one embodiment, the distributor of the PDK (e.g., a casino, hotel or merchant) can pre-configure the PDK 102 to default settings specific to the distributor.

The order in which the steps of the methods of the present invention are performed is purely illustrative in nature. The steps can be performed in any order or in parallel, unless otherwise indicated by the present disclosure. The methods of the present invention may be performed in hardware, firmware, software or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:

detecting whether a user device is in proximity to a reader device, the reader device coupled to an electronic device;

responsive to detecting that the user device is in proximity to the reader device, wirelessly receiving a first identification code identifying the user device;

determining a second identification code identifying the reader device;

determining one or more user preferences using the first identification code and the second identification code;

determining configuration data specifying an operation of the electronic device and an operation of the user device based on the one or more user preferences;

automatically executing a sequence of distinct functions of the electronic device based on the configuration data; and configuring a user interface of the user device to display the automatically executed sequence of distinct functions of the electronic device based on the configuration data.

2. The method of claim 1, further comprising:

responsive to wirelessly receiving the first identification code identifying the user device, authenticating the user device using the first identification code.

3. The method of claim 1, further comprising:

requesting biometric authentication of a user associated with the user device; and responsive to determining that the biometric authentication of the user associated with the user device is successful, automatically executing the sequence of distinct functions of the electronic device.

4. The method of claim 1, further comprising:

transmitting the configuration data to the electronic device; and automatically configuring the operation of the electronic device based on the configuration data.

5. The method of claim 1, wherein determining the configuration data specifying the operation of the electronic device further comprises changing a current setting of the electronic device to match the one or more user preferences.

6. The method of claim 1, wherein determining the configuration data specifying the operation of the electronic device further comprises:

receiving the second identification code identifying the reader device;

determining one or more available functions executable by the electronic device based on the second identification code; and determining the configuration data specifying the operation of the electronic device based on the one or more available functions executable by the electronic device.

7. The method of claim 1, wherein detecting whether the user device is in proximity to the reader device comprises detecting whether the user device is in proximity to the reader device for at least a predetermined period of time.

8. The method of claim 1, wherein automatically executing the sequence of distinct functions of the electronic device comprises storing the first identification code and the automatically executed sequence of district functions in an event log.

9. The method of claim 1, wherein the reader device is operable on a same system as the electronic device.

10. The method of claim 1, wherein the electronic device is one from a group of a gaming machine, a locking device, a kiosk, an automated teller machine, and a point of sale terminal.

11. A system comprising:

one or more processors; and a memory including instructions that, when executed by the one or more processors, cause the system to:

detect whether a user device is in proximity to a reader device, the reader device coupled to an electronic device;

responsive to detecting that the user device is in proximity to the reader device, wirelessly receive a first identification code identifying the user device;

determine a second identification code identifying the reader device;

determine one or more user preferences using the first identification code and the second identification code;

determine configuration data specifying an operation of the electronic device and an operation of the user device based on the one or more user preferences;

automatically execute a sequence of distinct functions of the electronic device based on the configuration data; and configure a user interface of the user device to display the automatically executed sequence of distinct functions of the electronic device based on the configuration data.

12. The system of claim 11, wherein the instructions, when executed by the one or more processors, further cause the system to:

authenticate the user device using the first identification code responsive to wirelessly receiving the first identification code identifying the user device.

13. The system of claim 11, wherein the instructions, when executed by the one or more processors, further cause the system to:

request biometric authentication of a user associated with the user device; and responsive to determining that the biometric authentication of the user associated with the user device is successful, automatically execute the sequence of distinct functions of the electronic device.

14. The system of claim 11, wherein the instructions, when executed by the one or more processors, further cause the system to:

transmit the configuration data to the electronic device; and automatically configure the operation of the electronic device based on the configuration data.

15. The system of claim 11, wherein to determine the configuration data specifying the operation of the electronic device, the instructions, when executed by the one or more processors, further cause the system to change a current setting of the electronic device to match the one or more user preferences.

16. The system of claim 11, wherein to determine the configuration data specifying the operation of the electronic device, the instructions, when executed by the one or more processors, further cause the system to:

receive the second identification code identifying the reader device;

determine one or more available functions executable by the electronic device based on the second identification code; and determine the configuration data specifying the operation of the electronic device based on the one or more available functions executable by the electronic device.

17. The system of claim 11, wherein to detect whether the user device is in proximity to the reader device, the instructions, when executed by the one or more processors, further cause the system to detect whether the user device is in proximity to the reader device for at least a predetermined period of time.

18. The system of claim 11, wherein to automatically execute the sequence of distinct functions of the electronic device, the instructions, when executed by the one or more processors, further cause the system to store the first identification code and the automatically executed sequence of distinct functions in an event log.

19. The system of claim 11, wherein the reader device is operable on a same system as the electronic device.

20. The system of claim 11, wherein the electronic device is one from a group of a gaming machine, a locking device, a kiosk, an automated teller machine, and a point of sale terminal.

* * * * *